(12) United States Patent
Hays et al.

(10) Patent No.: US 8,427,649 B2
(45) Date of Patent: Apr. 23, 2013

(54) RANGE IMAGING LIDAR

(75) Inventors: Paul Byron Hays, Ann Arbor, MI (US);
David Keith Johnson, Canton, MI (US);
David Michael Zuk, Dexter, MI (US)

(73) Assignee: Michigan Aerospace Corporation, Ann Arbor, MI (US)

( * ) Notice: Subject to any disclaimer, the term of this patent is extended or adjusted under 35 U.S.C. 154(b) by 538 days.

(21) Appl. No.: 12/780,895

(22) Filed: May 15, 2010

(65) Prior Publication Data

US 2011/0164783 A1 Jul. 7, 2011

Related U.S. Application Data

(60) Provisional application No. 61/178,550, filed on May 15, 2009, provisional application No. 61/290,004, filed on Dec. 24, 2009.

(51) Int. Cl.
*G01B 9/02* (2006.01)
(52) U.S. Cl.
USPC .......................................... 356/450; 356/4.09
(58) Field of Classification Search .................. 356/450, 356/4.01, 4.09
See application file for complete search history.

(56) References Cited

U.S. PATENT DOCUMENTS

| | | | |
|---|---|---|---|
| 3,389,256 A | 6/1968 | Astheimer | |
| 3,984,685 A | 10/1976 | Fletcher et al. | |
| 4,167,329 A | 9/1979 | Jelalian et al. | |
| 4,195,931 A | 4/1980 | Hara | |
| 4,483,614 A | 11/1984 | Rogers | |
| 4,710,732 A | 12/1987 | Hornbeck | |
| 4,893,003 A | 1/1990 | Hays | |
| 4,983,033 A | 1/1991 | Suzuki | |
| 4,988,190 A | 1/1991 | Miles | |
| 5,000,566 A | 3/1991 | Kuppenheimer, Jr. et al. | |
| 5,029,999 A | 7/1991 | Kremer et al. | |
| 5,047,653 A | 9/1991 | Garcia et al. | |
| 5,055,692 A | 10/1991 | Abbiss et al. | |

(Continued)

FOREIGN PATENT DOCUMENTS

| | | |
|---|---|---|
| EP | 1152260 A1 | 11/2001 |
| EP | 1158300 A2 | 11/2001 |

(Continued)

OTHER PUBLICATIONS

Dehring, Michael T., Carl A. Nardell, and Paul B. Hays, "Space LIDAR Simulations Derived from the GroundWinds New Hampshire and Hawaii Instruments," Lidar Remote Sensing for Environmental Monitoring IV, SPIE Proceedings, 5154:84-92, San Diego, CA, Aug. 2003.

(Continued)

*Primary Examiner* — Tarifur Chowdhury
*Assistant Examiner* — Jonathan Hansen
(74) *Attorney, Agent, or Firm* — Stites & Harbison PLLC; Juan Carlos A. Marquez, Esq.

(57) ABSTRACT

Light scattered by a portion of a fluid medium illuminated by a beam of substantially monochromatic light is received within a field-of-view nominally along an axis oriented in a different direction relative to the beam and processed by an interferometer to generate a corresponding fringe pattern that is detected and processed to generate at least one measure of the fluid medium at a plurality of different ranges.

73 Claims, 42 Drawing Sheets

U.S. PATENT DOCUMENTS

| | | | |
|---|---|---|---|
| 5,083,857 | A | 1/1992 | Hornbeck |
| 5,088,815 | A | 2/1992 | Garnier et al. |
| 5,111,055 | A | 5/1992 | Fima |
| 5,159,406 | A | 10/1992 | Adler et al. |
| 5,214,484 | A | 5/1993 | de Mollerat du Jeu et al. |
| 5,216,477 | A | 6/1993 | Korb |
| 5,267,010 | A | 11/1993 | Kremer et al. |
| 5,272,513 | A | 12/1993 | Vahala et al. |
| 5,325,175 | A | 6/1994 | Mocker et al. |
| 5,535,047 | A | 7/1996 | Hornbeck |
| 5,621,523 | A | 4/1997 | Oobayashi et al. |
| 5,982,478 | A | 11/1999 | Ainsworth et al. |
| 6,141,086 | A | 10/2000 | Vahala et al. |
| 6,163,380 | A | 12/2000 | Hays |
| 6,181,412 | B1 | 1/2001 | Popescu et al. |
| 6,297,878 | B1 | 10/2001 | Miller |
| 6,313,908 | B1 | 11/2001 | McGill et al. |
| 6,504,943 | B1 | 1/2003 | Sweatt et al. |
| 6,608,669 | B2 | 8/2003 | Holton |
| 6,639,683 | B1 | 10/2003 | Tumbar et al. |
| 6,646,725 | B1 | 11/2003 | Eichinger et al. |
| 6,781,691 | B2 | 8/2004 | MacKinnon et al. |
| 6,894,768 | B2 | 5/2005 | Caldwell et al. |
| 7,019,883 | B2 | 3/2006 | Moon et al. |
| 7,064,817 | B1 | 6/2006 | Schmitt et al. |
| 7,098,871 | B1 | 8/2006 | Tegreene et al. |
| 7,106,447 | B2 | 9/2006 | Hays |
| 7,148,974 | B1 | 12/2006 | Schmitt et al. |
| 7,161,673 | B2 | 1/2007 | Da Silva |
| 7,180,580 | B2 | 2/2007 | Guruprasad |
| 7,180,588 | B2 | 2/2007 | Geshwind et al. |
| 7,301,610 | B2 | 11/2007 | Langdon |
| 7,311,000 | B2 | 12/2007 | Smith et al. |
| 7,342,658 | B2 | 3/2008 | Kowarz et al. |
| 7,352,476 | B2 | 4/2008 | Baillon et al. |
| 7,391,506 | B2 | 6/2008 | Harris et al. |
| 7,400,385 | B2 | 7/2008 | Caldwell et al. |
| 7,463,341 | B2 | 12/2008 | Halldorsson et al. |
| 7,495,774 | B2 | 2/2009 | Hays et al. |
| 7,505,145 | B2 | 3/2009 | Hays et al. |
| 7,508,528 | B2 | 3/2009 | Hays et al. |
| 7,518,736 | B2 | 4/2009 | Hays et al. |
| 7,522,291 | B2 | 4/2009 | Hays et al. |
| 2001/0028993 | A1 | 10/2001 | Sanford |
| 2002/0125435 | A1 | 9/2002 | Cofer et al. |
| 2002/0176149 | A1 | 11/2002 | Davis et al. |
| 2003/0151732 | A1 | 8/2003 | Rogers et al. |
| 2004/0218172 | A1 | 11/2004 | DeVerse et al. |
| 2006/0061753 | A1 | 3/2006 | Harris et al. |
| 2006/0139657 | A1 | 6/2006 | Baillon et al. |
| 2006/0227317 | A1 | 10/2006 | Henderson et al. |
| 2006/0262324 | A1* | 11/2006 | Hays et al. ............... 356/519 |
| 2007/0109528 | A1 | 5/2007 | Caldwell et al. |
| 2007/0176077 | A1 | 8/2007 | Barchers |
| 2007/0229821 | A1 | 10/2007 | Christian et al. |
| 2008/0117419 | A1* | 5/2008 | Hays et al. ............... 356/342 |
| 2008/0117433 | A1* | 5/2008 | Hays et al. ............... 356/519 |
| 2008/0180690 | A1* | 7/2008 | Hays et al. ............... 356/519 |
| 2008/0180691 | A1* | 7/2008 | Hays et al. ............... 356/519 |
| 2008/0210881 | A1 | 9/2008 | Harris et al. |
| 2008/0264164 | A1 | 10/2008 | Solheim et al. |
| 2009/0046289 | A1 | 2/2009 | Caldwell et al. |
| 2009/0051896 | A1 | 2/2009 | Caldwell et al. |

FOREIGN PATENT DOCUMENTS

| | | |
|---|---|---|
| EP | 1790997 A1 | 5/2007 |
| JP | 11-133049 A | 5/1999 |
| JP | 2000147120 A | 5/2000 |
| JP | 2004101265 A | 4/2004 |
| JP | 03771417 B2 | 4/2006 |
| JP | 2006125961 A | 5/2006 |
| JP | 2007303855 A | 11/2007 |
| KR | 20040110636 A | 12/2004 |
| WO | 2004114243 A1 | 12/2004 |

OTHER PUBLICATIONS

Dehring, M. T., Carl A. Nardell, Paul B. Hays, Jane C. Pavlich, Berrien Moore III, and Jinxue Wang, "Instrument specifications and performance prediction for 2005 High Altitude (30km) Balloon Demonstration of GroundWinds Fringe Imaging Doppler LIDAR," Laser Radar Technology for Remote Sensing, SPIE Proceedings 5240:165-173, Barcelona, Spain, Sep. 2003.

Imaki, Maqsaharu, Dongsong Sun, and Takao Kobayashi, "Direct-detection Doppler lidar for two-dimensional wind field measurements of the troposphere," in Lidar Remote Sensing for Industry and Environment Monitoring III, Upendra N. Singh, Toshikasu Itabe, Zhishen Liu, Editors, Proceedings of SPIE, vol. 4893, 2003, pp. 303-310.

Shibata, Yasukuni, Chikao Nagasawa, Makoto Abo, and Tomohiro Nagai, "Wind measurement accuracy with incoherent Doppler lidar using an iodine vapor filter," in Lidar Remotes Sensing for Industry and Environment Monitoring III, Upendra N. Singh, Toshikasu Itabe, Zhishen Liu, Editors, Proceedings of SPIE, vol. 4893, 2003, pp. 529-536.

Wang, J., M. Dehring, C. Nardell, P. Hays, D. Dykeman, and B. Moore III , "Direct Detection Doppler Winds Lidar: Ground-based Operation to Space," Lidar Remote Sensing for Environmental Monitoring IV, SPIE Proceedings. 5151:93-104, San Diego, CA, Aug. 2003.

Watkins, C.B., Richey, C.J., Tchoryk, P., Ritter, G., Hays, P.B., Nardell, C.A., Willis, T., and Urzi, B., "Molecular Optical Air Data System (MOADS) Flight Experiment," Laser Radar Technology and Applications VIII, SPIE Aerosense Conference, Orlando, Florida, SPIE Proceedings, 5086: 236-245, Apr. 2003.

Yoe, J.G., Rama Varma Raja, M.K., Hardesty, R.M., Brewer, W.A., Moore, B., Ryan, J., Hays, P.B., Nardell, C.A., Gentry, B., Day, M., and Rancourt, K., "GroundWinds 2000 field campaign: Demonstration of new Doppler lidar technology and wind lidar data intercomparison," Lidar Remote Sensing for Industry and Environment Monitoring III, Hangzhou, China, SPIE Proceedings, 4893:327-336, 2003.

Dehring, Michael T., James M. Ryan, Paul B. Hays, Berrien Moore III, and Jinxue Wang, "GroundWinds Balloon Fringe Imaging Doppler LIDAR Mission Concept and Instrument Performance," Lidar Remote Sensing for Industry and Environmental Monitoring V, SPIE Proceedings, 5653:210-219, Honolulu, Hawaii, Nov. 2004.

Durand, Y., A. Culoma, R. Maynart, D. Morancais, and F. Fabre, "Pre-Development of a Direct Detection Doppler Wind Lidar for ADM/AEOLUS Mission," in Sensors, Systems, and Next-Generation Satellites VII, edited by Roland Maynart, Steven P. Neeck, Haruhisa Shimoda, Joan B. Little, and Michelle L. Alen, Proceeding of SPIE, vol. 5234, 2004, pp. 354-363.

Nardell, C., J. Wertz, M. Dehring, and P. Tchoryk, "Low-Cost Mission Architecture for Global Tropospheric Wind Measurements," Spacecraft Platforms and Infrastructure, SPIE Proceedings, 5419:47-56, Orlando, FL, Apr. 2004.

Watkins, Christopher B., Charles J. Richey, Peter Tchoryk, Jr., Greg A. Ritter, Michael Dehring, Paul B. Hays, Carl A. Nardell, and Russell Urzi, "Molecular Optical Air Data System (MOADS) Prototype II," Laser Radar Technology and Applications IX, Orlando, FL, SPIE Proceedings, 5412:10-20, Apr. 13-15, 2004.

Hays, P. B., Michael, T. Dehring, Lennard A. Fisk, Peter Tchoryk, Jr., Ivan Dors, James Ryan, Jinxue Wang, Michael Hardesty, Bruce Gentry, Floyd Hovis, "Space-based Doppler Winds LIDAR: A Vital National Need," National Research Council (NRC) Decadal Study Request for Information, May 2005.

Unknown author, "The Digital Micromirror Device: A Historic Mechanical Engineering Landmark", published by Texas Instruments Inc. and the American Society of Mechanical Engineers, May 1, 2008, 20 pp., available at http://files.asme.org/asmeorg/Communities/History/Landmarks/14607.pdf; downloaded on Mar. 7, 2009.

U.S. Army, FM 6-40/MCWP 3-16.4 Tactics, Techniques, and Procedures for Field Artillery Manual Cannon Gunnery (Field Manual), U.S. Army, Jan. 9, 1976, pp. I-LVIII.

Fiocco, G., and DeWolf, J.B., "Frequency spectrum of laser echoes from atmospheric constituents and determination of aerosol content of air," Journal of Atmospheric Sciences, v.25, n3, May 1968, pp. 488-496.

Luenberger, D., "Optimization by Vector Space Methods", John Wiley & Sons, Inc. (1969), p. 15.

Hays, P.B. and Roble, R.G, "A Technique for Recovering Doppler Line Profiles from Fabry-Perot Interferometer Fringes of very Low Intensity", Applied Optics, 10,193-200, 1971.

Benedetti-Michelangeli, G., Congeduti, F., and Fiocco, G., "Measurement of aerosol motion and wind velocity in the lower troposphere by Doppler optical radar," Journal of the Atmospheric Sciences, v.29, n5, Jul. 1972, pp. 906-910.

Abreu, Vincent J., "Wind measurements from an orbital platform using a lidar system with incoherent detection: an analysis," Applied Optics, vol. 18, No. 17, Sep. 1, 1979, pp. 2992-2997.

Abreu, V. J., "Lidar from orbit," Optical Engineering, vol. 19, No. 4, Jul./Aug. 1980, pp. 489-493.

Hays, P. B., Killeen, T. L., Kennedy, B. C., "The Fabry-Pérot interferometer on Dynamics Explorer," Space Sci. Instrum. 5, 395-416, 1981.

Rees, D., T.J. Fuller-Rowell, A. Lyons, T.L. Killeen and P.B. Hays, "Stable and rugged etalon for the Dynamics Explorer Fabry-Perot interferometer 1: Design and construction," Appl. Opt., 21, 3896-3902, 1982.

Killeen, Timothy L., and P.B. Hays, "Doppler line profile analysis for a multichannel Fabry-Perot interferometer," Applied Optics, vol. 23, No. 4, Feb. 15, 1984, pp. 612-620.

Vaughan, J.M. and Forrester, P.A., "Laser Doppler Velocimetry Applied to the Measurement of Local and Global Wind," Wind Engineering, vol. 12, No. 1, 1989, pp. 1-16.

Abreu, V.J., P.B. Hays, and W.R. Skinner, "The High Resolution Doppler Imager," Optics & Photonics News, 2, #10, 28-30, 1991.

Goldman, Louis J., "Three-Component Laser Anemometer Measurement Systems," NASA Technical Paper 8080, Report No. NASA TP-3080, Jan. 1991.

Abreu, V.J., J.E. Barnes, and P.B. Hays, Observations of winds with an incoherent lidar detector, Appl. Opt, 31, 4509-4514, 1992.

Hays, P.B., and HRDI Science Team: V.J. Abreu, M.D. Burrage, D.A. Gell, H.J. Grassl, A.R. Marshall, Y.T. Morton, D.A. Ortland, W.R. Skinner, D.L. Wu, and J.-H. Yee, "Remote sensing of mesospheric winds with the High Resolution Doppler Imager," Planet. Space Sci., 40, #12, 1599-1606, 1992.

Press, W.H., Teukolsky, S.A., Vetterling, W.T. and Flannery, B.P., Numerical Recipes in C, The Art of Scientific Computing, Second Edition, Cambridge University Press, 1992, pp. 656-661 and 681-706.

Rye, Barry J., and R. Michael Hardesty, "Discrete Spectral Peak Estimation in Incoherent Backscatter Heterodyne Lidar. I: Spectral Accumulation and the Cramer-Rao Lower Bound," IEEE Transaction on Geoscience and Remote Sensing, vol. 31, No. 1, Jan. 1993, pp. 16-27.

Burrage, M.D., W.R. Skinner, A.R. Marshall, P.B. Hays, R.S. Lieberman, S.J. Franke, D.A. Gell, D.A. Ortland, F.J.Schmidlin, R.A. Vincent, and D.L. Wu, "Validation of winds from the High Resolution Doppler Imager on UARS," Optical Spectroscopic Techniques and Instrumentation for Atmospheric and Space Research, Jinxue Wang, Paul Hays, Editors, Proc. SPIPE 2266, pp. 294-306, 1994.

Skinner, W.R., P.B. Hays, H.J. Grassl, D.A. Gell, M.D. Burrage, A.R. Marshall, and D.A. Ortland, "The High Resolution Doppler Imager on the Upper Atmosphere Research Satellite," Optical Spectroscopic Techniques and Instrumentation for Atmospheric and Space Research, Jinxue Wang, Paul Hays, Editors, Proc. SPIE 2266, pp. 281-293, 1994.

Skinner, W.R., and P.B. Hays, "Incoherent Doppler lidar for measurement of atmospheric winds," Optical Spectroscopic Techniques and Instrumentation for Atmospheric and Space Research, Jinxue Wang, Paul Hays, Editors, Proc. SPIE 2266, pp. 383-394, 1994.

Wang, J., J.Wu, and P.B. Hays, "University of Michigan ground-based circle-to-line Fabry-Perot interferometer and its applications in mesosphere and lower thermosphere dynamics studies," in Optical Spectroscopic Techniques and Instrumentation for Atmospheric and Space Research, Jinxue Wang, Paul Hays, Editors, Proc. SPIE 2266, pp. 133-142, 1994.

Wu, J., J. Wang, and P.B. Hays, "Performance of a Circle-to-Line Optical System for a Fabry-Perot Interferometer: A Laboratory Study", Appl. Opt 33, No. 34, 7823-7828, Dec. 1994.

Grassl, H.J., W. R. Skinner, P. B. Hays, M. D. Burrage, D. A. Gell, A. R. Marshall, D. A. Ortland, and V. J. Abreu, "Atmospheric wind measurements with the High Resolution Doppler Imager (HRDI)," J. Spacecraft & Rockets 32, No. 1, 169-176, Jan.-Feb. 1995.

Marshall, A.R., D.A. Gell, J.-H. Yee, D.A. Ortland, M.D. Burrage, W.R. Skinner, and P.B. Hays, "Stellar alignment of the High Resolution Doppler Imager," J. Spacecraft & Rockets 32, #6, 1039-1043. 1995.

Skinner, W.R., P.B. Hays, H. J. Grassi, D.A. Gell, M.D. Burrage, A.R. Marshall, and J. Kafkalidis, "The High Resolution Doppler Imager: Instrument performance in orbit since late 1991," Optical Spectroscopic Techniques and Instrumentation for Atmospheric and Space Research II, Paul B. Hays, Jinxue Wang, Editors, Proc. SPIE 2830, 202-214, 1996.

Barnes, John E. and David J. Hofman, "Lidar measurements of stratospheric aerosol over Mauna Loa Observatory," Geophysical Research Letters, vol. 24, No. 15, Aug. 1, 1997.

McGill, Matthew J., Wilbert R. Skinner, and Todd D. Irgang, "Analysis techniques for the recovery of winds and backscatter coefficients from a multiple-channel incoherent Doppler lidar," Applied Optics, vol. 36, No. 6, Feb. 20, 1997, pp. 1253-1268.

McGill, Matthew J., Wilbert R. Skinner, and Todd D. Irgang, "Validation of wind profiles measured with incoherent Doppler lidar," Applied Optics, vol. 36, No. 9, Mar. 20, 1997, pp. 1928-1939.

McGill, Matthew J., William D. Hart, Jack A. McKay, and James D. Spinhirne, "Modeling the performance of direct-detection Doppler lidar system including cloud and solar background variability," Applied Optics, Vo. 38, No. 30, Oct. 20, 1999, pp. 6388-6397.

Nocedal, J. and, S. Wright, Numerical Optimization, Springer-Verlag New York, Inc., 1999, pp. 194-201.

Souprayen, Claude, Anne Tgarnier, Algert Hertzong, Alain Hauchecorne,a nd Jacques Porteneuve, "Rayleigh-Mie Dopper wind lidar for atmospheric measurements. I. Instrument setup, validation, and first climatological results," Applied Optics, vol. 38, No. 12, Apr. 20, 1999, pp. 2410-2421.

Miles, R.B., Lempert, W.R., Forkey, J.N., "Laser Rayleigh scattering," Meas. Sci. Technol. 12, R33-R51, 2001.

Tchoryk, P., C. Watkins, S. Lindemann, P. Hays, and Nardell, C.A., "Molecular Optical Air Data System (MOADS)," Laser Radar Technology and Applications VI, SPIE Aerosense Conference, Orlando, FL, SPIE 4377-28, Apr. 16-20, 2001.

Dehring, D. T., C. A. Nardell, J. C. Pavlich, P. B. Hays, and I. G. Dors, "Performance and comparison of 532nm and 355nm GroundWinds lidars," Lidar Remote Sensing for Industry and Environment Monitoring III, Hangzhou, China, SPIE Proceedings, 4893: 337-47, Oct. 2002.

Irgang, T.D., Hays, P.B., and Skinner, W.R., "Two-channel direct-detection Doppler lidar employing a charged-coupled device as a detector," Appl. Opt., 41, 1145-1155, 2002.

Liu, Zhi-Shen, Dong Wu, Jin-Tao Liu, Kai-Lin Zhang, Wei-Biao Chen, Xiao-Quan Song, Johnathan W. Hair, and Chiao-Yao She, "Low-altitude atmospheric wind measurement from the combined Mie and Rayleigh backscattering by Doppler lidar with an iodine filter," Applied Optics, Vo. 42, No. 33, Nov. 20, 2002, pp. 7079-7086.

Nardell, Carl A., Hays, Paul B., Jane C. Pavlich, Michael Dehring, and Greg Sypitkowski, "GroundWinds New Hampshire and the LIDARFest 2000 Campaign," Invited Paper, Lidar Remote Sensing for Industry and Environment Monitoring II, San Diego, SPIE Proceedings, 4484: 36-50, 2002.

Barnes, John E., Sebastian Bronner, Robert Beck, and N. C. Parikh, "Boundary layer scattering measurements with a charge-coupled device camera lidar," Applied Optics, vol. 42, No. 15, May 20, 2003, pp. 2647-2652.

Dehring, Michael T., Ivan G. Dors, Carl A. Nardell, Jane C. Pavlich, and Paul B. Hays, "Recent Measurement Achievements of the GroundWinds Direct Detection Doppler Wind Lidars," Presented at the CLRC in Bar Harbor Jun. 2003.

International Search Report and Written Opinion of the International Searching Authority, and International Preliminary Report on Patentability, in International Application No. PCT/US2010/035046, Feb. 22, 2011, 12 pages.

* cited by examiner

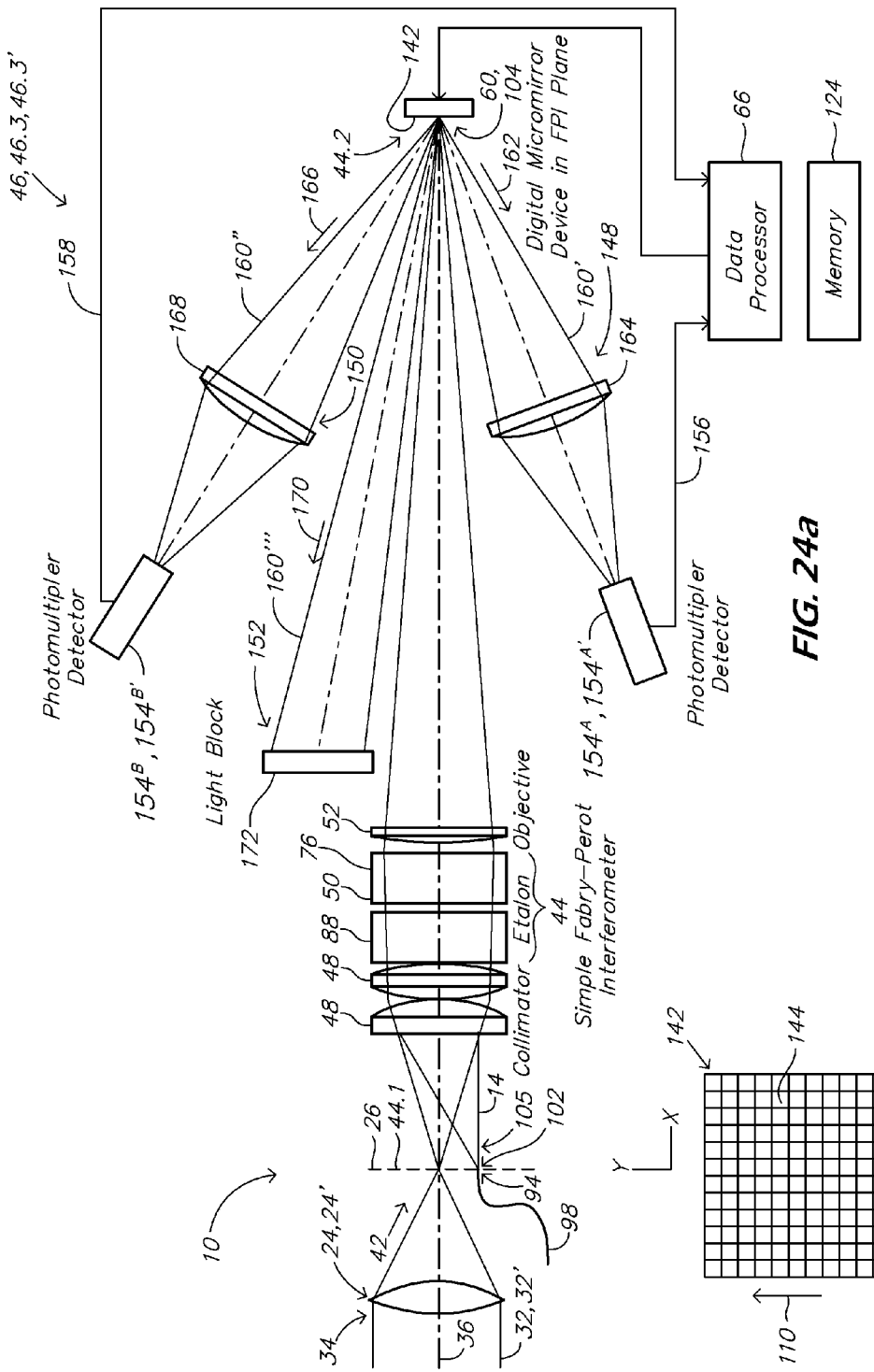
*FIG. 24a*
*FIG. 24b*

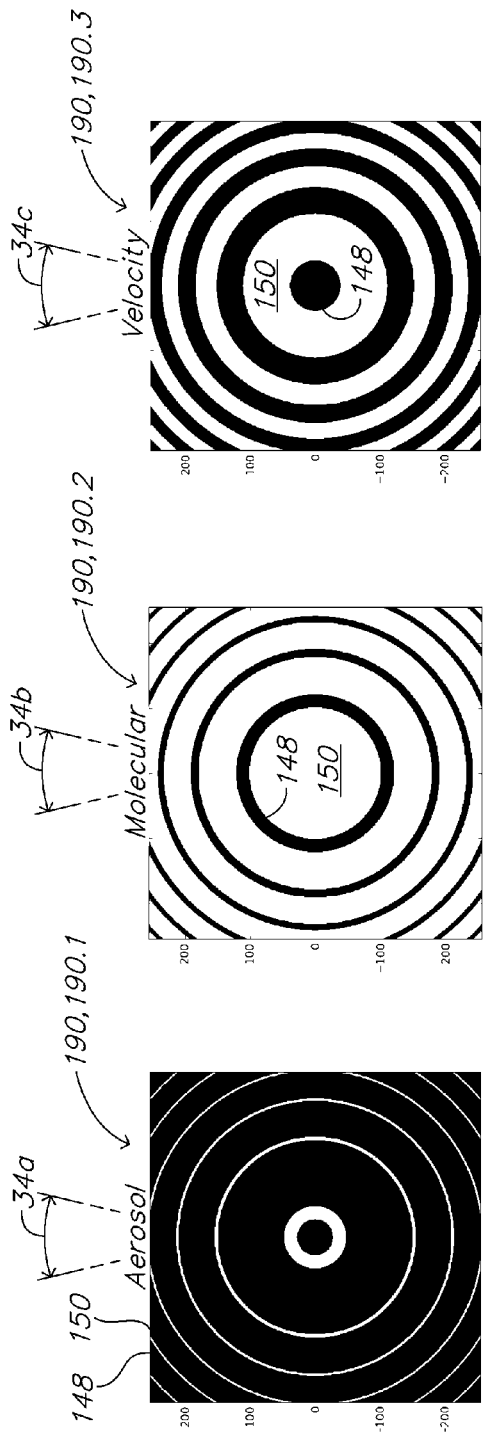
FIG. 29 Aerosol
FIG. 30 Molecular
FIG. 31 Velocity
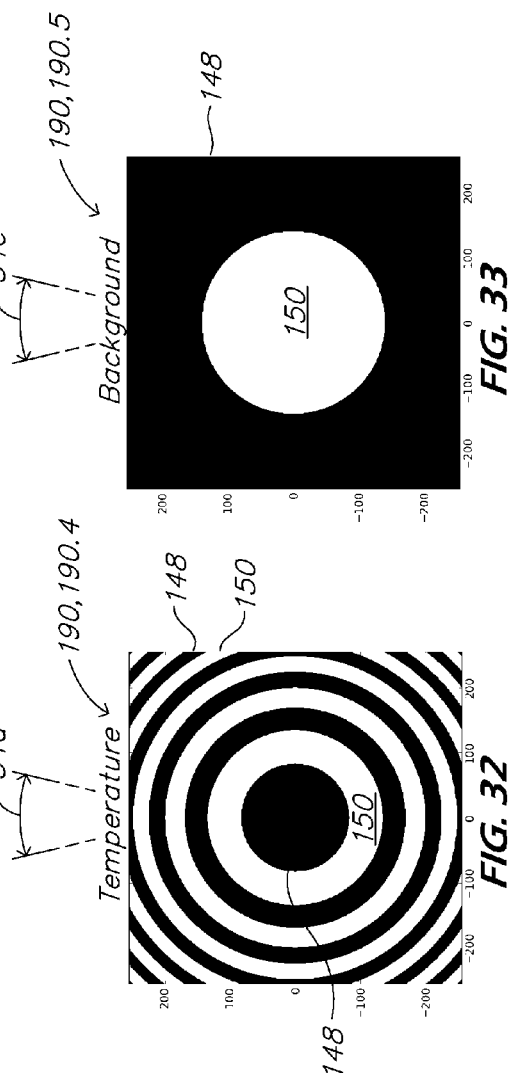
FIG. 32 Temperature
FIG. 33 Background

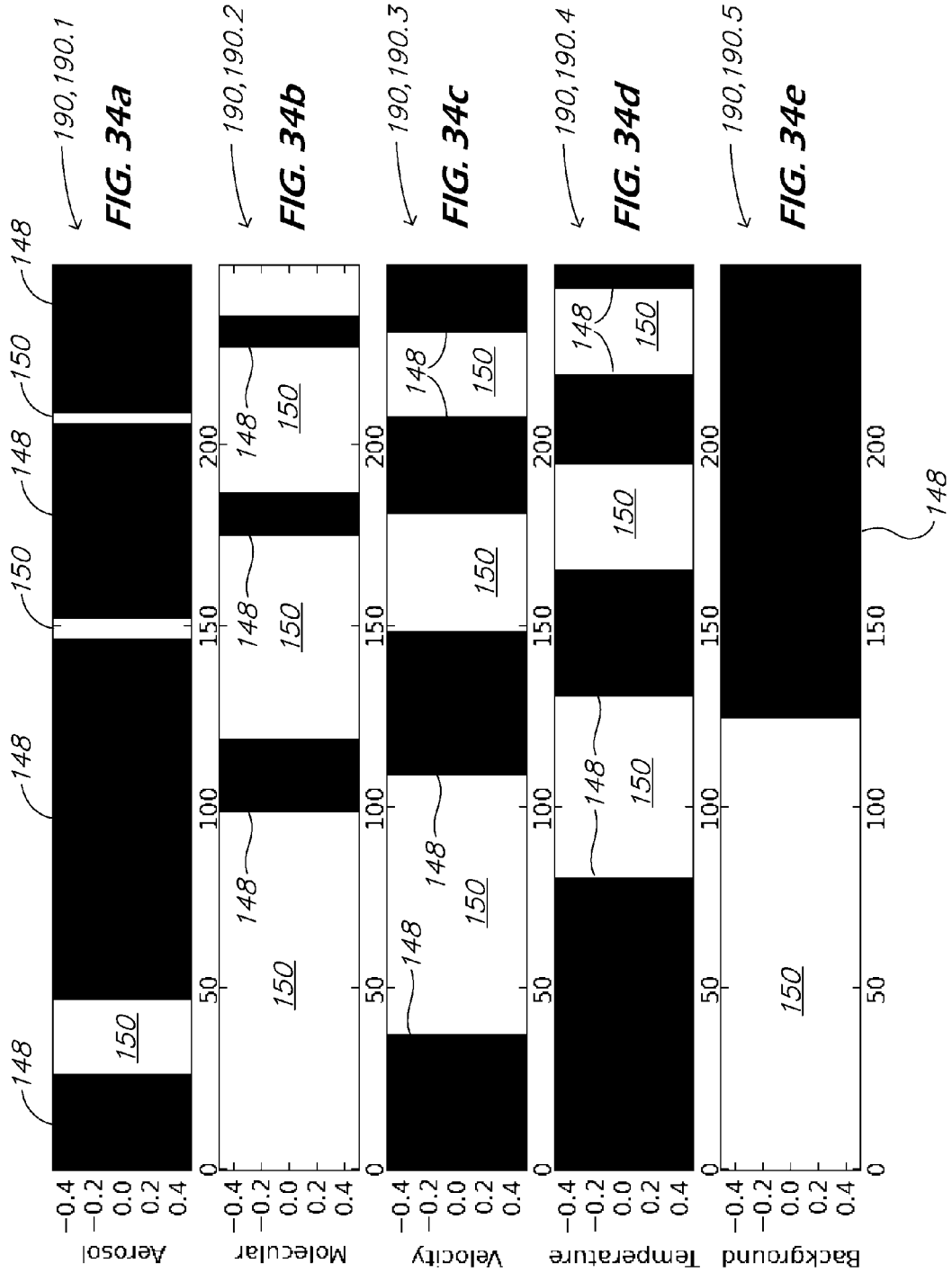

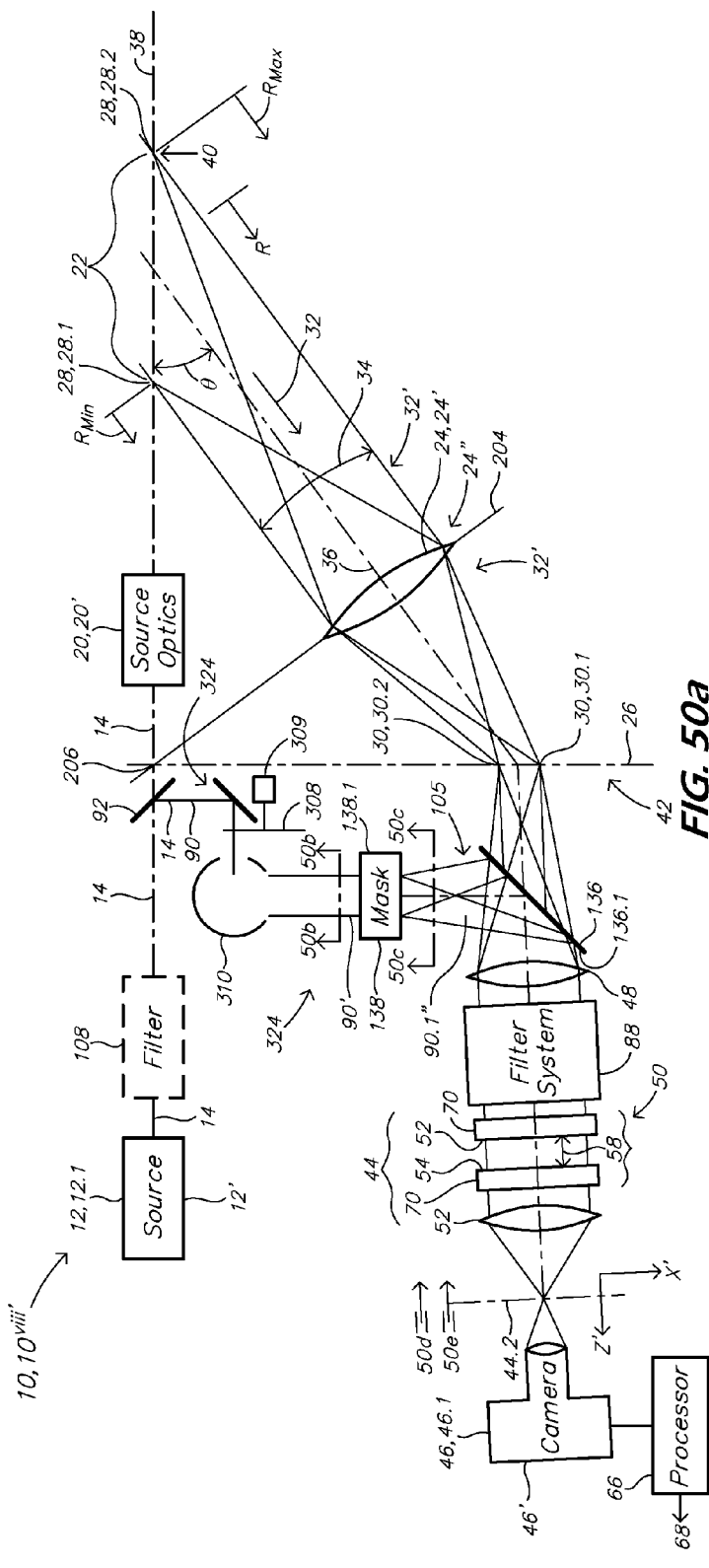
FIG. 50a
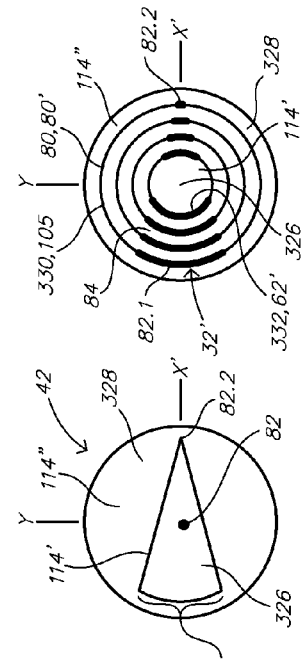
FIG. 50b
FIG. 50c
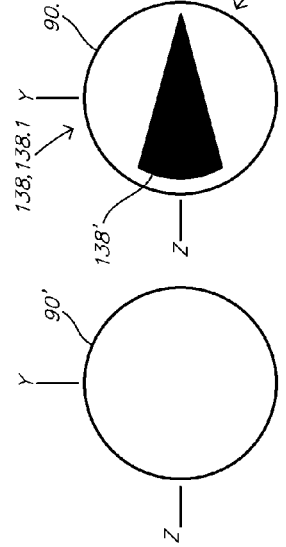
FIG. 50d
FIG. 50e

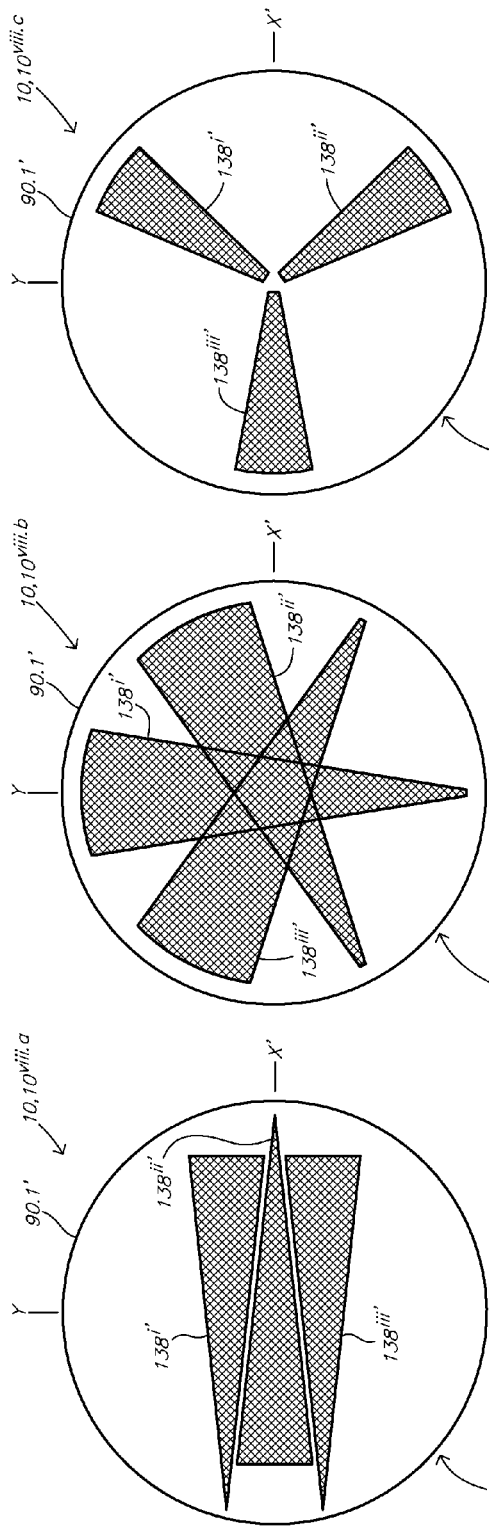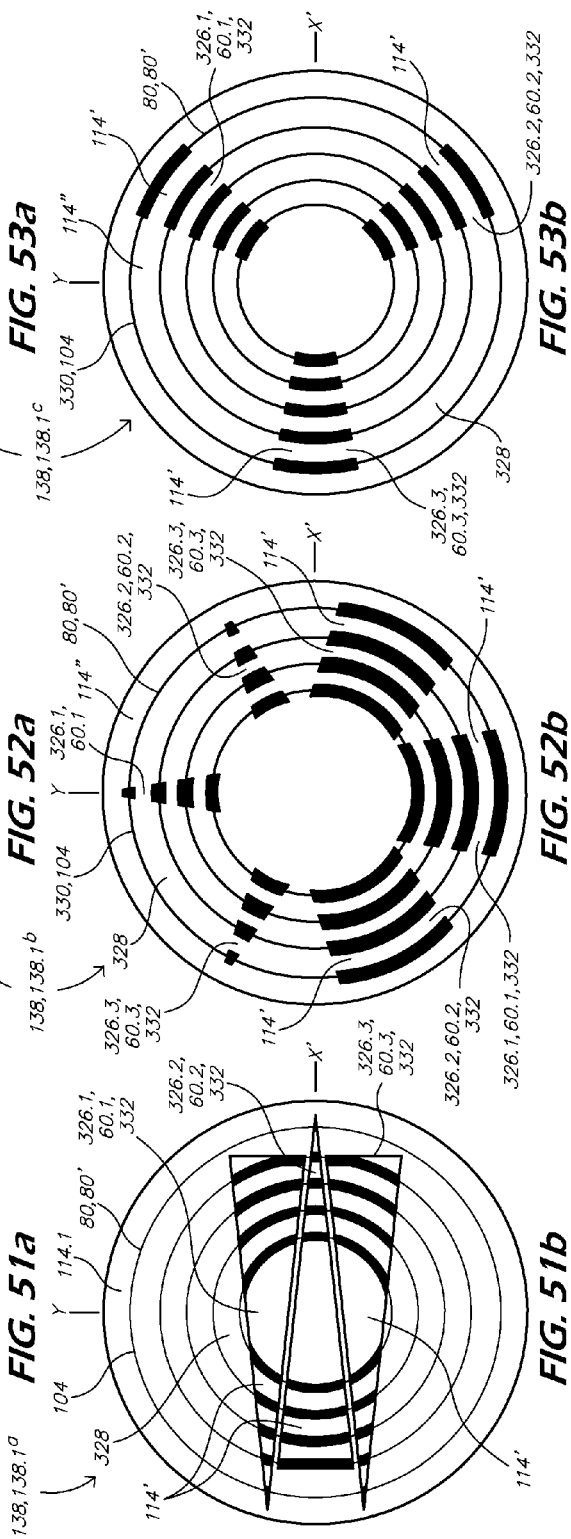

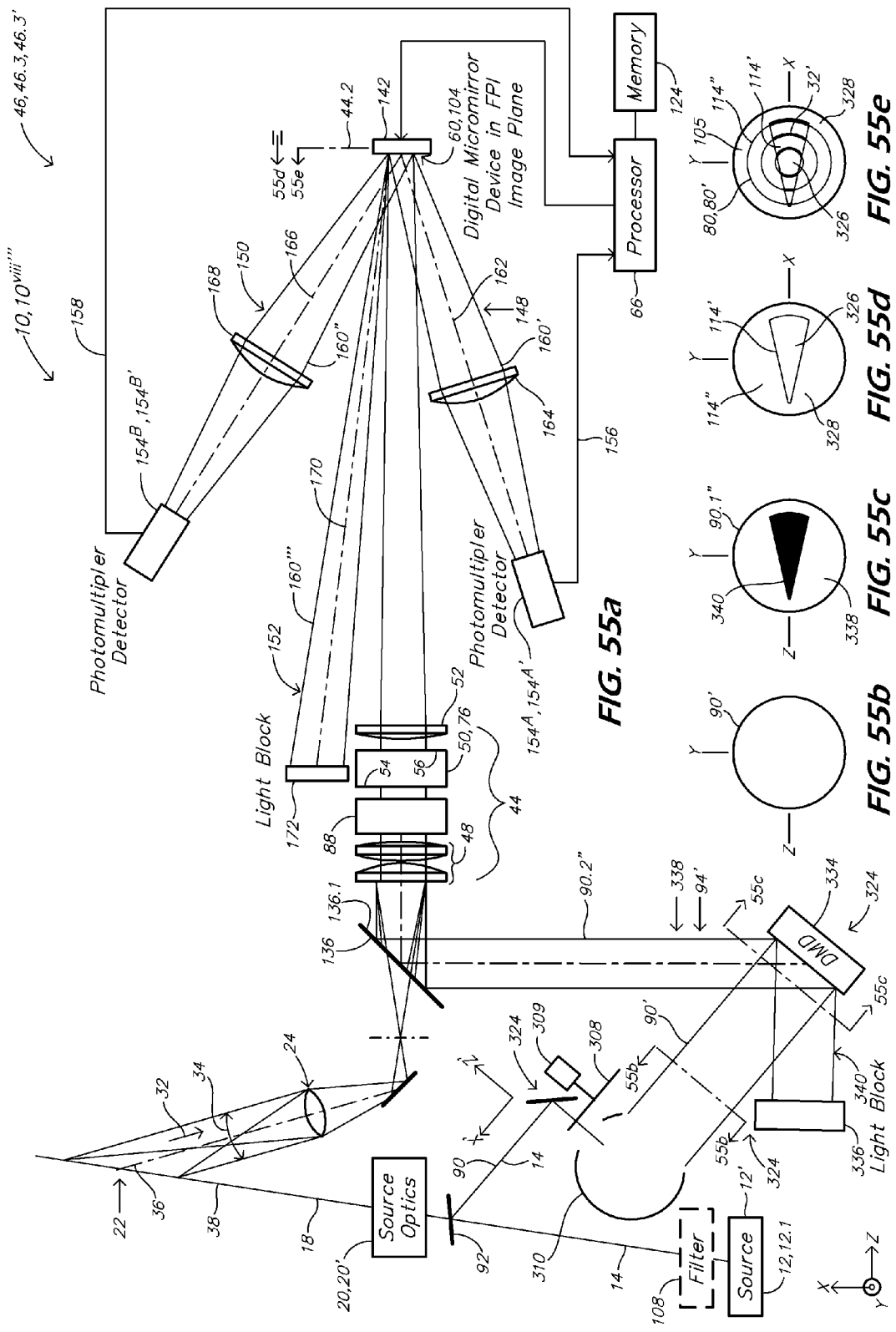

RANGE IMAGING LIDAR

CROSS-REFERENCE TO RELATED APPLICATIONS

The instant application claims benefit of priority from U.S. Provisional Patent Application Ser. No. 61/178,550, filed on May 15, 2009, and U.S. Provisional Patent Application Ser. No. 61/290,004, filed on Dec. 24, 2009. The entire content of each of the above-identified applications is incorporated herein by reference.

BRIEF DESCRIPTION OF THE DRAWINGS

FIG. 3 illustrates an example of a composite of an image of scattered light from an interaction region and an associated reference beam, as input to a Fabry-Pérot interferometer of the first aspect of the range imaging LIDAR system illustrated in FIG. 1a;

FIG. 5b illustrates a plot of signal intensity as a function of range from the LIDAR system to the interaction region, corresponding to the plot illustrated in FIG. 5a;

FIG. 9b illustrates an alternate decision block of the first aspect of a circular binning process illustrated in FIG. 9a;

FIG. 24a illustrates a first embodiment of a third aspect of an associated detection system of a range imaging LIDAR system;

FIG. 24b illustrates a plan view of a digital micromirror device (DVD) used in the embodiments illustrated in FIG. 24a.

FIG. 27 illustrates a partial derivative with respect to velocity of the intensity distribution of FIG. 11a;

FIG. 28 illustrates a partial derivative with respect to temperature of the intensity distribution of FIG. 11a;

FIG. 29 illustrates a set of complementary reflection patterns of a digital micromirror device programmed to gather associated complementary aerosol signal components;

FIG. 30 illustrates a set of complementary reflection patterns of a digital micromirror device programmed to gather associated complementary molecular signal components;

FIG. 31 illustrates a set of complementary reflection patterns of a digital micromirror device programmed to gather associated complementary velocity signal components;

FIG. 32 illustrates a set of complementary reflection patterns of a digital micromirror device programmed to gather associated complementary temperature signal components;

FIG. 33 illustrates a set of complementary reflection patterns of a digital micromirror device programmed to gather associated complementary background signal components;

FIGS. 34a-e illustrate radial cross-sections through the complementary reflection patterns illustrated in FIGS. 29-33, respectively;

FIG. 50a illustrates a first embodiment of an eighth aspect of a range imaging LIDAR system incorporating a first aspect of the associated mask system and the first aspect of an associated detection system;

FIG. 50b illustrates a transverse cross-section of an expanded reference beam of light associated with the range imaging LIDAR system illustrated in FIG. 50a;

FIG. 50c illustrates a transverse cross-section of the expanded reference beam of light after passing through a mask associated with the range imaging LIDAR system illustrated in FIG. 50a;

FIG. 50d illustrates an image that would be produced by a Fabry-Pérot interferometer of the range imaging LIDAR system illustrated in FIG. 50a if the associated Fabry-Pérot etalon were removed therefrom, corresponding to an image of the light signals entering the Fabry-Pérot interferometer;

FIG. 50e illustrates an image from the Fabry-Pérot interferometer of the range imaging LIDAR system illustrated in FIG. 50a;

FIG. 51a illustrates a transverse cross-section of an expanded reference beam of light after passing through a mask associated with a first aspect of plural fringe patterns generated by a first variation of the eighth aspect of a range imaging LIDAR system used to process light signals from plurality of associated regions of interest;

FIG. 51b illustrates an image from the Fabry-Pérot interferometer of the range imaging LIDAR system associated with the image illustrated in FIG. 51a;

FIG. 52a illustrates a transverse cross-section of an expanded reference beam of light after passing through a mask associated with a second aspect of plural fringe patterns generated by a second variation of the eighth aspect of a range imaging LIDAR system used to process light signals from plurality of associated regions of interest;

FIG. 52b illustrates an image from the Fabry-Pérot interferometer of the range imaging LIDAR system associated with the image illustrated in FIG. 52a;

FIG. 53a illustrates a transverse cross-section of an expanded reference beam of light after passing through a mask associated with a third aspect of plural fringe patterns generated by a third variation of the eighth aspect of a range imaging LIDAR system used to process light signals from plurality of associated regions of interest;

FIG. 53b illustrates an image from the Fabry-Pérot interferometer of the range imaging LIDAR system associated with the image illustrated in FIG. 53a;

FIG. 55a-e illustrates a third embodiment of the eighth aspect of a range imaging LIDAR system incorporating a second aspect of the associated mask system and the third aspect of an associated detection system;

DESCRIPTION OF EMBODIMENT(S)

Figures 1A, 1B, 1C:
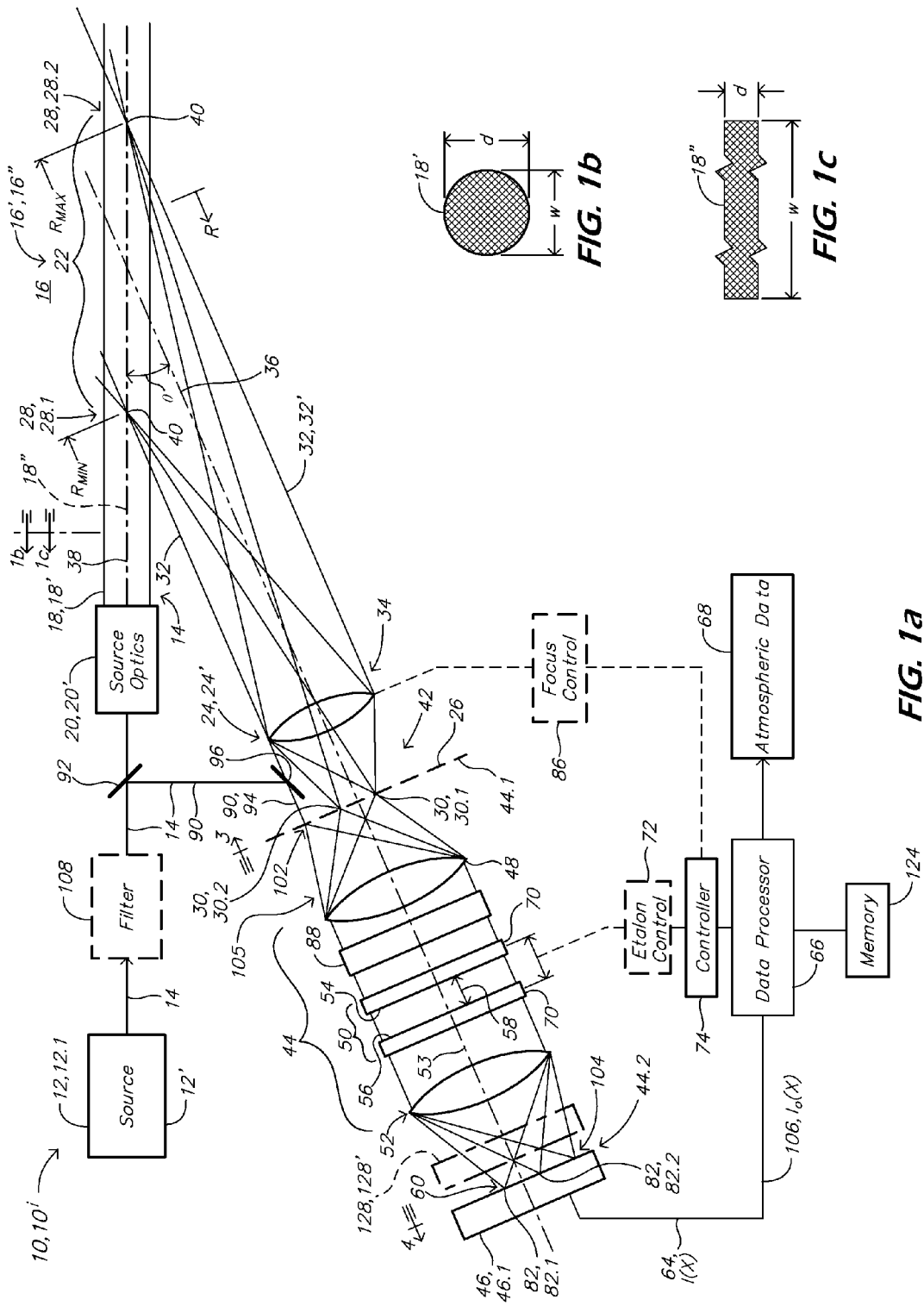
FIG. 1a illustrates a first set of embodiments of a first aspect of a range imaging LIDAR system.
FIG. 1b illustrates a transverse cross-section of a first embodiment of a beam of light.
FIG. 1c illustrates a transverse cross-section of a second embodiment of a beam of light.

Referring to FIG. 1a, in accordance with a first aspect, a range imaging LIDAR system 10, 10$^i$ incorporates a light source 12 that provides for generating at least substantially monochromatic light 14, which is projected into the atmosphere 16 as a beam of light 18 through and by associated source optics 20. For example, the source optics 20 may comprise a lens assembly 20' that provides for the width and divergence of the beam of light 18, and a suitable location of the associated beam waist thereof, so as to illuminate an interaction region 22 within the atmosphere 16 that is detectable by the range imaging LIDAR system 10, 10$^i$, wherein the beam width within the interaction region 22 establishes the associated transverse spatial resolution limit of the range imaging LIDAR system 10, 10$^i$. For example, referring to FIG. 1b, the source optics 20 may be configured so as to provide for a pencil-like beam of light 18' having a limited width w and depth d, for example, of circular or elliptical cross-section, so as to limit the associated width w and depth d of the associated interaction region 22. As another example, referring to FIG. 1c, the source optics 20 may be configured so as to provide for a sheet-like beam of light 18″—for example, using source optics 20 comprising cylindrical optics—having a limited depth d but an extended width w, for example, so as provide for an associated interaction region 22 with a corresponding extended width w, so as to provide for probing extending regions of the atmosphere 16.

A set of receiver optics 24, for example, a telescope 24', laterally offset from the beam of light 18, provides for imaging a portion of the beam of light 18 onto an intermediate image plane 26, so as to provide for a one-to-one mapping of volumetric elements 28 within the beam of light 18 and corresponding associated regions or points 30 in the intermediate image plane 26. More particularly, the beam of light 18 illuminates molecules 16' or aerosols 16″ of the atmosphere 16, or a combination thereof, within the interaction region 22, which in turn scatter the monochromatic light 14 of the beam of light 18. The resulting scattered light 32 within the field-of-view 34 of the receiver optics 24 is collected thereby and imaged onto the intermediate image plane 26. The receiver optics 24 is laterally offset from and points towards the beam of light 18, so that the optic axis 36 of the receiver optics 24 is inclined relative to the optic axis 38 of the beam of light 18 at an associated parallax angle θ. Accordingly, each volumetric element 28 of the beam of light 18 imaged onto a corresponding region or point 30 on the intermediate image plane 26 corresponds to a different nominal range R from the intermediate image plane 26 to a point 40 on the optic axis 38 of the beam of light 18 associated with the corresponding volumetric element 28. Accordingly, each region or point 30 on the intermediate image plane 26, corresponding to the volumetric element 28 of the beam of light 18 within the field-of-view 34 of the receiver optics 24, corresponds to a different nominal range R. Accordingly, different regions or points 30 of the intermediate image 42 in the intermediate image plane 26 correspond to different nominal ranges R to the beam of light 18, and therefore correspond to different nominal ranges R to the associated volumetric elements 28 thereof within the interaction region 22. For example, as illustrated in FIG. 1a, a closest volumetric element 28.1 of the beam of light 18 within the field-of-view 34 of the receiver optics 24 located at a closest nominal range $R_{MIN}$ from the intermediate image plane 26 is imaged as a corresponding first region or point 30.1 on the intermediate image plane 26, and a farthest volumetric element 28.2 of the beam of light 18 within the field-of-view 34 of the receiver optics 24 located at a farthest nominal range $R_{MAX}$ from the intermediate image plane 26 is imaged as a corresponding second region or point 30.2 on the intermediate image plane 26. Furthermore, scattered light 32 from different volumetric elements 28 is imaged onto the intermediate image plane 26 at corresponding different angles of incidence relative thereto. The range R to the interaction region 22 is defined by the geometry of the associated beam of light 18 and the corresponding receiver optics 24. The receiver optics 24 can be in focus for one of a plurality of different ranges to the beam of light 18, so that for volumetric elements 28 of the beam of light 18 not in focus, the corresponding images thereof in the intermediate image plane 26, i.e. the corresponding regions or points 30 thereon, will be unfocused and therefore blurred. The range R within the interaction region 22 can optionally be further resolved with associated temporal range gating, or range-resolved imaging, of the associated scattered light 32 if desired or necessary for a particular application.

Figure 2:
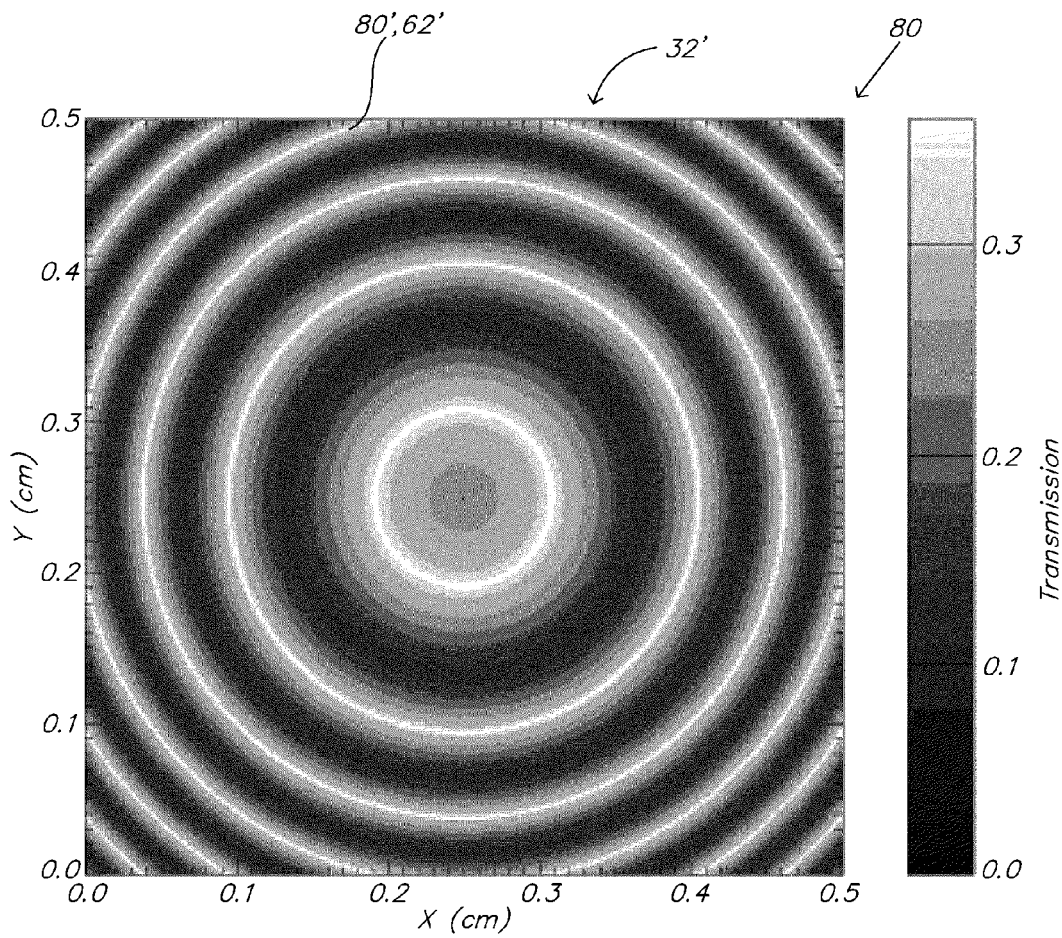
FIG. 2 illustrates a half-tone image of fringes from a fully illuminated Fabry-Pérot etalon.

The range imaging LIDAR system 10, 10$^i$ further comprises a Fabry-Pérot interferometer 44 having an input focal plane 44.1 and an output focal plane 44.2. The input focal plane 44.1 is collocated with the intermediate image plane 26 so as to receive scattered light 32 therefrom, which is then processed by the Fabry-Pérot interferometer 44 and imaged onto a detection system 46 located at the output focal plane 44.2. Between the input 44.1 and output 44.2 focal planes, the Fabry-Pérot interferometer 44 comprises a collimating lens 48, a Fabry-Pérot etalon 50, and imaging optics 52 spaced along an associated common optic axis 53, wherein the input focal plane 44.1 is a focal plane of the collimating lens 48, the output focal plane 44.2 is a focal plane of the imaging optics 52, and scattered light 32 at the input focal plane 44.1 entering the collimating lens 48 is substantially collimated thereby, then processed by the Fabry-Pérot etalon 50, and finally imaged onto the detection system 46 by the imaging optics 52. The Fabry-Pérot etalon 50 of the Fabry-Pérot interferometer 44 comprises first 54 and second 56 partially-reflective surfaces that are parallel to one another and separated by a fixed gap 58. The angles at which the scattered light 32 is passed through the Fabry-Pérot etalon 50 is dependent upon the optical frequency of the scattered light 32 and the length of the gap 58, resulting in an associated scatter fringe pattern 60 comprising a plurality of concentric arcuate fringes 62'—also known as Haidinger fringes—in the output focal plane 44.2 of the Fabry-Pérot interferometer 44, for example, as illustrated in FIG. 2 for a fully illuminated Fabry-Pérot interferometer 44. The scatter fringe pattern 60 is imaged onto the detection system 46 that generates a scatter electronic image signal 64 responsive thereto which is then processed as described hereinbelow by an associated data processor 66 so as to generate a corresponding set of atmospheric data 68 from information in the scatter fringe pattern 60.

For example, in one embodiment, the Fabry-Pérot etalon 50 comprises a pair of planar optical windows 70—for example, constructed of either optical glass or fused quartz—aligned parallel to and facing one another, and spaced apart from one another by the gap 58, wherein, for example, the first 54 and second 56 partially-reflective surfaces—e.g. partially-silvered surfaces or other partially-reflective surfaces—are on separate facing surfaces of the planar optical windows 70. Alternatively, the first 54 and second 56 partially-reflective surfaces could be on the outside opposing faces of the planar optical windows 70, or one of the first 54 and second 56 partially-reflective surfaces could be on a inner facing surface of one of the planar optical windows 70, and the other of the first 54 and second 56 partially-reflective surfaces could be on a outer facing surface of the other of the planar optical windows 70. In one embodiment, the gap 58 is substantially fixed, whereas in other embodiments, the gap 58 is moveable, e.g. adjustable, for example, using an etalon control actuator 72 responsive to a controller 74 operatively associated with or a part of the data processor 66, so as to provide for a tunable Fabry-Pérot etalon 50.

Figure 1D:
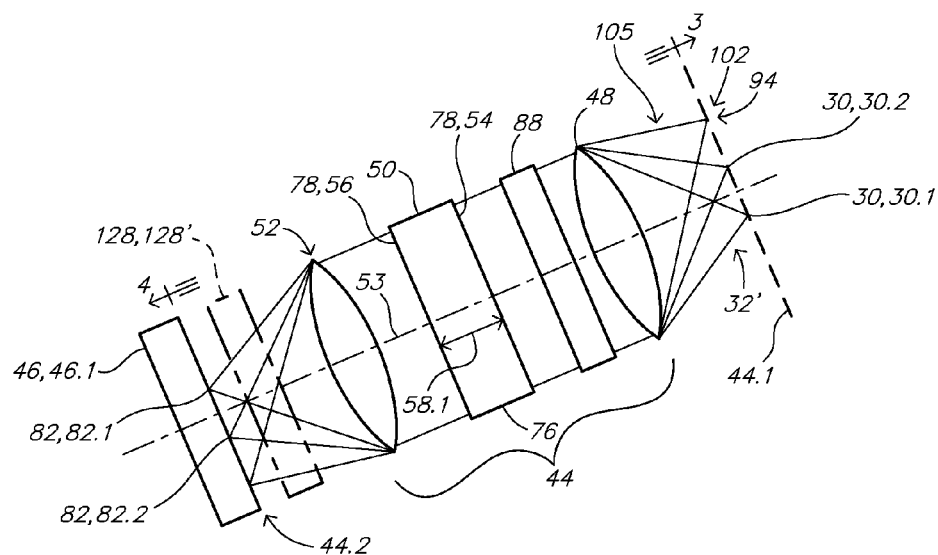
FIG. 1d illustrates a second aspect of a Fabry-Pérot interferometer of a range imaging LIDAR system.

Referring to FIG. 1d, alternatively, the Fabry-Pérot etalon 50 could comprise a solid optical element 76—for example, constructed of either optical glass or fused quartz—with planar parallel faces 78 comprising first 54 and second 56 partially-reflective surfaces separated by a gap 58.1 constituting the length of the solid optical element 76.

Referring to FIG. 2, for a fully-illuminated Fabry-Pérot etalon 50, the resulting associated circular fringe pattern 80 is in the form of closed concentric circular fringes 80' centered about the optic axis 53 of the imaging optics 52. For example, a typical circular fringe pattern 80 is illustrated in FIG. 2 for an associated scattered light signal 32' that has been source thermally broadened by a medium comprising both aerosols and molecules. The light scattered from the molecules is spread over the shaded regions of the circular fringe pattern 80 in FIG. 2, and the light scattered from the heavy, slow moving aerosols is contained in the narrow white rings. The associated atmospheric state variables affect the circular fringe pattern 80 in different ways. Wind induced Doppler shifts change the diameter of the rings, and the constant that determines Doppler shift is dependent upon temperature. Atmospheric (molecular) temperature affects the width of molecular rings. Aerosol density controls the intensity of the narrow white rings and molecular density increases the brightness of the shaded regions in FIG. 2. Accordingly, wind velocity, density, and temperature can be determined directly from the circular fringe pattern 80.

Figure 3:
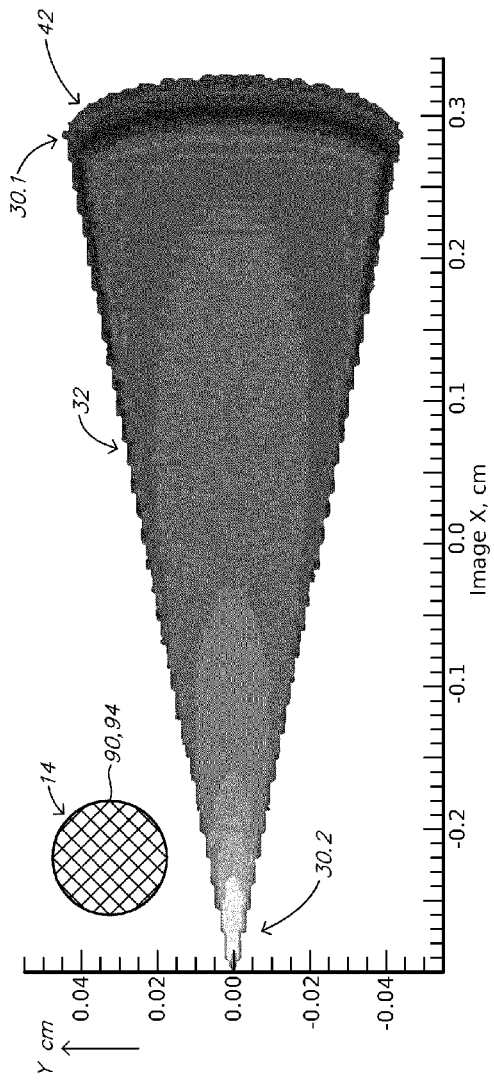

For example, referring to FIG. 3, a simulated image in the intermediate image plane 26 is illustrated for a beam of light 18 having a beam radius of 0.1 centimeters (cm) and a half-angle of divergence of 0.05 milliradians, and for receiver optics 24 having an aperture radius of 2.5 centimeter and a focal length of 15 cm, separated from the beam of light 18 by 35 cm, for which the range R to beam of light 18 within the field-of-view 34 of the receiver optics 24 ranged from $R_{MIN}=8$ meters to the closest volumetric element 28.1 to $R_{MAX}=500$ meters to the farthest volumetric element 28.2, respectively, with the receiver optics 24 focused at the farthest volumetric element 28.2. Accordingly, as illustrated in FIG. 3, the second region or point 30.2 in the intermediate image plane 26 corresponding to the farthest volumetric element 28.2 is most sharply focused, and the first region or point 30.1 in the intermediate image plane 26 corresponding to the closest volumetric element 28.1 is the most blurred, with the amount of blurring and therefore the associated size of regions or points 30 in the intermediate image plane 26 therebetween increasing with decreasing corresponding associated nominal range R from the second region or point 30.2 to the first region or point 30.1, thereby giving the associated intermediate image 42 of the interaction region 22 of the beam of light 18 a wedge-shaped profile.

Absent the Fabry-Pérot etalon 50, the associated collimating lens 48 and imaging optics 52 provide for imaging the intermediate image plane 26 onto the output focal plane 44.2 that is detected by the detection system 46. Accordingly, the first 30.1 and second 30.2 regions or points on the intermediate image plane 26—corresponding to the closest 28.1 and farthest 28.2 volumetric elements of the beam of light 18 within the field-of-view 34 of the receiver optics 24—are imaged as corresponding first 82.1 and second 82.2 regions or points on the output focal plane 44.2. More generally, there is a one-to-one correspondence between regions or points 82 on the output focal plane 44.2 and corresponding volumetric elements 28 of the beam of light 18, and therefore, there is a one-to-one correspondence between regions or points 82 on the output focal plane 44.2 and the corresponding nominal range R thereto, given the parallax angle θ between the optic axes 36, 38 of the receiver optics 24 and the beam of light 18, respectively, so that the nominal range R associated with any region or point 82 on the output focal plane 44.2—or in the associated corresponding scatter electronic image signal 64 detected by the detection system 46—can be inferred from the location of that region or point 82 on the output focal plane 44.2. With the Fabry-Pérot etalon 50 present, the arcuate fringes 62' of the scatter fringe pattern 60 are present for those regions or points 82 for which the associated frequency or wavelength of the associated scattered light 32 in cooperation with the gap 58 of the Fabry-Pérot etalon 50 provide for constructive interference, whereas arcuate nulls 84 in the scatter fringe pattern 60 are present for those regions or points 82 for which the associated frequency or wavelength of the associated scattered light 32 in cooperation with the gap 58 of the Fabry-Pérot etalon 50 provide for destructive interference. Locations of the arcuate fringes 62' are determined by the frequency or wavelength of the associated scattered light 32, the gap 58 of the Fabry-Pérot etalon 50 and the angle of incidence in the Fabry-Pérot etalon 50.

Figure 4:
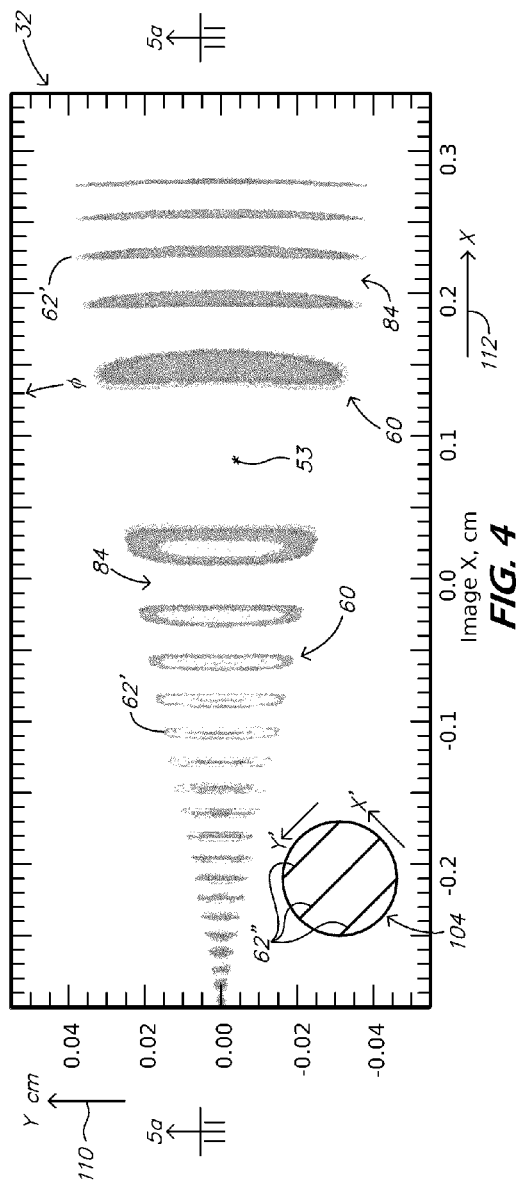
FIG. 4 illustrates an example of an image of a fringe pattern output from the Fabry-Pérot interferometer, and the input to an associated detection system, of the first aspect of the range imaging LIDAR system illustrated in FIG. 1a, processing the image illustrated in FIG. 3.
Figure 5A:
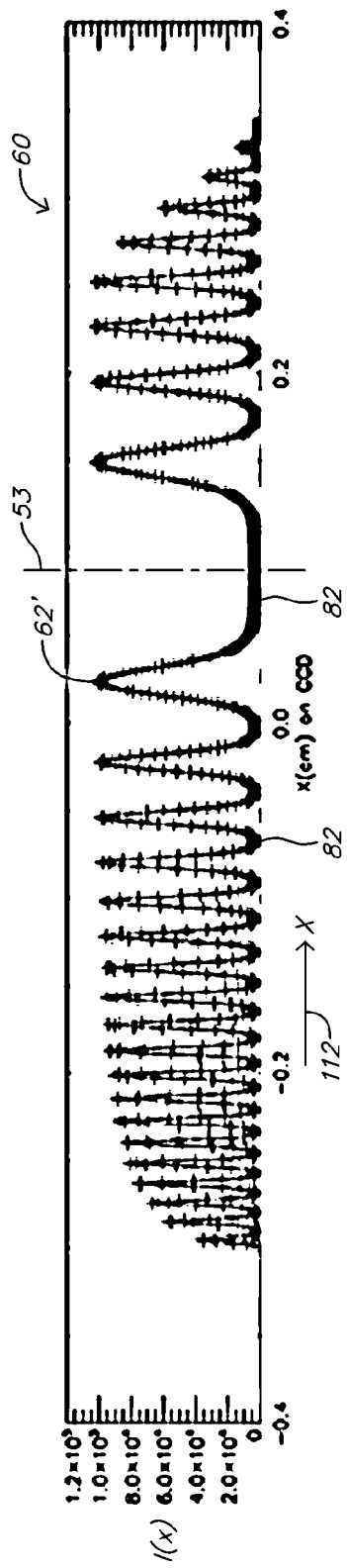
FIG. 5a illustrates a plot of signal intensity as a function of image distance of the fringe pattern illustrated in FIG. 4.
Figure 5B:
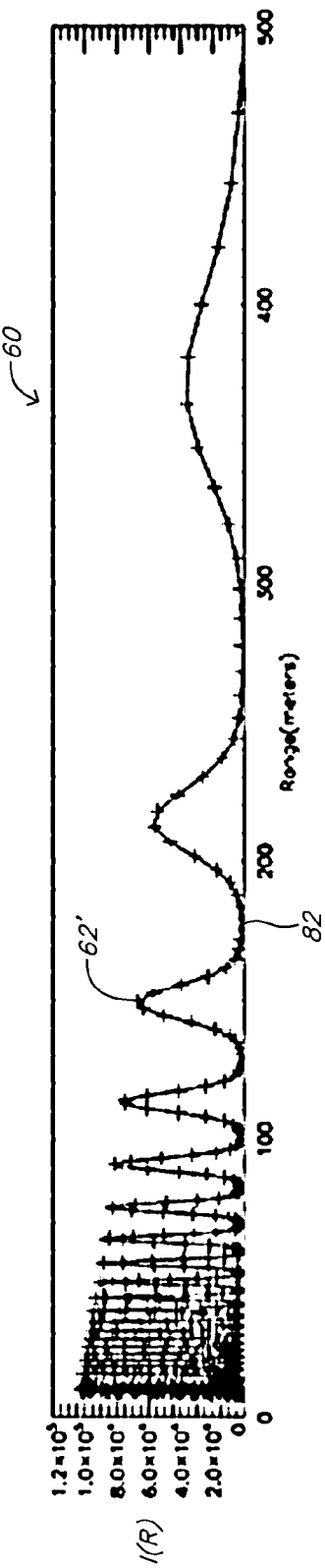

For example, for the conditions described hereinabove for FIG. 3, FIG. 4 illustrates a simulation of a resulting scatter fringe pattern 60 for a solid Fabry-Pérot etalon 50 having a thickness, or gap 58.1, of 0.7 cm and an associated reflectivity of 0.85. As with the associated intermediate image 42, with the receiver optics 24 in focus at the farthest nominal range $R_{MAX}$, the arcuate fringes 62' associated with relatively closer volumetric elements 28 of the beam of light 18 are transversely broadened relative to those associated with relatively farther volumetric elements 28, so that the scatter fringe pattern 60 exhibits a wedge-shaped profile similar to that of the intermediate image 42, wherein the radial size of the associated arcuate nulls 84 decreases with increasing fringe order relative to the optic axis 53 of the Fabry-Pérot interferometer 44. FIG. 5a illustrates a plot of the intensity of the scatter fringe pattern 60 along a section thereof through the optic axis 53 as a function of distance in the output focal plane 44.2, which is transformed in FIG. 5b to a plot of the intensity of the scatter fringe pattern 60 as a function of nominal range R. The nominal range R for which the intermediate image 42 and the associated scatter fringe pattern 60 are in focus can be set to improve the sharpness of the associated range resolution at any particular nominal range R, for example, either using an associated fixed focal setting, or using a focus control actuator 86 responsive to a signal from the controller 74.

The locations of the arcuate fringes 62' and associated arcuate nulls 84 can be changed by either changing the gap 58 of the Fabry-Pérot etalon 50, for example, by the etalon control actuator 72 responsive to a signal from the controller 74, or by tilting the Fabry-Pérot etalon 50. For example, the gap 58 of the Fabry-Pérot etalon 50 could be repeatedly scanned by the etalon control actuator 72 responsive to a signal from the controller 74 so as to repeatedly generate associated sets of scatter fringe pattern 60 collectively having arcuate fringes 62' associated with all nominal ranges R to the beam of light 18 within the field-of-view 34 of the receiver optics 24, so as to directly provide for associated atmospheric data 68 at any particular nominal range R within the range of associated nominal ranges R from $R_{MIN}$ to $R_{MAX}$.

The range imaging LIDAR system 10, 10' provides for directly detecting light scattered off of either molecules 16' of the atmosphere, aerosols 16" in the atmosphere, or a combination of the two, and provides for directly measuring the density and temperature of the atmosphere 16, and the velocity thereof in the direction of the optic axis 36 of the receiver optics 24. For example, relatively short wavelength light is scattered by molecules 16' of the atmosphere in accordance with Rayleigh scattering. Light can also be scattered by aerosols 16" in the atmosphere in accordance with Mie scattering. Rayleigh scattering generally refers to the scattering of light by either molecules or particles having a size less than about $\frac{1}{10}^{th}$ the wavelength of the light, whereas Mie scattering generally refers to scattering of light by particles greater than $\frac{1}{10}^{th}$ the wavelength of the light. Being responsive to Rayleigh scattering, the range imaging LIDAR system 10, 10' is therefore responsive to the properties—e.g. velocity, density and temperature—of those molecules 16' in the atmosphere giving rise to the associated scattering of the light detected by the range imaging LIDAR system 10, 10'. Furthermore, the range imaging LIDAR system 10, 10$^i$ can provide for operation in clean air, i.e. in an atmosphere with no more than a negligible amount of aerosols 16", depending substantially upon only molecular scatter. If scattered from a moving molecule 16' or aerosol 16", the frequency scattered light 32 is Doppler shifted, which for a given gap 58 in the associated Fabry-Pérot etalon 50 thereby causes the associated arcuate fringes 62' of the scatter fringe pattern 60 from the Fabry-Pérot interferometer 44 to be shifted to a location for which an associated constructive interference condition is satisfied for the corresponding rays of scattered light 32 entering the Fabry-Pérot interferometer 44 at a given angle from a corresponding given nominal range R. Accordingly, the Doppler shift in the frequency of the scattered light 32 will depend upon the local velocity of the atmosphere 16 within the interaction region 22 interacting with the beam of light 18, and for different amounts of Doppler shift, arcuate fringes 62' associated with corresponding different nominal ranges R will be generated by the Fabry-Pérot interferometer 44, thereby causing the arcuate fringes 62' to shift within the scatter fringe pattern 60—possibly relative to one another depending upon the distribution of velocity of the atmosphere 16 within the interaction region 22.

The range imaging LIDAR system 10, 10$^i$ further incorporates a filter system 88 to filter the scattered light 32 received by the receiver optics 24 so as to prevent background light from being detected by the detection system 46. For example, referring to FIGS. 1a, 1d and 6, in one set of embodiments, the filter system 88 is located within the Fabry-Pérot interferometer 44 between the collimating lens 48 and the Fabry-Pérot etalon 50. For example, referring to FIG. 6, in one embodiment, the filter system 88 incorporates eight bandpass filter mirrors 88' having associated filter pass bands centered about the operating frequency of the light source 12 The filter system 88 exhibits high out-of-band rejection, as well as low in-band attenuation, and the bandwidth of the filter system 88 is sufficiently narrow so as to substantially filter or remove components of solar radiation or stray light in the collected scattered light 32, yet sufficiently broad so as to be substantially larger than the bandwidth of the thermally-broadened spectrum in combination with the largest expected associated Doppler shift. For example, in one embodiment, the filter system 88 is adapted so as to provide for maximum filtering of light frequencies that are outside the frequency band of interest, e.g. greater than about 2 nanometers (nm) above or below the nominal center frequency of the light source 12.

Figure 6:
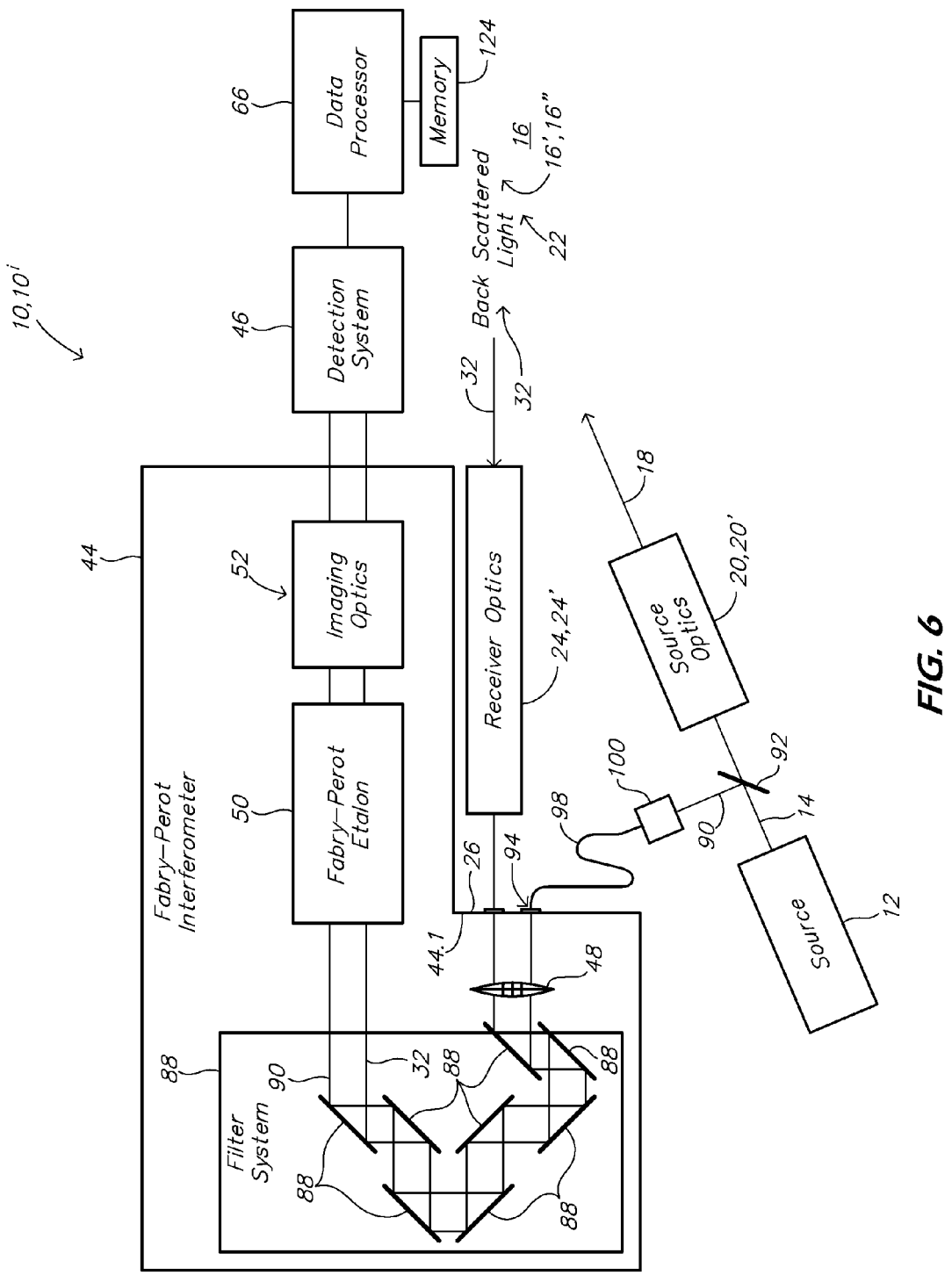
FIG. 6 illustrates a third aspect of a Fabry-Pérot interferometer of a range imaging LIDAR system.

The Fabry-Pérot interferometer 44 is subject to mechanical defects and thermally induced drift that can be compensated through calibration using a reference beam portion 90 of the substantially monochromatic light 14 extracted from the light source 12 with a beam splitter optic 92 and then input to the Fabry-Pérot interferometer 44 at the intermediate image plane 26 as a reference source 94. For example, referring to FIG. 1a, in accordance with a first embodiment, the reference source 94 from the beam splitter optic 92 is directed into the Fabry-Pérot interferometer 44 with a mirror 96. Referring to FIG. 6, in accordance with a second embodiment, the reference beam portion 90 of the monochromatic light 14 extracted from the light source 12 with a beam splitter optic 92 as the reference source 94 is input to fiber optic 98, for example, using a graded index (GRIN) lens 100, the output of which is located at the intermediate image plane 26 so as to illuminate the collimating lens 48 of the Fabry-Pérot interferometer 44 therefrom. Accordingly, for either embodiment, the reference source 94 is input to the Fabry-Pérot interferometer 44 from a location 102 on the intermediate image plane 26/input focal plane 44.1 that is distinct from the intermediate image 42 of the scattered light 32, and is processed by the Fabry-Pérot interferometer 44 so as to generate a corresponding reference fringe pattern 104 comprising one or more associated arcuate fringes 62" at a corresponding location on the output focal plane 44.2, which is then detected by the detection system 46 so as to generate a corresponding reference electronic image signal 106 responsive thereto, which is then processed as described hereinbelow by the associated data processor 66 together with the scatter electronic image signal 64 associated with the scatter fringe pattern 60 from the scattered light 32.

The light source 12 provides for generating a sufficient amount of sufficiently narrow-band monochromatic light 14 so as to provide for a sufficient amount of scattered light 32 so that the resulting scatter fringe pattern 60 is detectable by the detection system 46 with a sufficient signal-to-noise ratio (SNR) so that the resulting atmospheric data 68 determined therefrom is accurate within a given accuracy threshold and provides for an information temporal bandwidth that is within a given temporal bandwidth threshold. For example, the light source 12 could comprise one or more lasers, light emitting diodes (LEDs), flash lamps, for example, xenon flash lamps, sodium lamps or mercury lamps. The light source 12 may be either continuous or pulsed, and need not necessarily be coherent. If the spectral bandwidth of the light source 12 is not inherently substantially less than the expected minimum Doppler shifts to be measured, then the output of the light source 12 may be filtered with a filter 108 so as to provide for generating sufficiently monochromatic light 14 so as to enable Doppler shifts in the scattered light 32 to be measured sufficiently accurately so as to provide for resolving velocity sufficiently accurately, i.e. less than a given threshold. The particular operating wavelength of the range imaging LIDAR system 10, 10$^i$ is not limiting. For example, any optical wavelength that interacts with that which is being sensed in the associated interaction region 22 may be used.

For example, in one embodiment, the monochromatic light 14 comprises ultraviolet (UV) laser light at a wavelength of about 266 nm that is generated using a laser light source 12. A wavelength of about 266 nm, being invisible to the human eye and substantially absorbed by the atmosphere, is beneficial for its stealth, eye safety and molecular scattering properties. There is relatively little natural background light at this frequency due to absorption of most natural 266 nm light by ozone and molecular oxygen. Ultraviolet light at about 266 nm is readily absorbed by glass and plastic, such as used in aircraft wind screens, which provides for improved eye safety. The particular operating wavelength of the range imaging LIDAR system 10 is not limiting, and it should be understood that any optical wavelength that interacts with that which is being sensed in the associated interaction region 22 may be used.

For example, a Nd:YAG laser 12.1 can operate at relatively high power levels so as to provide sufficiently intense illumination so as to provide for relatively long range atmospheric sensing applications. An Nd:YAG laser 12.1 has a fundamental wavelength of 1064 nm, from which shorter wavelengths/higher frequencies may be generated using one or more harmonic generators operatively associated with or a part of the Nd:YAG laser 12.1. For example, a second-harmonic generator could be used to convert the fundamental 1064 nm light to second-harmonic 532 nm light which could then be transformed with either a third- or fourth-harmonic generator to generate associated 355 nm or 266 nm light respectively. For example, these second-, third- and/or fourth-harmonic generators may be either incorporated in, free-space coupled to, or coupled with a fiber optic to the Nd:YAG laser 12.1.

Accordingly, alternative embodiments of the range imaging LIDAR system 10, $10^i$ incorporating a Nd:YAG laser 12.1 may be operated at frequencies other than 266 nm, for example, at either the second or third harmonics, respectively, for example, as described in U.S. Pat. No. 7,495,774 which is incorporated herein by reference.

The arcuate fringes 62', 62'' of the scatter 60 and reference 104 fringe patterns are circumferentially (φ) or transversely (Y) integrated either optically prior to detection, or electronically or by software during or following detection by the detection system 46, so as to provide for corresponding detected image signals I(X) and $I_0$(X), respectively, that representing the total radiometric counts as a function of radial distance through the corresponding scatter 60 and reference 104 fringe patterns. The resulting detected image signals I(X) and $I_0$(X) are then processed by the data processor 66 as described hereinbelow so as to generate one or more measures of the atmosphere 16 as a function of nominal range R, or at a particular nominal range R, within the interaction region 22.

Generally, depending upon how the resulting scatter 64 and reference 106 electronic image signals are processed, in accordance with a first aspect, the detection system 46 may comprise either one- or two-dimensional photodetector arrays, for example, either charge-coupled devices (CCDs) or charge injection devices (CIDs); or corresponding arrays of individual photodetectors, for example, photo-conductive, photo-voltaic, photo-emissive, bolometer, or thermopile photodetectors, i.e. generally any device that converts photons to a corresponding electrical signal. The particular detection system 46 may be adapted in cooperation with the associated light source 12 so as to provide for increasing the associated signal-to-noise ratio (SNR). For example, in cooperation with a continuous light source 12, a relatively high-sensitivity, low-noise, low-bandwidth detectors can be used, so as to provide for a higher signal-to-noise ratio (SNR) than possible with corresponding relatively higher-bandwidth detectors, so as to provide for relatively more precise associated measurements. Alternatively, the detection system 46 could comprise a camera with at least one array of concentric circular-segment photodetectors for each of the images being processed.

For example, in one embodiment, to process the scatter fringe pattern 60, the range imaging LIDAR system 10, $10^i$ incorporates a linear photodetector array or a linear array of photodetectors, wherein, referring to FIG. 4, each photodetector or photodetector element of the array is sufficiently broad in the Y-direction 110 of the output focal plane 44.2 so as to provide for accumulating all of the photons at a given associated X-position, and the each photodetector or photodetector element of the array is sufficiently narrow in the X-direction 112 of the output focal plane 44.2 so as to provide for generating a corresponding one-dimensional scatter electronic image signal 64 with sufficient resolution with respect to X to solve for the associated measurements with sufficient accuracy, i.e. accuracy within a given threshold, wherein the X dimension corresponds to nominal range R to the associated volumetric elements 28 of the atmosphere 16 being measured within the beam of light 18. Similarly, one embodiment adapted to process the reference fringe pattern 104, the range imaging LIDAR system 10, $10^i$ incorporates a similar linear photodetector array or a linear array of photodetectors, wherein each photodetector or photodetector element of the array is sufficiently broad in the Y'-direction 110 of the output focal plane 44.2 so as to provide for accumulating all of the photons at a given associated X'-position, and the each photodetector or photodetector element of the array is sufficiently narrow in the X'-direction 112 of the output focal plane 44.2 so as to provide for generating a corresponding one-dimensional reference electronic image signal 106 with sufficient resolution with respect to X' to characterize the Fabry-Pérot etalon 50 sufficiently accurately so as to provide for solving for the associated measurements with sufficient accuracy, i.e. accuracy within a given threshold.

As another example, in another embodiment, to process both the scatter 60 and reference 104 fringe patterns, the range imaging LIDAR system 10, $10^i$ incorporates a two-dimensional photodetector array or a two-dimensional array of photodetectors that provide for generating associated two-dimensional scatter 64 and reference 106 electronic image signals that, for example, can then be integrated either electronically; or by a process in the data processor 66, for example, as described hereinbelow.

Scattered light signal 32' from each of the associated interaction regions 22 are substantially simultaneously processed together with a reference light signal 105 from the reference fringe pattern 104 so as to provide for calibrating, and maintaining the calibration of, the range imaging LIDAR system 10, and so as to provide for determining the associated air data products such as the speed, temperature and density of the atmosphere 16. This provides for an inherent self-calibration of the associated measurements or quantities derived therefrom. If wavelength drift of the light source 12 is not otherwise accounted for in the data, then errors can arise when making a measurement of the Doppler shift and resulting wavelength shift of the scattered light signal 32'. The range imaging LIDAR system 10 provides for automatically compensating for wavelength drift of the light source 12 from the data because each measurement from a scattered light signal 32' is corrected using a corresponding measurement from the reference light signal 105 associated with the reference source 94.

In accordance with a first aspect, the associated detection system 46.1 provides for capturing an image 114 of the scatter 60 and reference 104 fringe patterns in the output focal plane 44.2 of the Fabry-Pérot interferometer 44. For example, in one embodiment, the detection system 46.1 comprises an electronic camera, for example, a CCD detection system 46.1'.

Figure 7A:
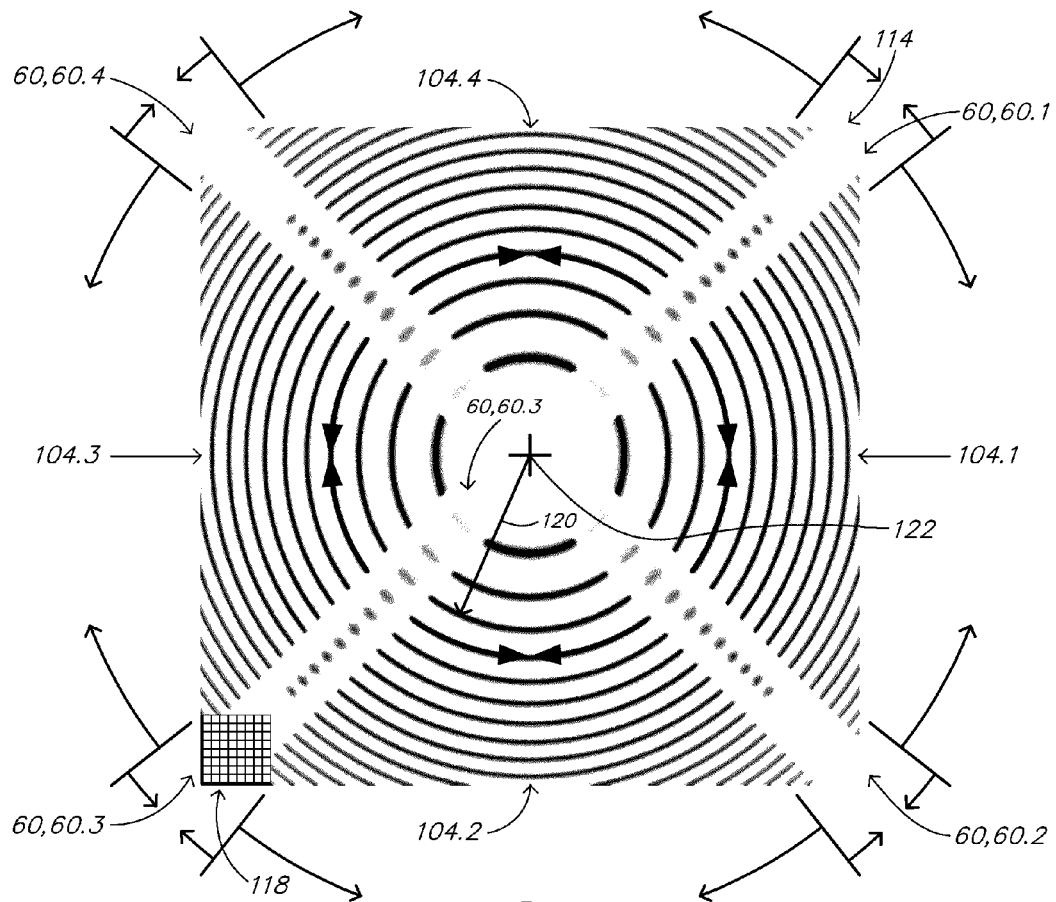
FIGS. 7a and 7b illustrate a circular image compression process operating on a fringe pattern from a Fabry-Pérot interferometer.
Figure 7B:
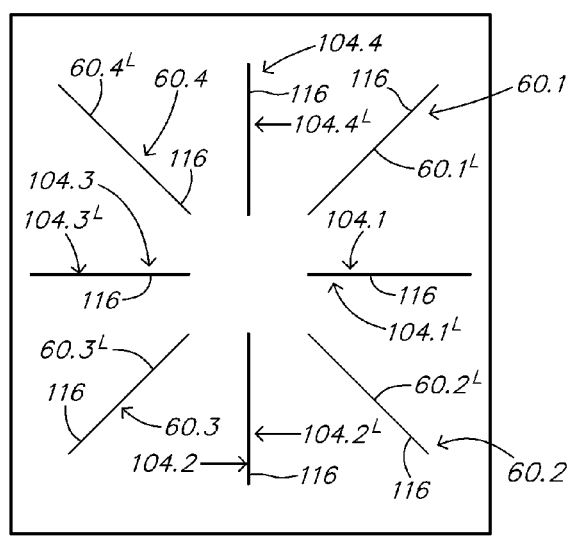

Referring to FIGS. 7a and 7b, this image 114 is then processed to azimuthally compress the associated scatter 60 and reference 104 fringe patterns into corresponding associated linear scatter $60^L$ and reference $104^L$ fringe patterns by an associated binning process to give corresponding linear sets of binned pixels 116 from which the corresponding atmospheric data 68 associated with each of the scattered light signals 32' is then determined by the data processor 66. For example, this process is illustrated in FIGS. 7a and 7b for a range imaging LIDAR system 10, $10^{viii}$ in accordance with an eighth aspect described hereinbelow, comprising four separate scattered fringe patterns 60, 60.1, 60.2, 60.3, 60.4 from four separate corresponding interaction regions 22, interleaved with a reference fringe pattern 104. In one embodiment, this is accomplished with a circular binning algorithm implemented in software on the associated data processor 66 operatively coupled to the associated CCD detection system 46.1' that provides for summing all pixels 118 at a particular radius 120 from the common center 122 of the associated circular fringe patterns 80 respectively corresponding to the first 60.1, second 60.2, third 60.3, and fourth 60.4 scatter fringe patterns and the reference fringe pattern 104 interleaved therewith divided into four separate corresponding reference fringe pattern portions 104.1, 104.2, 104.3, 104.4.

Each pixel 118 is read from the CCD detection system 46.1' and converted by an A/D conversion process. The ratio of signal to read noise can be enhanced by increasing the exposure time of the CCD detection system 46.1' between read cycles, although at the cost of reduced dynamic frequency response of the associated resulting air data products. After identifying the center 122 of the circular fringe patterns 80, the circular binning algorithm sums up the CCD charges (i.e. pixel values) for each pixel 118 at a particular radius from the center 122, for a particular circular fringe pattern 80, for each of the circular fringe patterns 80, 60.1, 60.2, 60.3, 60.4, 104.1, 104.2, 104.3, 104.4, so as to provide a respective associated linear set of binned pixels 116 for each of the respective circular fringe patterns 80, 60.1, 60.2, 60.3, 60.4, 104.1, 104.2, 104.3, 104.4.

Figure 8:
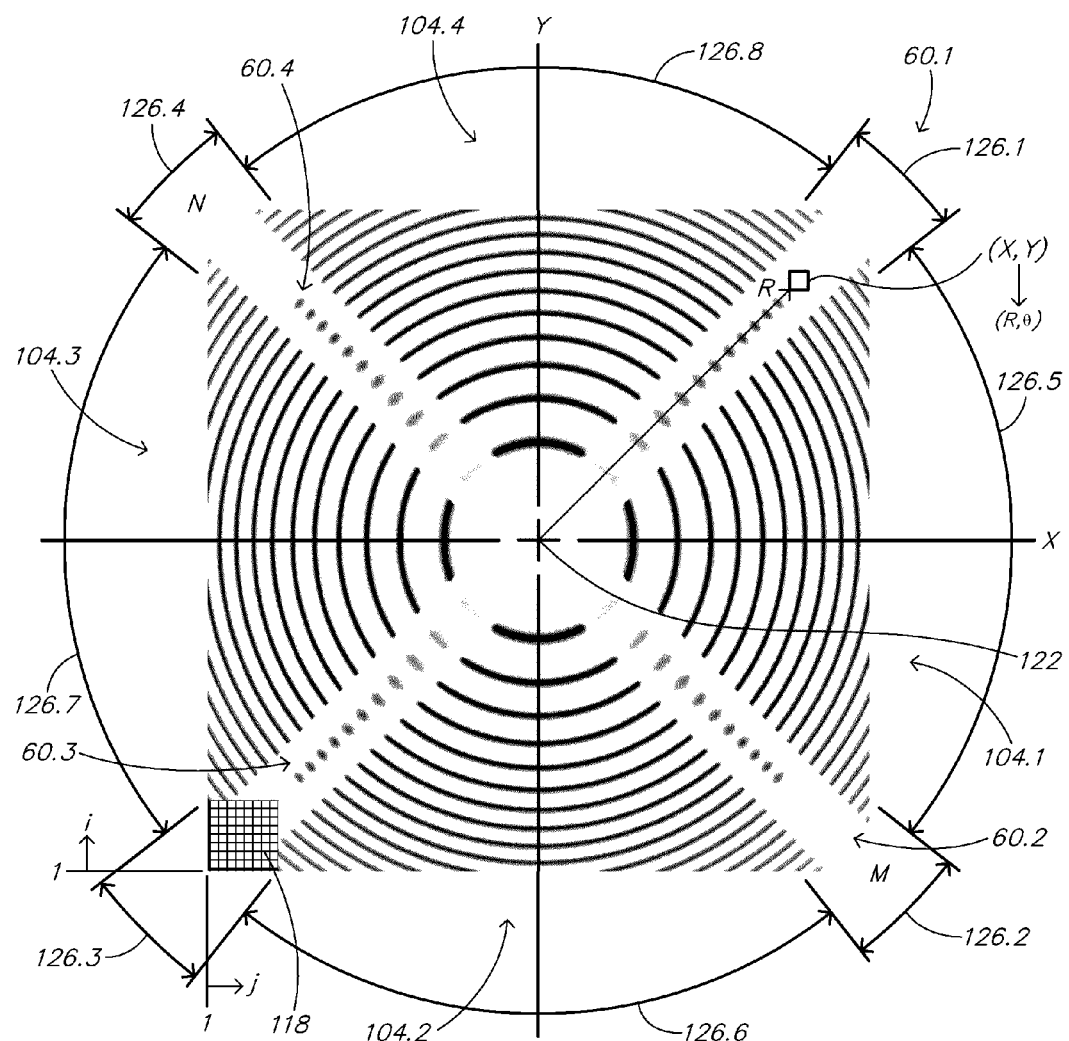
FIG. 8 illustrates an image of a set of circular fringe patterns and regions of interest associated with a circular binning process.

Referring to FIG. 8, the image 114 of the set of circular fringe patterns 80 comprises an array of N rows by M columns of pixels 118, each of which is captured by the CCD detection system 46.1' and stored in a memory 124 of the associated data processor 66 of the range imaging LIDAR system 10. The image 114 comprises eight regions of interest (ROI) 126.1-126.8, each comprising one of the corresponding circular fringe patterns 60.1, 60.2, 60.3, 60.4, 104.1, 104.2, 104.3, 104.4, and located about the common center 122 of the circular fringe patterns 80, wherein the center 122 of the circular fringe patterns 80 is determined upon initial calibration or subsequent recalibration of the associated range imaging LIDAR system 10, and is assumed to be stationary during the operation thereof. For example, the center 122 may be determined by recording a substantial number, e.g. thousands, of circular fringe patterns 80 and determining the location of the center 122—by either iteration starting with an initial guess, or least squares or correlation with the coordinates of the center 122 as unknowns to be determined—that provides for a best fit of the recorded circular fringe patterns 80 with a corresponding circular model thereof centered at the center 122 of the circular fringe patterns 80.

Figure 9A:
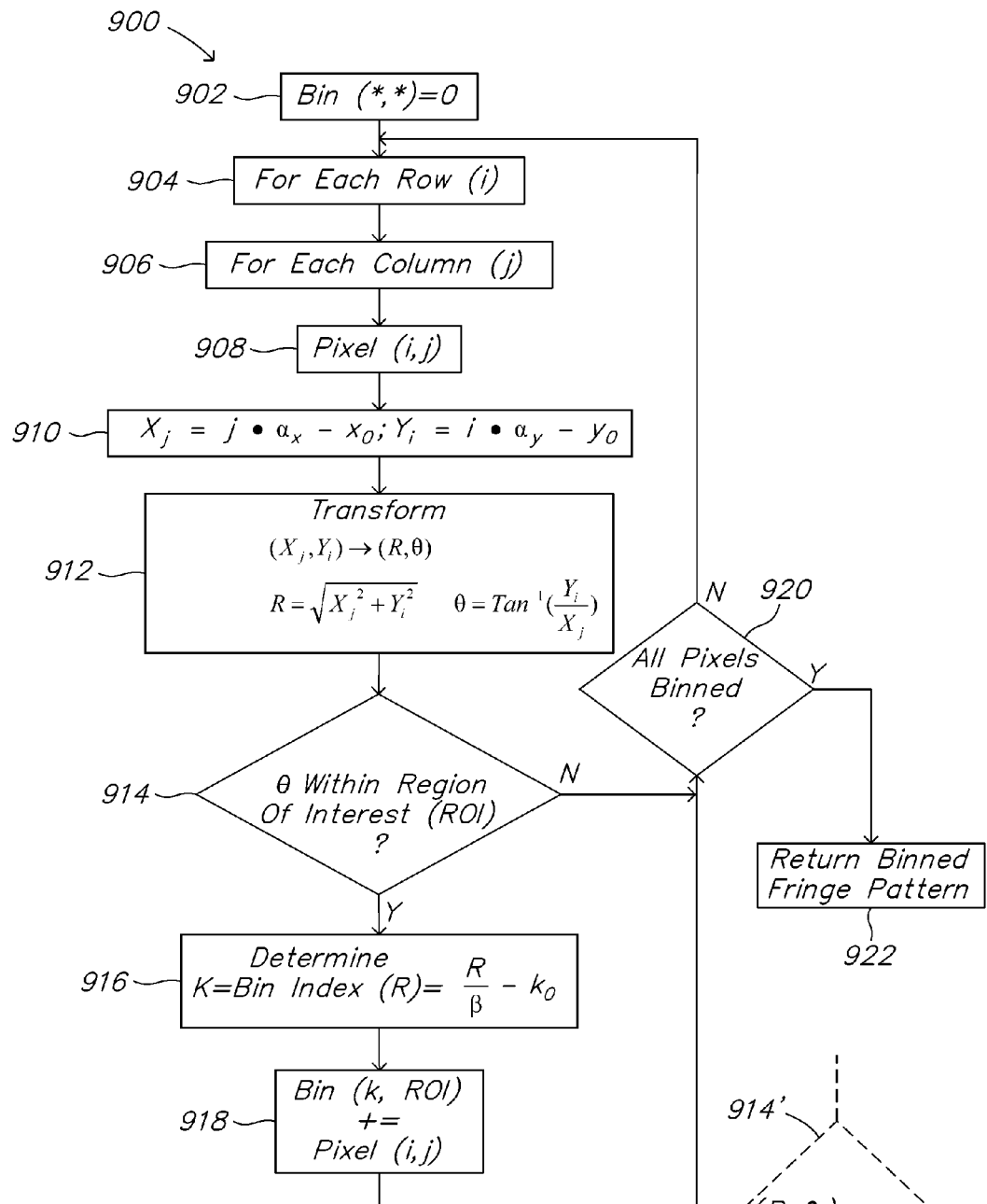
FIG. 9a illustrates a flow chart of a first aspect of a circular binning process.

Referring to FIG. 9a, in accordance with a first embodiment of a circular binning process 900, in step (902) a K×NROI bin array BIN(*,*) is defined with storage for NROI vectors of K elements each to hold the circumferentially-binned values for each of the NROI=8 circular fringe patterns 80, and each value thereof is initialized to zero. Then, in steps (904) and (906), for each row i of the N rows, and for each column j of the M columns, of the pixels 118 in the image 114, the value Pixel(i,j) of the pixel 118 is read from the image 114 in step (908), and in step (910), the corresponding X and Y locations thereof are calculated respectively as follows:

$$x_j = j \cdot \alpha_X - x_0$$

$$y_i = i \cdot \alpha_Y - y_0 \qquad (1)$$

wherein $\alpha_X$ and $\alpha_Y$ are the distances per pixel in the X and Y directions, respectively, and $x_0$ and $y_0$ are the coordinates of the center 122 relative to Pixel(1,1) at the lower left corner of the image 114. Then, in step (912), the Cartesian coordinates $(x_j, y_i)$ from step (910) are transformed to cylindrical coordinates (R, θ), as follows:

$$R = \sqrt{x_j^2 + y_i^2}$$

$$\theta = \mathrm{Tan}^{-1}\left(\frac{y_i}{x_j}\right) \qquad (2)$$

Then, in step (914), if the angle θ is within a region of interest (ROI) 126.1-126.8, the associated region of interest ROI 126 is identified, and in step (916), the radial bin index k is given by:

$$k = \frac{R}{\beta} - k_0 \qquad (3)$$

where β is the distance per pixel in the radial direction, and $k_0$ is the number of pixels 118 between the center 122 and the closest portion of the circular fringe pattern 80 closest thereto. Then, in step (918), the associated value Pixel(i,j) of the associated pixel 118 is added to the bin element BIN(k,ROI) of the bin array BIN(*,NROI) as follows:

$$\mathrm{BIN}(k,\mathrm{ROI}) = \mathrm{BIN}(k,\mathrm{ROI}) + \mathrm{Pixel}(i,j) \qquad (4)$$

Then, or otherwise from step (914), in step (920), if all of the pixels 118 have been circumferentially binned, then, in step (922), the circumferentially-binned values for each of the circular fringe patterns 80 are returned in the associated bin array BIN(*,NROI). Otherwise, the process repeats with steps (904) and (906) for each of the rows and columns of pixels 118 until all of the circular fringe patterns 80 are binned.

Figure 9B:
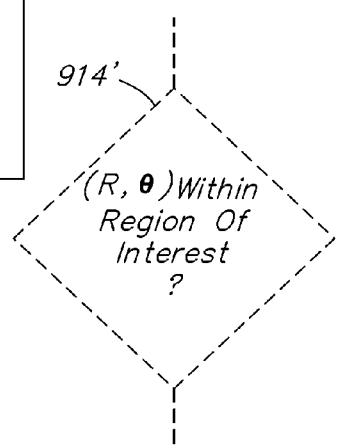

Referring to FIGS. 8 and 9b, alternatively, regions of interest (ROI) 126.1'-126.8' may be defined by the corresponding respective boundaries of the respective circular fringe patterns 80, in which case, step (914) of the circular binning process 900 would be replaced by step (914'), whereby the test as to whether a particular pixel 118 was in a particular regions of interest (ROI) 126.1'-126.8' would depend upon both cylindrical coordinates (R, θ) of the particular pixel 118.

Figure 10:
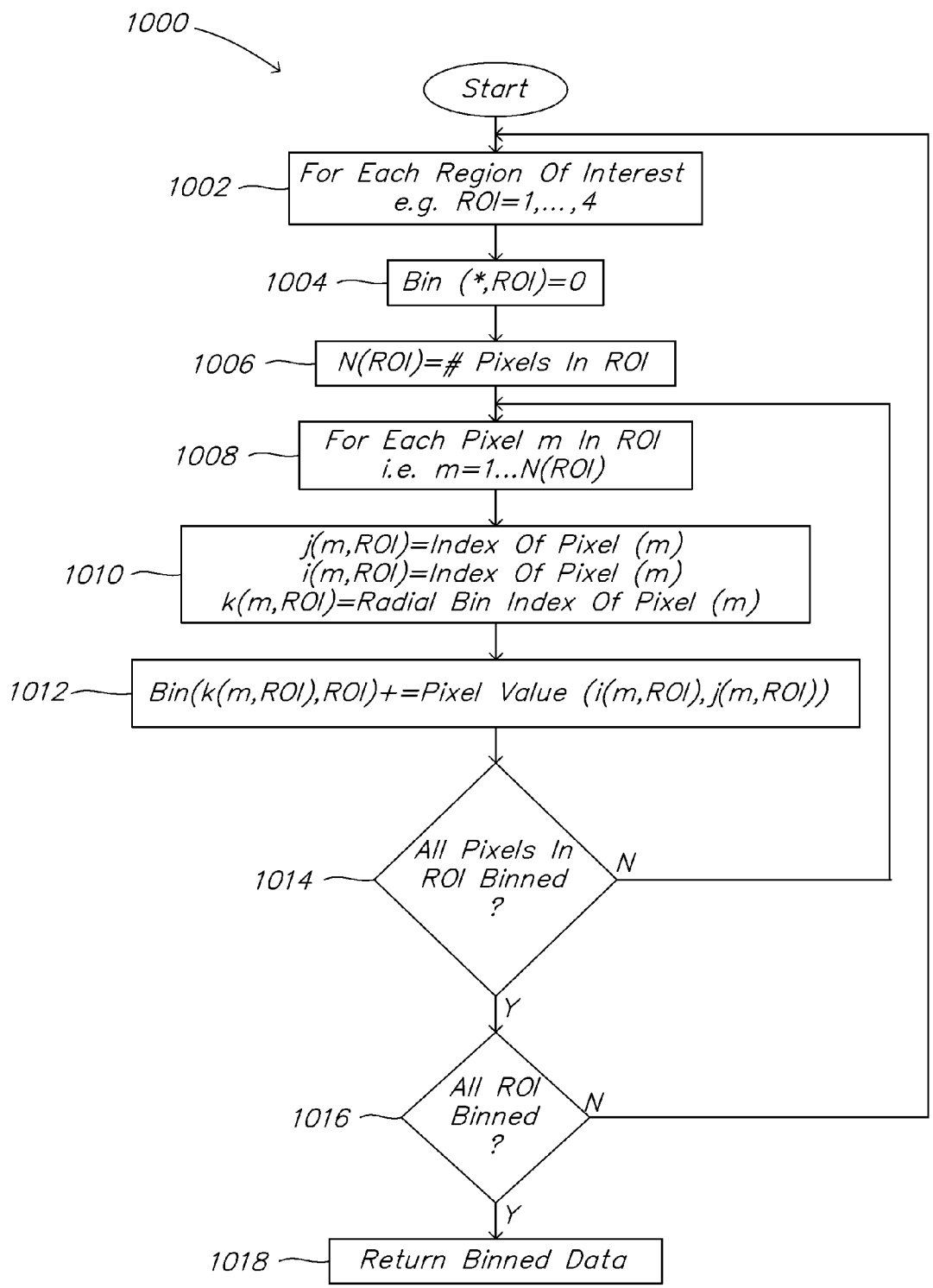
FIG. 10 illustrates a flow chart of a second aspect of a circular binning process.

Referring to FIG. 10, in accordance with a second embodiment of a circular binning process 1000, rather than processing every pixel 118 of the image 114, only those pixels 118 in predefined regions of interest (ROI) 126.1'-126.8' are processed, wherein, for example, the regions of interest (ROI) 126.1'-126.8' are defined by the corresponding respective circular boundaries of the respective circular fringe patterns 80. Beginning with step (1002), for each region of interest (ROI) 126.1'-126.8', in step (1004) the associated bin elements BIN(*,ROI) are initialized to zero. Then, in step (1006), the number of pixels 118 in the particular region of interest (ROI) 126.1'-126.8' is given by the predetermined value of N(ROI). Then in step (1008), for pixel m of the N(ROI) pixels 118 in the particular region of interest (ROI) 126.1'-126.8', the corresponding column j and row i indexes for the particular pixel 118, corresponding to the associated X and Y locations thereof, are given in step (1010) by predetermined values from predetermined index arrays j(m,ROI) and i(m,ROI) respectively, and the corresponding element k of the associated bin array BIN(*,ROI) into which the particular pixel 118 is to be binned is given by the predetermined index array k(m,ROI). Accordingly, in step (1012), the $m^{th}$ pixel 118 is binned into the $k^{th}$ element of the bin array BIN(*,ROI) as follows:

$$\mathrm{BIN}(k(m,ROI),ROI) = \mathrm{BIN}(k(m,ROI),ROI) + \mathrm{Pixel}(i(m,ROI),j(m,ROI)) \qquad (5)$$

Then, in step (1014), if all of the pixels m in the particular region of interest (ROI) 126.1'-126.8' have not been binned, then the process continues with step (1008). Otherwise, in step (1016), if all of the regions of interest (ROI) 126.1'-126.8' have not been binned, then the process continues with step (1002). Otherwise, in step (1018), the circumferentially-binned values for each of the circular fringe patterns 80 are returned in the associated bin array BIN(*,NROI).

In one embodiment, the circular fringe patterns 80, 104.1, 104.2, 104.3, 104.4 associated with the reference fringe pattern 104 are binned into a single common linear reference fringe pattern $104^L$, whereas in other embodiments the circular fringe patterns 80, 104.1, 104.2, 104.3, 104.4 associated with the reference fringe pattern 104 are either binned into separate associated linear reference fringe pattern $104^L$, $104.1^L$, $104.2^L$, $104.3^L$, $104.4^L$, or partially combined into a fewer number of associated linear reference fringe patterns $104^L$.

As yet another example, in yet another embodiment, the range imaging LIDAR system 10, 10$^i$ incorporates a plurality of circle-to-line interferometer optic (CLIO) elements 128 that provide for optically integrating the scatter 60 and reference 104 fringe patterns so as to generate corresponding linearly distributed associated fringe patterns that can then be detected with corresponding linear photodetector arrays or linear arrays of photodetectors, for example, as described hereinabove. For example, a separate circle-to-line interferometer optic (CLIO) element 128 would be used for each circular fringe patterns 80, 60.1, 60.2, 60.3, 60.4, 104.1, 104.2, 104.3, 104.4 on diametrically opposing portions of the Fabry-Pérot interferometer 44 relative to the optic axis 53, wherein each circle-to-line interferometer optic (CLIO) element 128 may be constructed and operated in accordance with the teachings of U.S. Pat. No. 4,893,003, which is incorporated herein by reference in its entirety, and in accordance with the teachings of U.S. Pat. No. 7,495,774, from line 22 at column 8 through line 50 at column 10 with reference to FIGS. 8 through 15*b* inclusive therein, and line 54 at column 29 through line 41 at column 30 with reference to FIGS. 35 through 39 inclusive therein, all of which is incorporated by reference.

As yet another example, in yet another embodiment, the range imaging LIDAR system 10, 10$^i$ incorporates a holographic optical element 128' adapted to transform the arcuate fringes 62', 62" into corresponding linear distributions of light, for example, in accordance with the teachings of U.S. Pat. No. 6,313,908, which is incorporated herein by reference in its entirety, but adapted so that the arcuate fringes 62' associated with the scatter fringe pattern 60 are transformed to a first linear distribution of light and the arcuate fringes 62" associated with the reference fringe pattern 104 are transformed to a second linear distribution of light, wherein the first and second linear distributions are distinct, and detected by corresponding first and second linear photodetector arrays or linear arrays of photodetectors of the associated detection system 46, for example, as described hereinabove.

The reference 106 and scatter 64 electronic image signals are transmitted to the data processor 66, which processes the reference electronic image signal 106 to characterize the Fabry-Pérot etalon 50, and which then determines one or more range-dependent measures of the atmosphere 16—at one or more given ranges, or as a function of range—from the scatter electronic image signal 64 associated with arcuate fringes 62', wherein each arcuate fringes 62' corresponds to a different associated nominal range R and is analyzed separately. More particularly, the scatter electronic image signal 64 provides the information sufficient to determine the following measures of the atmosphere 16: aerosol counts A, molecular counts M, velocity u, temperature t, and background counts B, wherein molecular counts M provides for generating a measure of atmospheric density. As described more fully hereinbelow, data from each arcuate fringe 62' is analyzed separately, so as to determine one or more of the measures: aerosol counts A, molecular counts M, velocity u, temperature t, and background counts B either at a given nominal range R or set of nominal ranges R, or as a function of nominal range R. The measures are determined by non-linearly fitting the measured reference electronic image signal 106 with a parameterized model of the Fabry-Pérot etalon 50, parameterized with respect to the measures so as to characterize the Fabry-Pérot etalon 50, and then non-linearly fitting the measured scatter electronic image signal 64 associated with different arcuate fringes 62' to the parameterized model of the Fabry-Pérot etalon 50, parameterized with respect to the measures to be determined, i.e. with respect to aerosol counts A, molecular counts M, velocity u, temperature t, and background counts B, so as to determine values for those measures at the nominal range R associated with that particular arcuate fringe 62'.

Figure 11A:
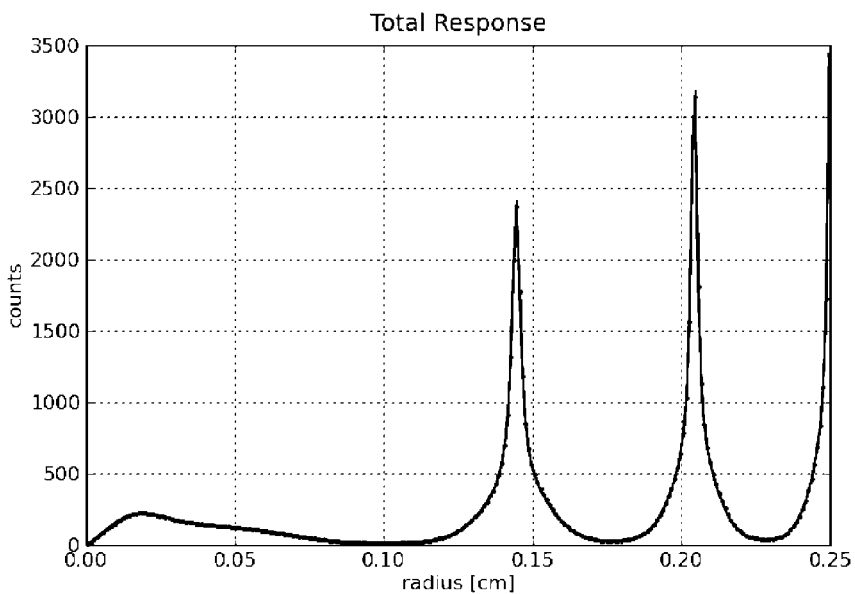
FIG. 11a illustrates a radial cross-section of an intensity distribution of a set of fringes from a Fabry-Pérot interferometer.
Figure 11B:
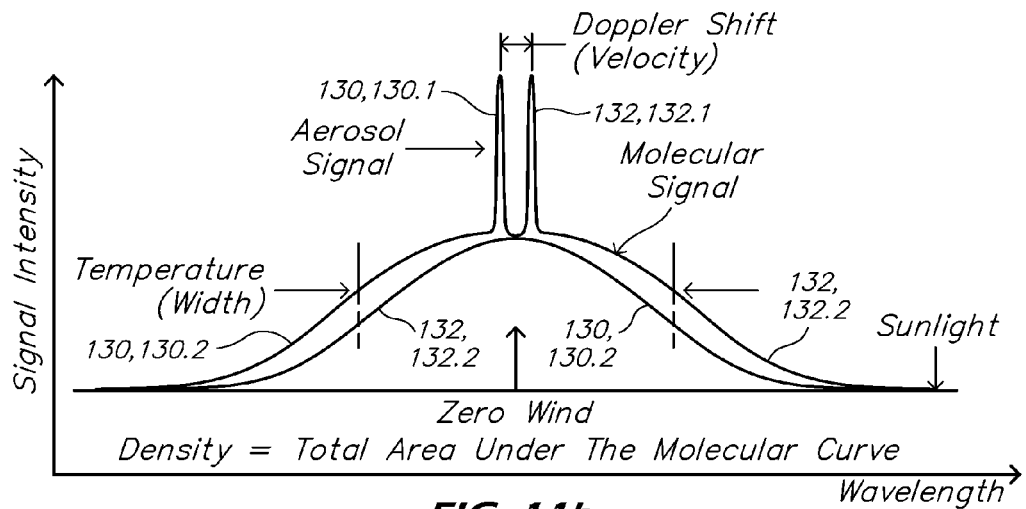
FIG. 11b illustrates fringes from the Fabry-Pérot interferometer from two scattered signals associated with different velocities.

A radial plot of the intensity of the circular fringe pattern 80 is illustrated in FIG. 11*a*. Referring to FIG. 11*b*, illustrating an expanded view of a radial cross-section of the intensity of a single circular fringe 80' of the circular fringe pattern 80, a first fringe 130 corresponds to a zero-wind, i.e. zero-velocity condition, and a second fringe 132 corresponds to a non-zero wind condition, wherein both the first 130 and second 132 fringes are illustrated as exhibiting both an aerosol signal component 130.1, 132.1 and a molecular signal component 130.2, 132.2 respectively. The reference light signal 105 also provides for a zero wind condition, but does not contain either molecular or background components, and accordingly would exhibit only the aerosol signal component 130.1 illustrated in FIG. 11*b*.

Figure 11C:
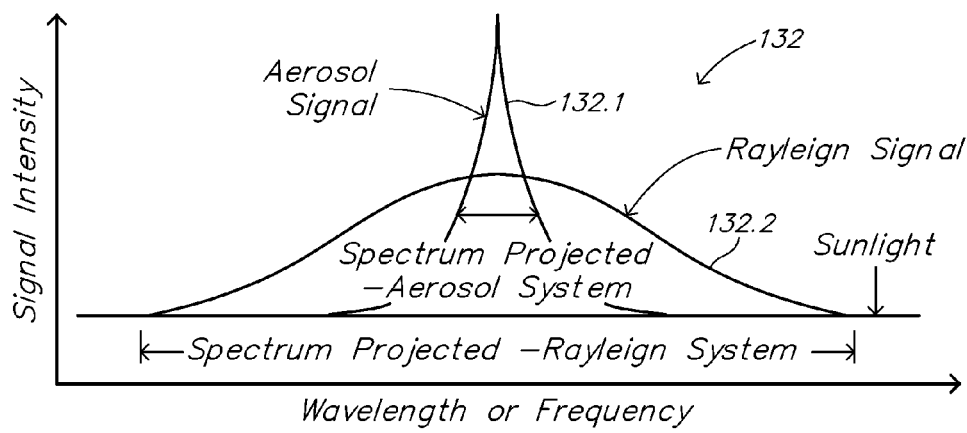
FIG. 11c illustrates a fringe associated with a scatter signal channel processed by the Fabry-Pérot etalon, wherein the fringe comprises aerosol (Mie), molecular (Rayleigh) and background signal components.

The spectral shape of the scattered light signal 32' processed by the Fabry-Pérot etalon 50, for a single associated fringe to be modeled, has a qualitative form illustrated in FIG. 11*c*, wherein the molecular scattered light, i.e. the molecular component 132.2, exhibits a broadened spectral shape, while the aerosol scattered light, i.e. the aerosol component 132.1, produces a sharp peak which is nearly identical to the shape of the transmitted laser light. Underlying these two components is a background signal from scattered sunlight, which at the scale of FIG. 11*c* forms a relatively flat continuum. By way of comparison, the corresponding spectral shape of the light of the reference light signal 105 processed by the Fabry-Pérot etalon 50 is substantially the same as that of the aerosol component 132.1.

The range imaging LIDAR system 10 provides for directly detecting laser energy scattered off of either molecules 16' of the atmosphere, aerosols 16" in the atmosphere, or a combination of the two, provides for directly measuring the associated velocity and direction, density, and temperature of the atmosphere, and provides for deriving other measurements therefrom, for example, a set of air data products. For example, relatively short wavelength laser energy is scattered by molecules of the atmosphere in accordance with Rayleigh scattering. Laser energy can also be scattered by aerosols in the atmosphere in accordance with Mie scattering. Rayleigh scattering generally refers to the scattering of light by either molecules or particles having a size less than about $\frac{1}{10}^{th}$ the wavelength of the light, whereas Mie scattering generally refers to scattering of light by particles greater than $\frac{1}{10}^{th}$ the wavelength of the light. Being responsive to Rayleigh scattering, the range imaging LIDAR system 10 is therefore responsive to the properties—e.g. velocity, density and temperature—of those molecules in the atmosphere giving rise to the associated scattering of the light detected by the range imaging LIDAR system 10. Accordingly, the range imaging LIDAR system 10 provides for operation in clean air, i.e. in an atmosphere with no more than a negligible amount of aerosols 16", depending substantially only upon molecular scatter.

Figure 12:
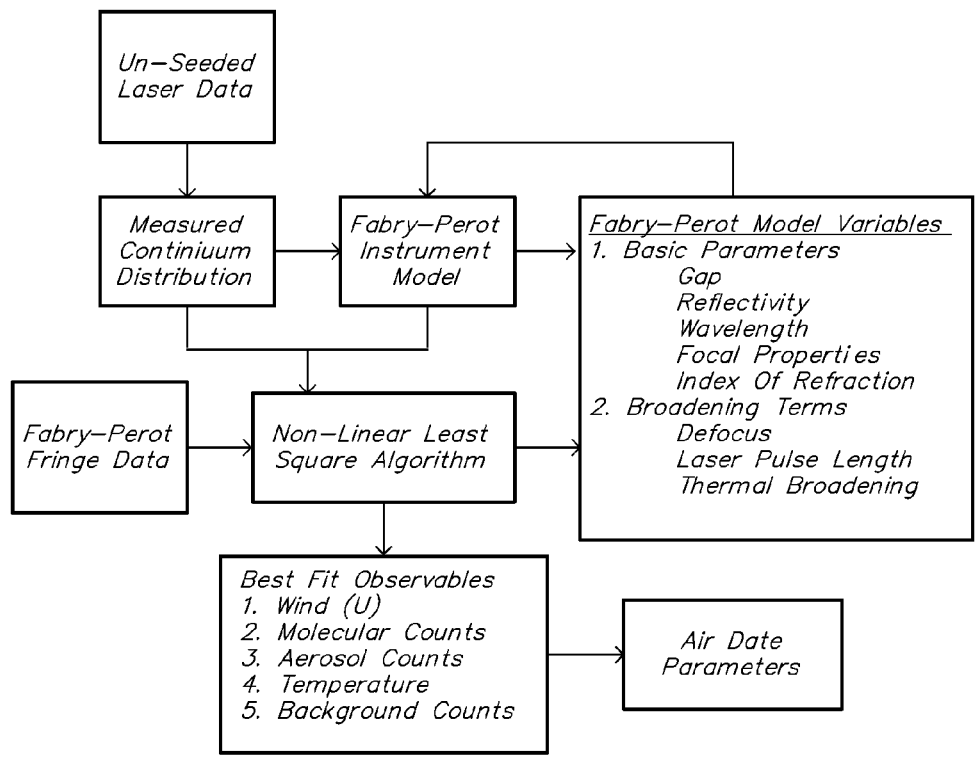
FIG. 12 illustrates a block diagram of a data analysis process used to determine atmospheric measurements from signals from a Fabry-Pérot interferometer.
Figure 13:
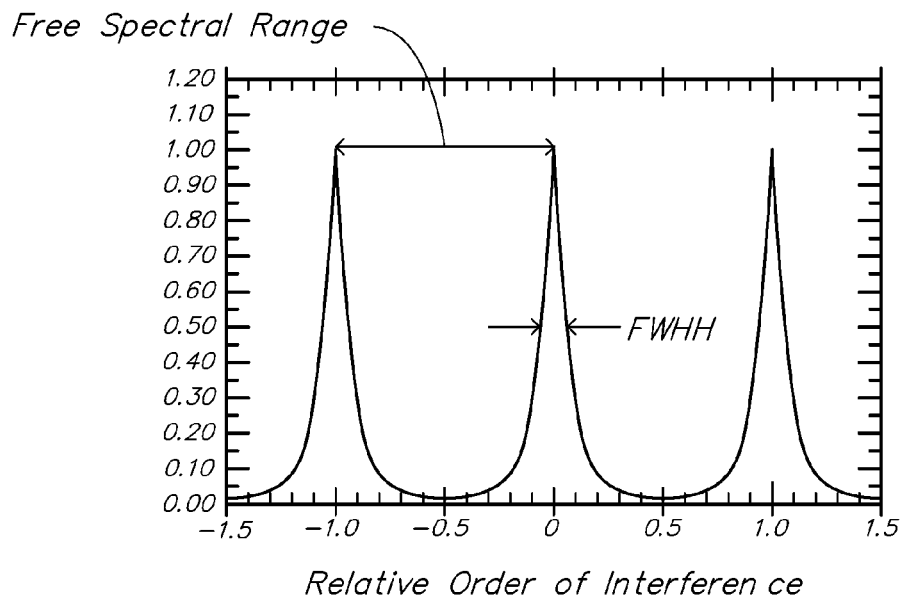
FIG. 13 illustrates a periodic transmission function of a Fabry-Pérot interferometer.

Referring to FIG. 12, the image 114 of the scatter fringe pattern 60 generated by the range imaging LIDAR system 10 is modeled use non-linear least square techniques. The distribution of the stray light and background radiation is provided by measurements of a fringe pattern 60' either with an associated laser seeder 208 turned off when used in cooperation with a Nd:YAG laser 12.1 so as to enable the Nd:YAG laser 12.1 to lase over a relatively wider range of wavelengths that provides for simulating background radiation, or with the Fabry-Pérot etalon 50 removed from the Fabry-Pérot interferometer 44. The scatter fringe patterns 60 are otherwise measured with the laser seeder 208 turned on if used in cooperation with a Nd:YAG laser 12.1 so as to provide for substantially single-frequency operation. The instrument functions and derivatives used in the algorithm are formed from analytic representations of the Fabry-Pérot interferometer 44 and include the necessary broadening functions to account for defects of the Fabry-Pérot etalon 50, e.g. the associated solid optical element 76, as well as temperature-dependent line shape broadening from molecular scatter. Empirical data for the illumination pattern is also used so that the correct light distribution of the fringes is accurately represented in the models. The transmission T, of a perfect Fabry-Pérot etalon 50 is given by the Airy function as follows, and as described in Hernandez, G., *Fabry-Perot interferometers*, Cambridge: Cambridge University Press, 1986, and Vaughan, J. M., *The Fabry-Perot Interferometer: History, Theory, Practice and Applications*, Bristol, England: A. Hilger, 1989, both of which documents are incorporated herein by reference:

$$T(M) = \frac{\left(1 - \frac{L}{1-R}\right)^2 (1-R)^2}{1 - 2R\cos 2\pi M + R^2} \tag{6}$$

where L is the loss per plate (absorption and scattering), R is the plate reflectivity, and M is the order of interference. Equation (6) describes a periodic transmission function, which is illustrated in FIG. 13. The separation between peaks is known as the free spectral range and depends inversely on the gap 58, 58.1 between the first 54 and second 56 partially-reflective surfaces, so that a relatively large spacing results in a relatively small free spectral range. The resolution of a Fabry-Pérot interferometer 44 is determined by the full width at half height (FWHH) of a fringe, which in turn determines the Rayleigh resolving power of the Fabry-Pérot interferometer 44. The finesse of the Fabry-Pérot interferometer 44 is a unitless quantity that is defined as the ratio of the Free Spectral Range(FSR) to the FWHH. Finesse defines the number of resolvable elements that can fit in between two resonance peaks, and represents the sensitivity of the Fabry-Pérot interferometer 44. In the absence of any defects, the finesse is related primarily to the reflectivity. For example, a reflectivity of 0.80 gives a finesse of 14, and a reflectivity of 0.90 gives a finesse of 30. In the presence of defects, both the finesse and the peak transmittance are reduced. Unless careful attention is given to defects when a Fabry-Pérot system is designed, the finesse and throughput can be substantially less than anticipated and can adversely bias the measured results. In order to incorporate defects into the instrument model equation (6) can be written in the equivalent series form, as follows:

$$T(M) = \left(1 - \frac{L}{1-R}\right)^2 \left(\frac{1-R}{1+R}\right)\left(1 + 2\sum_{n=1}^{\infty} R^n \cos 2\pi n M\right) \tag{7}$$

Equation (7) is a useful form of the Airy function since it provides for relatively easy convolutions with broadening functions.

The order of interference M is given by:

$$M = 2\mu t v \cos\theta \tag{8}$$

where $\mu$ is the index of refraction of the material between the first 54 and second 56 partially-reflective surfaces, t is the effective gap 58, 58.1, v is the wavenumber of light, and $\theta$ is the angle of incidence in the Fabry-Pérot etalon 50 which is responsive to the focal length of the imaging optics 52 and the size of the detection system 46. Perturbations of t, v and $\theta$ from a set of standard conditions and normal incidence, can be modeled as follows:

$$t = t_0 + \Delta t \tag{9}$$

$$v = v_0 + \Delta v \tag{10}$$

$$\cos\theta = 1 - \frac{\theta^2}{2} \tag{11}$$

The order of interference can then be written as follows:

$$M = 2\mu t_0 v_0 + 2\mu t_0 \Delta v + 2\mu v_0 \Delta t - 2\mu t_0 v_0 \frac{\theta^2}{2} \tag{12}$$

where only the first order terms have been retained, and can be further expressed as follows:

$$M = M_o + \Delta M \tag{13}$$

where $$M_0 = 2\mu t_0 v_0 \tag{14}$$

and $$\Delta M = 2\mu t_0 \Delta v + 2\mu v_0 \Delta t - 2\mu t_0 v_0 \frac{\theta^2}{2} \tag{15}$$

The quantity $\frac{1}{2} \mu t_0$ is the change in wavenumber required to change the order of interference by one, and is defined as the free spectral range, $\Delta v_{FSR}$, which results in:

$$\Delta M = \frac{\Delta v}{\Delta v_{FSR}} - \frac{v_0}{\Delta v_{FSR}} \frac{\theta^2}{2} + 2\mu v_0 \Delta t \tag{16}$$

Without loss of generality $M_0$ can be an integer and therefore $T(M)=T(\Delta M)$.

Real instruments have defects which influence the behavior thereof and can be accounted for by broadening functions in the models used to characterize the device. These broadening functions are well known and are represented by a set of probability functions which can be convolved with the basic Fabry-Pérot Airy function to give the general result:

$$T(\Delta v, \theta) = \tag{17}$$

$$\left(1 - \frac{L}{1-R}\right)^2 \left(\frac{1-R}{1+R}\right) \left[1 + 2\sum_{n=1}^{\infty} R^n D_n \cos 2\pi n \left(\frac{\Delta v}{\Delta v_{FSR}} - \frac{v_0}{\Delta v_{FSR}} \frac{\theta^2}{2}\right)\right]$$

wherein the broadening function $D_n$ filters the transmission T depending upon the magnitude of the defect or broadening process, and is calculated from the following product:

$$D_n = \prod_{q=1}^{N_q} d_n^q \tag{18}$$

wherein $d_n^q$ is the $n^{th}$ element of the convolution of the $q^{th}$ broadening function $G_q$—described hereinbelow—with the instrument model of equation (7). The convolution integral is defined as follows:

$$d_n^q = \int_{-\infty}^{\infty} G_q(\delta') * T(M(n) - \delta') d\delta' \tag{19}$$

where $T(M(n) - \delta')$ is the Fabry-Perot infinite series term.

A simplified notation can be used to provide for a more compact representation, wherein $$A_n = \left(1 - \frac{L}{1-R}\right)^2 \left(\frac{1-R}{1+R}\right) \text{ for } n = 0 \tag{20}$$

$$= 2\left(1 - \frac{L}{1-R}\right)^2 \left(\frac{1-R}{1+R}\right) R^n D_n \text{ for } n > 0$$

so that the Airy function can be written as follows:

$$T(\Delta v, \theta) = \sum_{n=0}^{\infty} A_n \cos 2\pi n \left(\frac{\Delta v}{\Delta v_{FSR}} - \frac{v_0}{\Delta v_{FSR}} \frac{\theta^2}{2}\right) \tag{21}$$

The broadening functions $G_q$ account for broadening resulting from each of Doppler shift, laser width, scattering broadening, and turbulent motion, respectively, as given hereinbelow, for $N_q = 3$ in equation (18).

Doppler Broadening The Doppler shift due to the mean air motion is given by:

$$\Delta v = v_l \frac{2 U_h \sin \phi}{c} \tag{22}$$

where $\Delta v$ is the Doppler shift, $v_l$ is the laser wavenumber, $U_h$ is the horizontal wind speed in the direction of viewing, and $\phi$ is the angle from the zenith made by the beam of light 18 as it passes through the atmosphere 16, wherein $U_h \sin \phi$ is the line-of-sight relative wind velocity U. Accordingly, equation (22) provides the relationship between line-of-sight relative wind velocity U and the Doppler shift $\Delta v$.

Laser Spectral Width Broadening: The spectral shape of the laser is assumed to be of Gaussian form, as follows:

$$G_{laser}(\Delta v, \Delta v_1) = \frac{1}{\sqrt{\pi} \Delta v_1} e^{-\frac{\Delta v^2}{\Delta v_1^2}} \tag{23}$$

where $\Delta v_l$ is the 1/e width of the laser, wherein the shorter the duration a laser pulse, the broader the associated broadening function, which results in lowered finesse for the Fabry-Pérot etalon 50.

Scattering Broadening: The affect on the transmission T of a Fabry-Pérot interferometer 44 due to broadening induced by molecular scattering is different from that induced by aerosol scattering. Accordingly, different broadening functions $G_q$ are used to account for molecular and aerosol scattering, respectively, in respective corresponding models for the molecular $T_{Mol}$ and aerosol $T_{Aero}$ components of transmission T of the Fabry-Pérot interferometer 44.

The molecular scattering media broadens the signal due to associated random motions. The molecules have a Gaussian broadening function, as follows:

$$G_{molecules}(\Delta v, \Delta v_G) = \frac{1}{\sqrt{\pi} \Delta v_G} e^{-\frac{\Delta v^2}{\Delta v_G^2}} \tag{24}$$

where $\Delta V_G$ is the 1/e width and is given by:

$$\Delta v_G = \frac{v_l}{c} \left(\frac{2k \cdot Temp}{m}\right)^{\frac{1}{2}} \tag{25}$$

or $$\Delta v_G = 4.30 \times 10^{-7} v_l \left(\frac{Temp}{\overline{M}}\right)^{\frac{1}{2}} \tag{26}$$

where k is Boltzmann's constant, m is the mean mass of a molecule in the atmosphere, Temp is the static absolute temperature in degrees Kelvin, and $\overline{M}$ is the mean molecular weight ($\overline{M}$=28.964).

The aerosol broadening function has a Lorentzian form as follows, for example, as described in Fiocco, G., and DeWolf, J. B., "Frequency spectrum of laser echoes from atmospheric constituents and determination of aerosol content of air," *Journal of Atmospheric Sciences*, v.25, n3, May 1968, pp. 488-496; and Benedetti-Michelangeli, G., Congeduti, F., and Fiocco, G., "Measurement of aerosol motion and wind velocity in the lower troposphere by Doppler optical radar," *Journal of the Atmospheric Sciences*, v.29, n5, July 1972, pp. 906-910, both of which references are incorporated herein by reference:

$$L_{aerosol}(\Delta v, \alpha_A) = \frac{1}{\pi} \frac{\alpha_A}{\alpha_A^2 + \Delta v^2} \tag{27}$$

where the half width $\alpha_A$ is given by:

$$\alpha_A = \frac{2\pi v^2 D}{c} \tag{28}$$

The spectral width of the aerosol-induced broadening component is extremely narrow compared to the molecular-induced broadening component, and in most cases are much narrower than the laser pulse, so that aerosol scattering essentially acts as a delta function and is not dependent on temperature.

Turbulent Motion Broadening: In addition to random motions of molecules and aerosols, the model allows for random motions of bulk parcels, i.e. turbulence, wherein this broadening is represented by a relatively simple Gaussian shape, as follows:

$$G_{turbulence} = (\Delta v, \Delta v_T) = \frac{1}{\sqrt{\pi} \Delta v_T} e^{-\frac{\Delta v^2}{\Delta v_T^2}}, \quad (29)$$

where $$\Delta v_T = \frac{v_1}{c} U_T, \quad (30)$$

and $U_T$ is a characteristic turbulent velocity, which is a predefined constant that is independent of the line-of-sight relative wind velocity U. In some embodiments, this term is ignored because it is indistinguishable from temperature, so that the affects of equations (24) and (29) are indistinguishable from one another.

Other broadening functions $G_q$ can also be utilized in addition to those described hereinabove, for example, so as to account for a defocus of the imaging optics 52.

The values of the linear sets of binned pixels 116 for the reference light signal 105 and scattered light signals 32', respectively, provide a corresponding transmission measure T' of the Fabry-Pérot interferometer 44 for the corresponding reference light signal 105 and scattered light signals 32', respectively. Each transmission measure T' is an N-element vector, wherein each element n of the vector corresponds to a different wavelength or corresponding order of interference. The element values are in units of measurement counts; for example, with one measurement count being equal to one photo-electron captured by the detection system 46. The transmission measure T' is a measure of data from the Fabry-Pérot interferometer 44 that can be modeled as described hereinabove in accordance with equations (6) through (30), as represented by FIGS. 11c and 13, wherein FIG. 11c illustrates a finer scale of detail of each fringe illustrated in FIG. 13. Accordingly, the transmission measure T', in units of total counts of binned values from the detection system 46, can be modeled as the sum of associated molecular, aerosol and background counts, as follows:

$$T = T_{Mol}(Temp, U) \cdot MolCounts + T_{Aero}(U) \cdot AeroCounts + T_{Back} \cdot BackCounts \quad (31)$$

where $T_{Mol}(Temp,U) \cdot MolCounts$ is the component of transmission T of the Fabry-Pérot interferometer 44 resulting from molecular scatter, which is a function of temperature and line-of-sight relative wind velocity U; $T_{Aero}(U) \cdot AeroCounts$ is the component of transmission T of the Fabry-Pérot interferometer 44 resulting from aerosol scatter, which is not affected by temperature but is dependent upon the line-of-sight relative wind velocity U; and $T_{Back} \cdot BackCounts$ is the component of transmission T of the Fabry-Pérot interferometer 44 resulting from stray light and background wherein $T_{Back}$ is the continuum distribution or illumination profile through the instrument that is measured during calibration of the instrument from the response of the Fabry-Pérot interferometer 44 with the laser seeder 208 turned off, which is representative of the associated spectral distribution from the Fabry-Pérot interferometer 44 that would result from background illumination. During operation of the range imaging LIDAR system 10, the continuum distribution $T_{Back}$ is obtained from pre-measured values that are stored in memory, and the components $T_{Mol}$ and $T_{Aero}$ are calculated from equation (21) using the appropriate associated broadening terms. Each of the above-described components of transmission T of the Fabry-Pérot interferometer 44 is in units of counts resulting from the charge collected by the elements of the detection system 46. The distributions $T_{Mol}(Temp, U)$, $T_{Aero}(U)$ are evaluated with equation (21) using broadening functions that are appropriate for the molecular and aerosol components of scatter, respectively. In practice, when evaluating equation (21), the associated infinite series is truncated to ignore higher-order terms of relatively insignificant value, wherein the level of truncation is either predetermined, or determined during the accumulation of the elements of the series.

Accordingly, the transmission T of the Fabry-Pérot interferometer 44 is modeled with a non-linear model of equation (31) that is parameterized by a first set (or vector) of parameters P that characterize a particular measurement, i.e. which characterize a particular transmission measure T'; and a second set of parameters Q which are assumed constant during operation of the Fabry-Pérot interferometer 44, the values of which are determined during calibration. Referring to FIG. 12, the first set of parameters P, referred to as observables, include the following elements: line-of-sight relative wind velocity U, static temperature Temp, molecular counts MolCounts, aerosol counts Aero Counts, and scatter counts BackCounts. The second set of parameters Q includes the gap 58, 58.1 (t), index of refraction μ (1 for an air gap) and reflectivity R of the Fabry-Pérot etalon 50, the nominal wavenumber ν (or wavelength λ) of the monochromatic light 14 from the light source 12, the focal properties of the imaging optics 52 (i.e. θ in equation (8)), and the continuum distribution $T_{Back}$.

The observables P can be determined as the values of the parameters P that minimize the following $\chi^2$ merit function:

$$\chi^2(P, Q) = \sum_{n=1}^{N} \frac{[T'(n) - T(M(n); P, Q)]^2}{\sigma^2(n)} \quad (32)$$

using, for example, a Levenberg-Marquardt method of a non-linear least square process which provides for varying smoothly between an inverse-Hessian method and a steepest descent method, as described, along with other suitable non-linear methods, by W. H. Press, S. A. Teukolsky, W. T Veterling, and B. P. Flannery in *Numerical Recipes in C, The Art of Scientific Computing, Second Edition*, Cambridge University Press, 1992, pp. 656-661 and 681-706 which is incorporated herein by reference. In equation (32), T'(n) is the value of the $n^{th}$ binned pixel 116', and T(M(n),P,Q) is the value of the transmission model T from equation (31).

Accordingly, for the range imaging LIDAR system 10, the transmission model T is overdetermined in the sense that the number of elements N of the detection system 46, i.e. the number of binned pixels per channel, is of a higher dimension than the number of observables P. For the range imaging LIDAR system 10 embodiment described herein, there are 5 observables P.

In the inverse Hessian method, the gradient of $\chi^2$ is given by:

$$\beta_k = \frac{\partial \chi^2}{\partial P_k} = -2\sum_{n=1}^{N} \frac{[T'(n) - T(M(n); P, Q)]}{\sigma^2(n)} \frac{\partial T(M(n); P, Q)}{\partial P_k} \quad (33)$$

and the Hessian is approximated by:

$$\alpha_{kl} = \frac{\partial^2 \chi^2}{\partial P_k \partial P_l} = 2\sum_{n=1}^{N} \frac{\partial T(M(n); P, Q)}{\partial P_k} \frac{\partial T(M(n); P, Q)}{\partial P_l} \quad (34)$$

where k=1 to 5 for the 5 observables.

The observables are then solved by solving the set of linear equations:

$$\sum_{l=1}^{5} \alpha_{kl} \delta P_l = \beta_k \quad (35)$$

where $\delta P_1$ is an vector increment that is to be added to a current approximation for the observable vector $P_1$. This system of equations can be represented as:

$$A \cdot \delta P = B \quad (36)$$

where A is the Hessian matrix, $\delta P$ is a vector of increments to the observables that are to be added to a current approximation for the observable P, and B is the gradient vector. This system of equations can be solved as follows:

$$\delta P = A^{-1} \cdot B \quad (37)$$

where $A^{-1}$ is the inverse Hessian matrix.

The inverse Hessian method is suitable when the $\chi^2$ merit function can be locally approximated by a quadratic form. If a quadratic form is a relatively poor local approximation, then the steepest descent formula can be used to find the increment $\delta P$ of the observable P as follows:

$$\delta P_l = \text{constant} \times \beta_k \quad (38)$$

The Levenberg-Marquardt method provides for a combination of the inverse Hessian and steepest descent methods, wherein the Hessian matrix in equation (35) is replaced with:

$$\alpha'_{kk} = \alpha_{kk} \cdot (1+\lambda)$$

$$\alpha'_{jk} = \alpha_{jk} (j \neq k) \quad (39)$$

and both equations (35) and (38) are replaced with the following:

$$\sum_{l=1}^{5} \alpha'_{kl} \delta P_l = \beta_k \quad (40)$$

the solution of which is given by:

$$\delta P = A'^{-1} \cdot B \quad (41)$$

where the elements of A' are given by $\alpha'_{jk}$.

The Levenberg-Marquardt method commences with an initial guess for the observable vector P, after which $\chi^2(P,Q)$ is calculated, and an initial value of $\lambda$ is chosen (e.g. $\lambda=0.001$). An iterative process then commences with the solution for $\delta P$ of equation (41), and the evaluation of $\chi^2(P+\delta P,Q)$. If $\chi^2(P+\delta P,Q) \geq \chi^2(P,Q)$, then $\lambda$ is increased, e.g. by a factor of 10, and the iteration is repeated. Otherwise, if $\chi^2(P+\delta P,Q) < \chi^2(P,Q)$, then $\lambda$ is decreased, e.g. by a factor of 10, and the iteration is repeated. The iterations on the observable vector P are continued until a stopping criteria is satisfied, for example, on the first or second occasion when $\chi^2$ decreases by a negligible amount, and with the final solution, the method converses towards the inverse Hessian method.

The components of the gradient of the transmission model T used in calculating the gradient of $\chi^2$ and the Hessian matrix are given as follows, and are calculated numerically:

$$\frac{\partial T(U, MolCounts, AeroCounts, Temp, BackCounts)}{\partial U} = \quad (42)$$

$$\frac{\partial}{\partial U}(T_{Mol}(Temp, U) \cdot MolCounts + T_{Aero}(U) \cdot AreoCounts)$$

$$\frac{\partial T(U, MolCounts, AeroCounts, Temp, BackCounts)}{\partial MolCounts} = \quad (43)$$

$$T_{Mol}(Temp, U)$$

$$\frac{\partial T(U, MolCounts, AeroCounts, Temp, BackCounts)}{\partial AeroCounts} = T_{Aero}(U) \quad (44)$$

$$\frac{\partial T(U, MolCounts, AeroCounts, Temp, BackCounts)}{\partial Temp} = \quad (45)$$

$$\frac{\partial}{\partial Temp} T_{Mol}(Temp, U)$$

$$\frac{\partial T(U, Mol, AeroCounts, Temp, BackCounts)}{\partial BackCounts} = T_{Back} \quad (46)$$

When processing the reference light signal 105, the observables MolCounts and BackCounts are assumed to be zero valued, and the partial derivatives with respect to MolCounts, BackCounts and Temp of equations (43), (46) and (45), respectively, are also assumed to be zero.

The $\sigma^2(n)$ weighing term in the $\chi^2$ merit function is the associated variance of the $n^{th}$ measurement channel (i.e. interference order or wavelength), which includes variance of the collected signal in combination with the variance associated with the noise from the detection system 46. The collected photons exhibit Poisson noise statistics. Accordingly, for Signal(n) photons/counts/photo-electrons collected on a single channel, the associated variance is equal to the signal level, as follows:

$$\sigma_{Signal}^2(n) = \text{Signal}(n) \quad (47)$$

wherein Signal(n) is the sum of the molecular, aerosol and background components, i.e.:

$$\text{Signal}(n) = \text{Molecular}(n) + \text{Aerosol}(n) + \text{Background}(n) \quad (48)$$

so that Signal(n) is the predicted value from equation (31). The total variance is the combination of the signal variance and the variance of the detector, as follows:

$$\sigma^2(n) = \text{Signal}(n) + \text{Noise}_{Detector}(n)^2 \quad (49)$$

wherein, for a CCD detection system 46.1, the detector noise is the associated read noise on each detector channel.

Alternatively, the observables P could be estimated using other non-linear modeling or non-linear programming techniques, or other techniques such as non-linear estimation or Kalman filtering.

Figure 14:
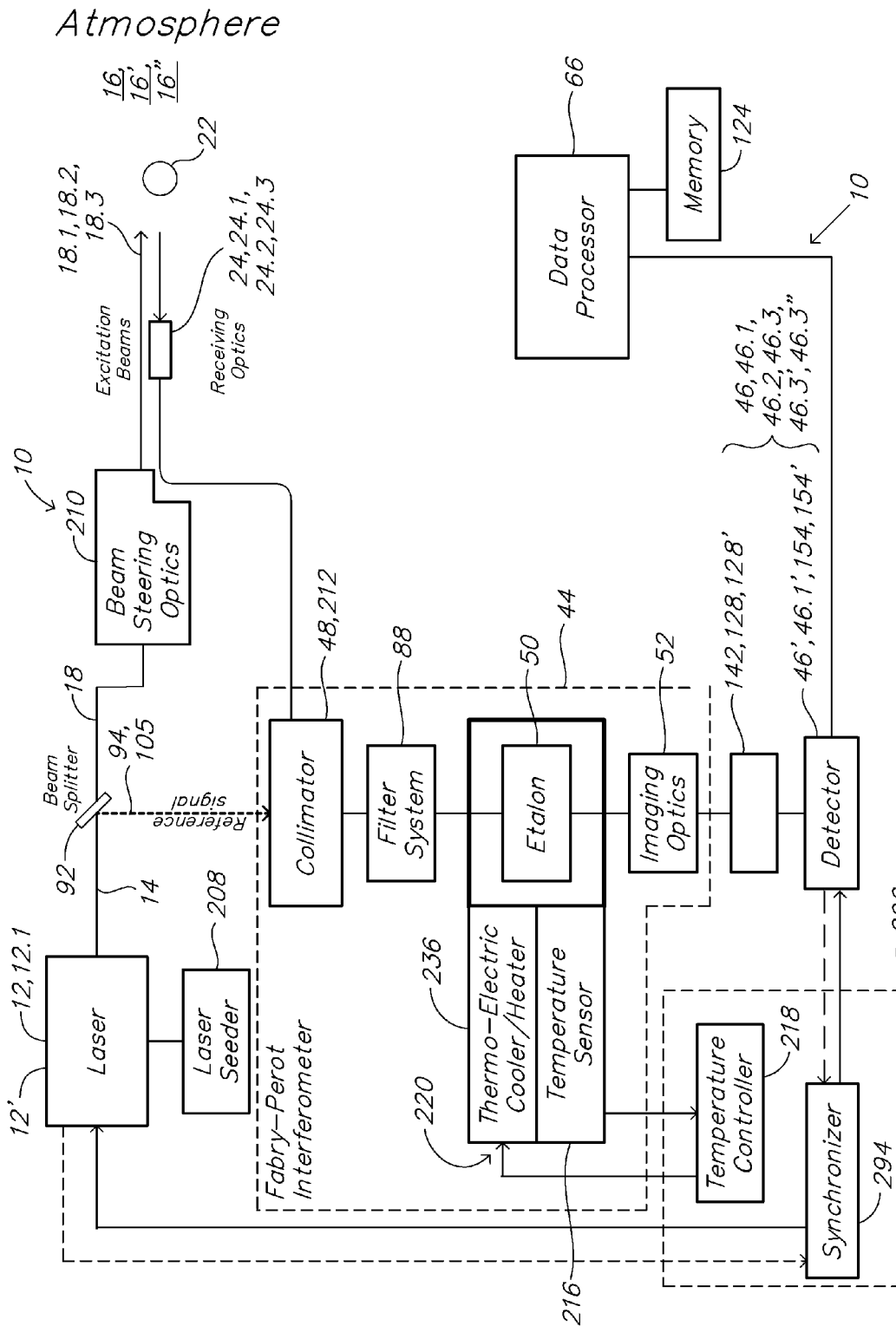
FIG. 14 illustrates a block diagram of various aspects of a range imaging LIDAR system.
Figure 15:
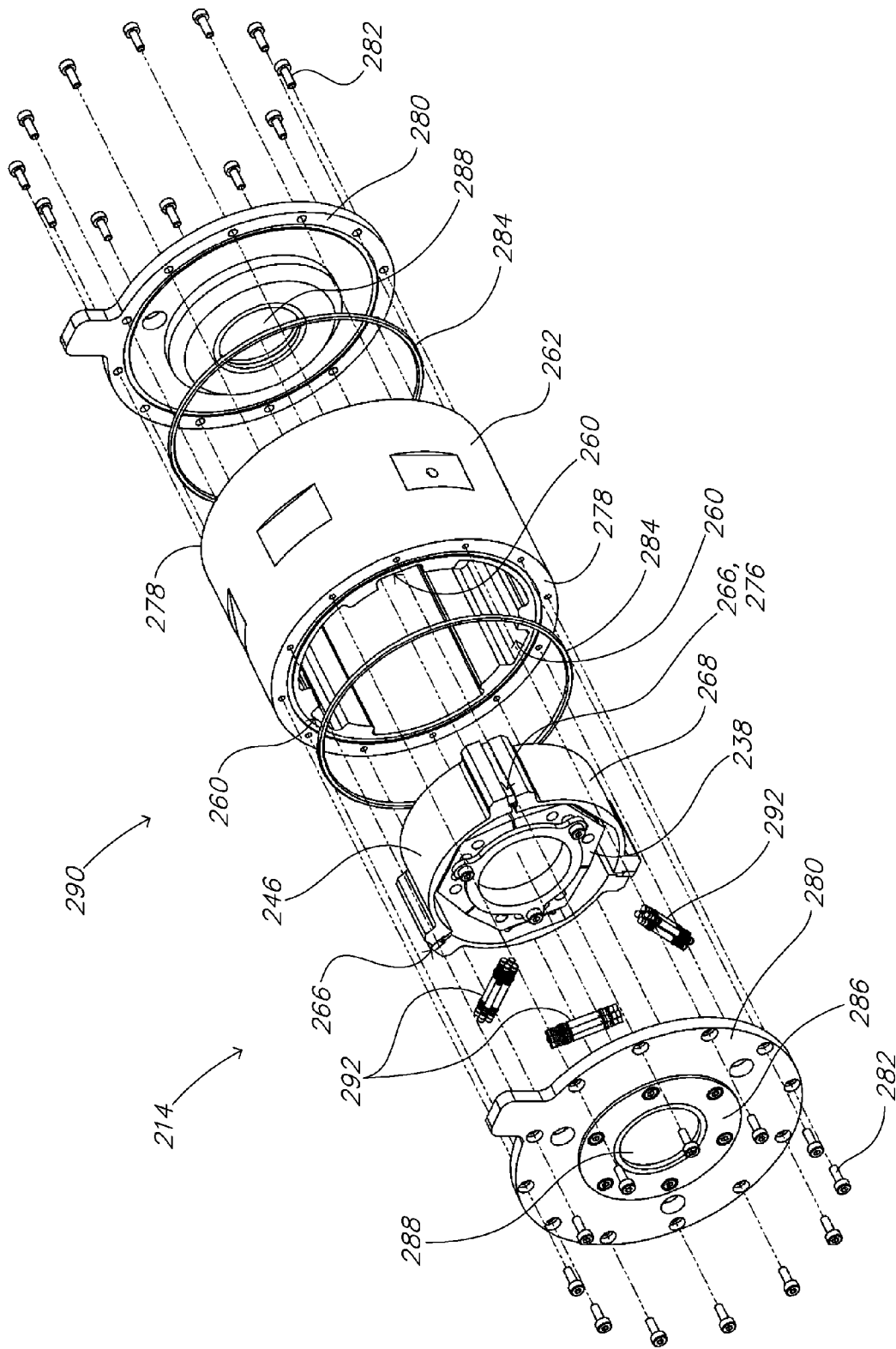
FIG. 15 illustrates an exploded view of thermal chamber assembly enclosing a Fabry-Pérot etalon.
Figure 16:
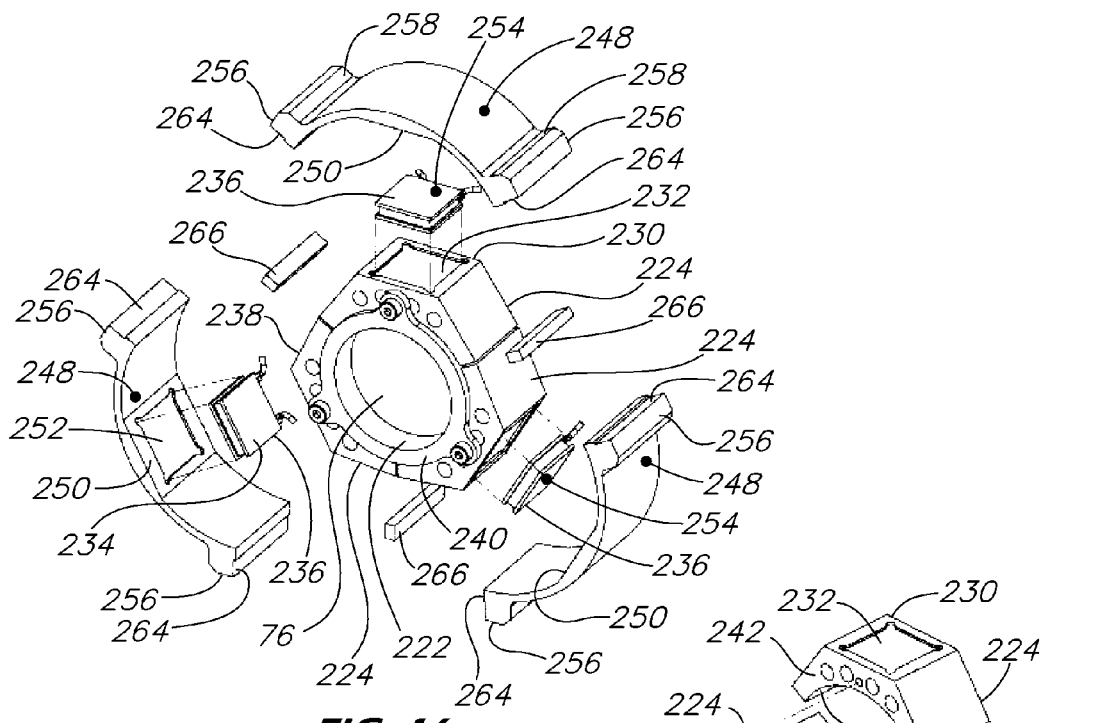
FIG. 16 illustrates a first exploded view of a core assembly incorporated in the thermal chamber assembly illustrated in FIG. 15.
Figure 17:
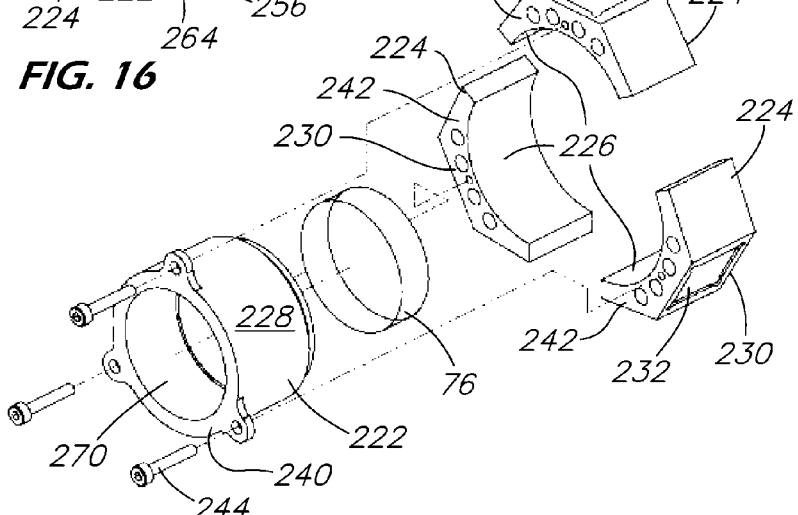
FIG. 17 illustrates a second exploded view of the core assembly incorporated in the thermal chamber assembly illustrated in FIG. 15.
Figure 18:
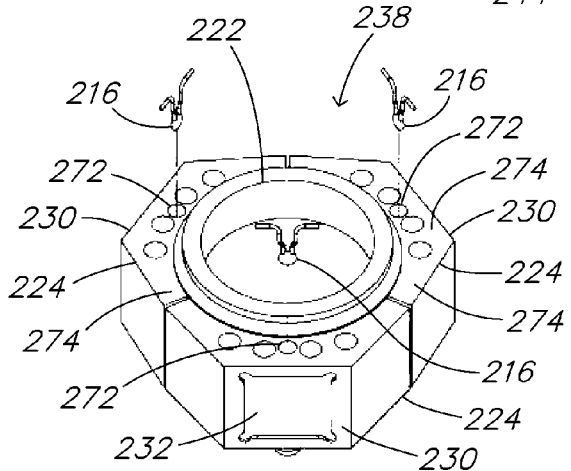
FIG. 18 illustrates a third exploded view of the core assembly incorporated in the thermal chamber assembly illustrated in FIG. 15.

Referring to FIG. 14, in accordance with other embodiments, the range imaging LIDAR system 10 comprises a laser 12' as the light source 12, for example, in one embodiment, a Nd:YAG laser 12.1, which operates in a pulsed mode, and which is operatively associated with a laser seeder 208, for example, a laser diode that provides for seeding the cavity of the pulsed Nd:YAG laser 12.1 with photons via an associated light coupling system, wherein the photons are injected from the laser seeder 208 into the cavity of the Nd:YAG laser 12.1 prior to the build-up of the laser pulse associated of the light source 12, causing the frequency thereof to substantially match that of the laser seeder 208, so as to provide for substantially single-frequency operation. For example, in one embodiment, the laser seeder 208 is adapted in cooperation with the Nd:YAG laser 12.1 so that the bandwidth of the light source 12 is as narrow or narrower than the bandwidth of the associated Fabry-Pérot interferometer 44, wherein the bandwidth of the Fabry-Pérot interferometer 44 is related to the finesse thereof.

The substantially monochromatic light 14 from the laser 12' is divided by a beam splitter optic 92 into a reference source 94 and the beam of light 18, the latter of which in some embodiments may be further divided into a plurality of beams of light 18 by beam steering optics 210, for example, incorporating beam splitting mirrors, prisms, a combination thereof, or some other type of beam splitter, each different beam of light 18 directed in a different direction into the atmosphere 16. The scattered light signals 32' and reference source 94 are each first collimated by a collimator 212, e.g. a collimating lens 48, then filtered by a filter system 88 as described hereinabove, and then processed by an associated Fabry-Pérot etalon 50, the output of which is imaged by associated imaging optics 52 as associated circular fringe patterns 80 onto the associated detection system 46. The associated optical components are adapted for the frequency and power levels of operation. For example, for a range imaging LIDAR system 10 incorporating a Nd:YAG laser 12.1 operating at 355 nanometers, the optical elements would incorporate UV-grade fused silica substrates and standard anti-reflection coatings tuned for 355 nanometers.

The geometry of the circular fringe patterns 80 from the Fabry-Pérot etalon 50 is responsive to the operative gap 58, 58.1 thereof, which would vary with temperature if the associated material or materials controlling the length of the gap 58, 58.1 were to exhibit a non-zero coefficient of thermal expansion. Although the reference source 94 simultaneously processed by the Fabry-Pérot etalon 50 provides for compensating for thermal drift affecting all portions of the Fabry-Pérot etalon 50 equally, it is beneficial if the temperature of the Fabry-Pérot etalon 50 can be controlled or maintained at a constant level so as to prevent a thermal expansion or contraction thereof during the operation thereof. Accordingly, in accordance with one aspect of the range imaging LIDAR system 10, the Fabry-Pérot etalon 50 is thermally stabilized by enclosure in a thermally-controlled enclosure 214 so as to prevent thermally-induced drift of the circular fringe pattern 80.

In accordance with one aspect, the thermally-controlled enclosure 214 is passive, for example, with the Fabry-Pérot etalon 50 enclosed, i.e. thermally insulated or isolated, using a material or materials with a very low thermal conductance to increase the thermal time constant and to prevent any substantial thermal shock from reaching the Fabry-Pérot etalon 50. In accordance with another embodiment, or in combination therewith, the thermally-controlled enclosure 214 is constructed from a combination of materials adapted so that there is negligible net coefficient of thermal expansion in the portions of the structure surrounding the Fabry-Pérot etalon 50 that affect the length of the gap 58, 58.1.

Referring to FIGS. 15-18, in accordance with another aspect, a temperature of the thermally-controlled enclosure 214 is actively controlled responsive to at least one associated temperature sensor 216 using a temperature controller 218 incorporating a feedback control system 220 to control a heater, chiller or a combination heater and chiller—depending upon the temperature of the thermally-controlled enclosure 214 in relation to that of its environment. For example, referring to FIGS. 16 and 17, the Fabry-Pérot etalon 50 comprises a solid optical element 76—for example, constructed from high purity UV grade fused silica—enclosed within a etalon mount 222 comprising a cylindrical sleeve constructed from a material with a coefficient of thermal expansion that closely matches that of the solid optical element 76 so as to provide for preventing or substantially eliminating unwanted thermally induced radial stress in the solid optical element 76. The etalon mount 222 in turn is surrounded by a plurality, e.g. three, heat sink segments 224, each having a relatively high thermal conductance—for example, constructed of copper—each comprising an inner cylindrical face 226 that abuts an outside surface 228 of the etalon mount 222, and an outer face 230 incorporating a recess 232 adapted to receive and abut a first surface 234 of a thermo-electric heat pump 236, for example, what is known as a thermoelectric cooler (TEC). Upon assembly, the heat sink segments 224 collectively constitute an inner enclosure 238 that extends around and surrounds the etalon mount 222, the latter of which incorporates a flange 240 that abuts a set of first faces 242 on one side of the heat sink segments 224, and is fastened thereto with a plurality of fasteners 244, e.g. cap screws. The inner enclosure 238 is surrounded by an outer enclosure 246 comprising a plurality, e.g. three, heat conducting outer ring segments 248, e.g. constructed on aluminum, each of which incorporates an inside face 250 with an associated recess 252 that is adapted to receive and abut a second surface 254 of the thermoelectric heat pump 236. Each of the outer ring segments 248 incorporate associated flanges 256 at both ends, one side 258 of which are adapted to cooperate with internal grooves 260 in an outer shell 262 of the thermally-controlled enclosure 214, the other side 264 of which are adapted to cooperate with an outer ring retainer wedge 266 that operates between corresponding sides 264 of adjacent flanges 256 of adjacent outer ring segments 248 when the outer ring segments 248 are assembled to form the outer enclosure 246 surrounding the inner enclosure 238.

The inner 238 and outer 246 enclosures are assembled together to form a core assembly 268, as follows. The solid optical element 76 Fabry-Pérot etalon 50 is bonded inside a bore 270 of the etalon mount 222 with a thermal epoxy which provides for thermal conduction therebetween, wherein the inside diameter of the bore 270 is adapted so as to provide for a non-interfering fit with the solid optical element 76. The flange 240 of the etalon mount 222 is attached with fasteners 244 to the first faces 242 of the three heat sink segments 224 assembled around the outside surface 228 of the etalon mount 222. Three thermo-electric heat pumps 236 are sandwiched between respective recesses 232, 252 in a corresponding outer face 230 of each heat sink segment 224 and a corresponding inside face 250 of each outer ring segment 248, so that the first 234 and second 254 surfaces of the thermoelectric heat pumps 236 abut and are in thermal communication with the corresponding associated heat sink segment 224 and outer ring segment 248 respectively. The core assembly 268 further comprises a plurality, e.g. three, temperature sensors 216, e.g. thermistors, resistive temperature devices, or thermocouples—each of which is inserted in a corresponding hole 272 in a second face 274 of each heat sink segment 224, so as to provide for monitoring the temperature thereof, and so as to provide in cooperation with the associated temperature controller 218 and the associated thermo-electric heat pump 236, for controlling the temperature thereof.

The core assembly 268 is inserted in the outer shell 262 so that the flanges 240 of the outer ring segments 248 mate with the corresponding internal grooves 260 of the outer shell 262, and the outer ring retainer wedges 266 are inserted in the gaps 276 between the facing sides 264 of the flanges 240 so as to wedge the opposing sides 258 of the flanges 240 against associated internal grooves 260 of the outer shell 262, thereby providing for retaining the core assembly 268 within the outer shell 262, and providing for thermal communication therebetween. The ends 278 of the outer shell 262 are closed with associated end cap assemblies 280 secured thereto with associated fasteners 282 and sealed therewith associated seals 284, e.g. gaskets or o-rings. The end cap assemblies 280 incorporate associated window assemblies 286 fastened thereto and incorporating optical windows 288, e.g. constructed from UV grade fused silica substrates with standard anti-reflection coatings, which provide for transmission of the associated scattered 32' and reference 105 light signals. The resulting assembly constitutes a thermally stabilized etalon assembly 290 incorporating a thermally-controlled enclosure 214. The thermally stabilized etalon assembly 290 further comprises a plurality of electrical connectors 292 therein which provide for connecting the thermo-electric heat pumps 236 and the temperature sensors 216 with the associated temperature controller 218. The temperature controller 218 uses the temperature sensors 216 to monitor the temperature of the core assembly 268, and controls the heating or cooling thereof relative to the environment using the associated thermo-electric heat pumps 236 so as to maintain the temperature of the core assembly 268 at a specified set-point. The outer enclosure 246 in thermal communication with the outer shell 262 provides for either supplying heat to or rejecting heat from the inner enclosure 238 responsive to the thermal effort of the thermo-electric heat pumps 236 as needed to maintain a particular set-point temperature. For example, in one embodiment, the set-point temperature is adapted so as to minimize the energy needed to maintain that temperature, while also maintaining a sufficient offset so as to operate the thermo-electric heat pumps 236 most efficiently. For example, for a thermo-electric heat pump 236 that operates most efficiently when heating, the set-point temperature might be 5 to 10 degrees Celsius above the nominal environmental temperature, e.g. 5 to 10 degrees Celsius above room temperature.

Referring to FIG. 14, in one embodiment, the firing of the Nd:YAG laser 12.1 is, for example, controlled with an associated Q-switch in cooperation with a synchronizer 294, so as to provide for synchronization with the acquisition of associated images by the detection system 46, thereby precluding the need for an electronic shutter that would otherwise provide for gating scattered 32' and reference 105 light signals to the detection system 46, although, alternatively, an electronic shutter could also be used or could be used without a synchronizer 294, for example, so as to preclude subsequent imaging during the process of reading image data if using a CCD detection system 46.1'. The synchronizer 294, if used, could be incorporated in a control electronics assembly 296, e.g. which could also incorporate the associated temperature controller 218 and/or the associated data processor 66. The synchronizer 294 could be adapted to either generate a master timing signal for controlling both the laser 12' and the detection system 46, or could be adapted to relay a timing pulse generated by either one of the laser 12' and detection system 46 to the other of the detection system 46 and laser 12'.

The range imaging LIDAR system 10 can take advantage of aerosols when present, but does not rely upon their presence. The reference light signal 105 and the scattered light signals 32' of the range imaging LIDAR system 10 can be used to directly measure velocity, true airspeed, vertical speed, angle of attack, angle of sideslip, static density, static temperature, and aerosol to total scattering ratio (ASR). From these data products the following quantities can be directly calculated: calibrated airspeed, Mach number, static pressure, total pressure, dynamic pressure, pressure altitude, air density ratio, total temperature, angle of attack, pressure differential, and angle-of-sideslip pressure differential. Wind velocity, density, and temperature are directly calculated using the fringe data from the Fabry-Pérot interferometer 44. The other air data products are derived from these three basic measurements, in view of the knowledge of the associated geometry of the beam steering optics 210. The molecular signal yields a measure of air density that can be related to pressure. The aerosol to total scattering ratio is also directly derived from the results.

As used herein, the term relative wind is intended to refer to the relative motion between the atmosphere—included molecules and aerosols—and the range imaging LIDAR system 10. In addition to frequency—which, responsive to associated Doppler shift, provides for measuring associated velocity—the algorithm determines the contribution to the fringe pattern from molecular and aerosol scatter, the background radiation, and the temperature of the atmosphere 16 for each particular associated direction associated with each corresponding volumetric element 28 as viewed by the associated receiver optics 24.

Figure 19:
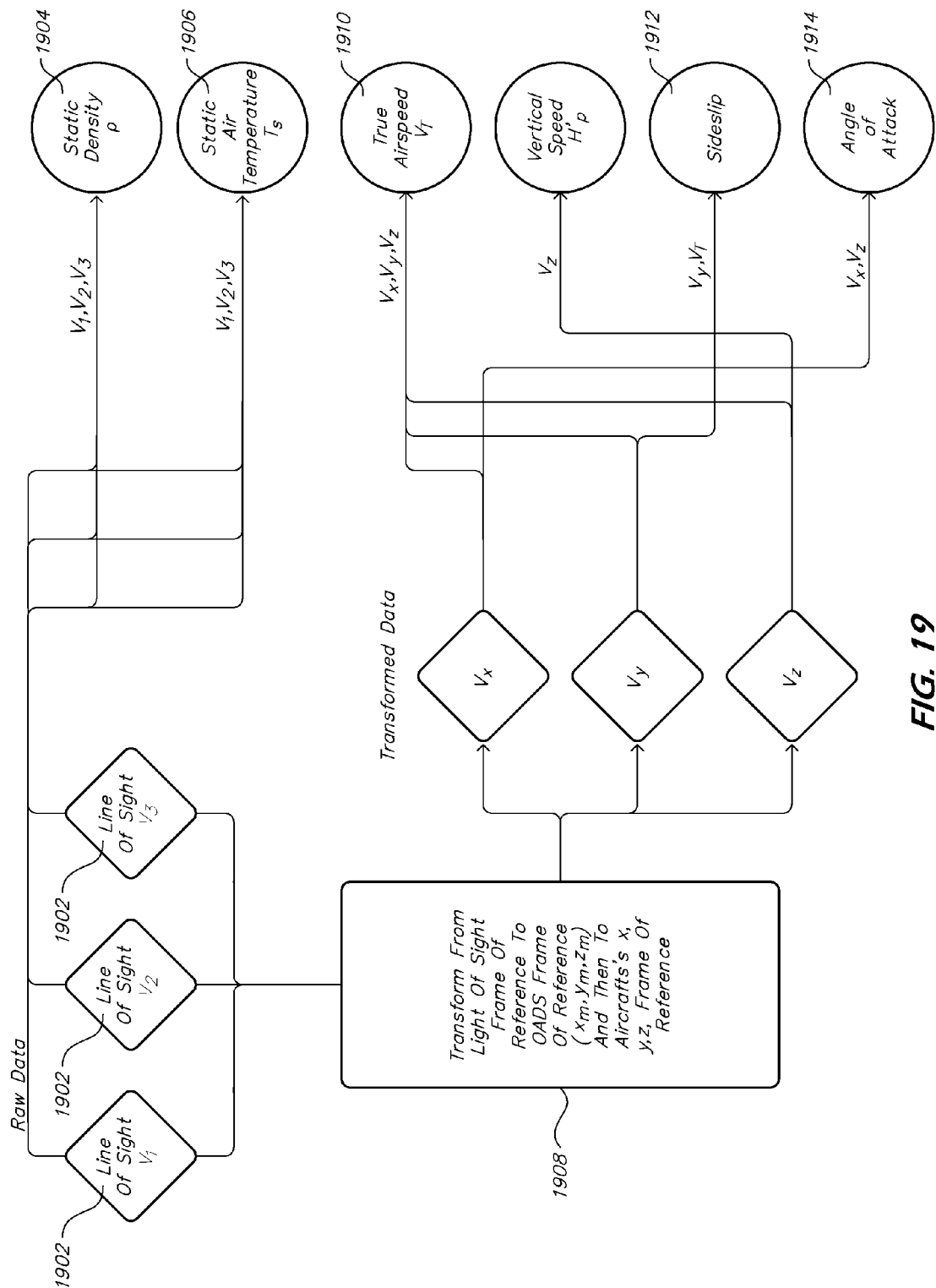
FIG. 19 illustrates a flow chart of a process for determining measured air data products with a range imaging LIDAR system.

For example, referring to FIGS. 11b and 19, in accordance with a first measurement process 1902, the relative wind velocity $V_i$ is determined along a corresponding direction from a difference between the centroids of the associated scatter fringe pattern 60 associated with a corresponding scattered light signal 32' in comparison with that of the circular fringe pattern 80 associated with the reference light signal 105. The fringe position relative to the optic axis 53 is directly related to wavelength. Accordingly, a difference in wavelength between the circular fringe patterns 80 associated with a scattered light signal 32' and that of the circular fringe pattern 80 associated with the reference light signal 105 is a direct measure of the molecular/aerosol Doppler shift in the scattered light 32 from the atmosphere 16 responsive to either molecular or aerosol scattering. The relative wind velocity $V_i$ for each associated scattered light signal 32' is calculated by subtracting the associated line-of-sight velocity U observable from the corresponding "line-of-sight velocity U" observable of the reference light signal 105, similarly so solved, so as to provide an associated calibrated relative wind velocity $V_i$.

Referring to FIGS. 11b and 19, in accordance with a second measurement process 1904, the air density, i.e. static density ρ, is determined from an integral of the molecular signal component 130.2, 132.2 of the circular fringes 80' of the associated circular fringe patterns 80 associated with the scattered light signal 32'. The density of the atmosphere 16 is related to molecular density, not aerosol density. Accordingly, the Rayleigh scatter is separated from the Mie scatter by spectrally resolving the scattered light and de-convolving the spectrum into associated molecular and aerosol contributions, which provides for determining the density of the atmosphere 16 from the associated molecular component responsive to the total number of photons therein, i.e. responsive to an integral of the molecular signal component in accordance with Rayleigh scattering theory. The denser the air is, the more molecules are present to scatter light 32 back to the telescope 24' for detection by the associated detection system 46. The observables MolCounts and AeroCounts inherently provides for a deconvolution of the spectrum into the associated molecular and aerosol contributions, i.e. MolCounts is responsive to the integral of the molecular contribution, and AeroCounts is responsive to the integral of the aerosol contribution. Accordingly, static density is given by $\rho = C \cdot MolCounts$, wherein C is an empirically determined constant that depends upon the parameters that define the range imaging LIDAR system 10, i.e. the laser power, interaction region, the transmission of the system, the gain of the detectors, the size of the telescope 24', and the coefficient of scatter from the atmospheric molecules 16'.

Referring to FIGS. 11b and 19, in accordance with a third measurement process 1906, the absolute temperature, i.e. static temperature $T_S$, of the atmosphere 16 is determined from a width of the molecular signal component 130.2, 132.2 of the circular fringes 80' of the associated circular fringe patterns 80 associated with the scattered light signal 32'. The temperature of the atmosphere 16 affects the random thermal motions of the constituent molecules, which causes an associated thermal broadening—referred to as "Doppler broadening" in the field of spectroscopy because of the random velocities in all directions of an ensemble of molecules—of the spectrum of the associated scattered radiation, thereby increasing the associated signal bandwidth which produces correspondingly wider fringes in the associated circular fringe patterns 80 from the Fabry-Pérot interferometer 44. The absolute temperature of the atmosphere 16 is directly related to this signal bandwidth, and is directly determined as the observable temperature t.

Figure 20:
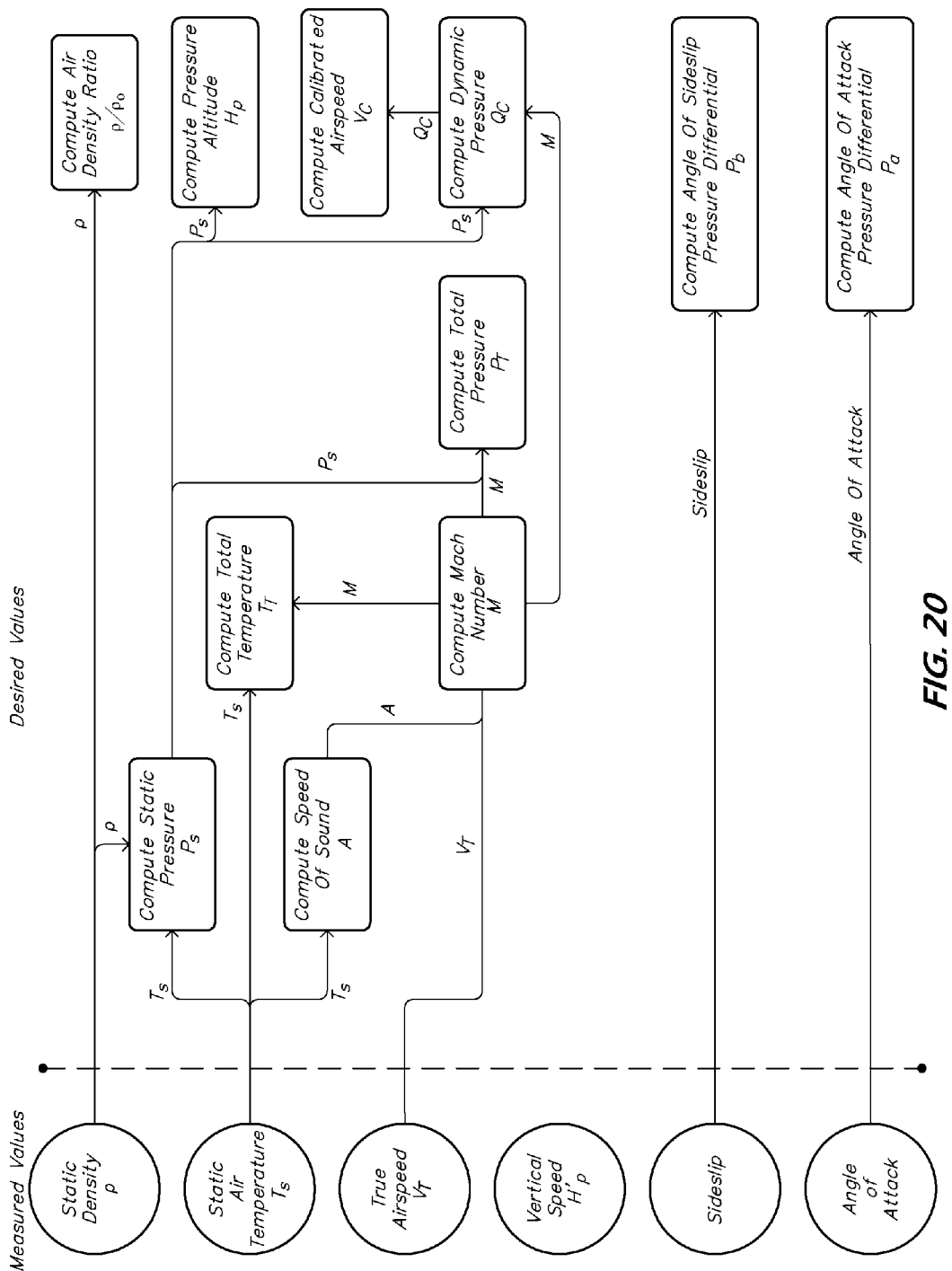
FIG. 20 illustrates a flow chart of a process for determining derived air data products with a range imaging LIDAR system.

Referring to FIG. 19, for the example of an air data system in an aircraft 400, various other measured air data products may be calculated as follows: In accordance a fourth measurement process 1908, the relative wind velocities $V_i$ determined by the first measurement process 1902 along corresponding associated directions are first transformed from a line-of-sight frame of reference to a frame of reference ($x_m$, $y_m$ and $z_m$) of the range imaging LIDAR system 10, and then to a frame of reference (x, y, z) of the aircraft 400 using known transformations, so as to provide the relative wind velocities $V_X$, $V_Y$ and $V_Z$ in the frame of reference (x, y, z) of the aircraft 400, from which the true airspeed $V_T$ may be calculated from the relative wind velocities $V_X$, $V_Y$ and $V_Z$ in accordance with a fifth measurement process 1910. The vertical speed H'P is given by the Z-component of relative wind velocity $V_Z$. The sideslip may be calculated from the Y-component of relative wind velocity $V_Y$ and the true airspeed $V_T$ in accordance with a sixth measurement process 1912. The angle of attack may be calculated from the X and Z-components of relative wind velocity $V_X$ and $V_Z$ in accordance with a seventh measurement process 1914. The Aerosol-to-Total Scattering Ratio (ASR) may also be calculated as the ratio of the observable AeroCounts to the sum of the observables MolCounts, Aero-Counts and BackCounts. Referring to FIG. 20, the measured values of static density $\rho$, static temperature $T_S$, true airspeed $V_T$, sideslip and angle of attack may then be used to compute the following derived values using associated known relations and processes: air density ratio, static pressure, total pressure, pressure altitude, total temperature, speed of sound, Mach number, dynamic pressure, calibrated airspeed, angle of sideslip pressure differential, and angle of attack pressure differential.

Figure 21:
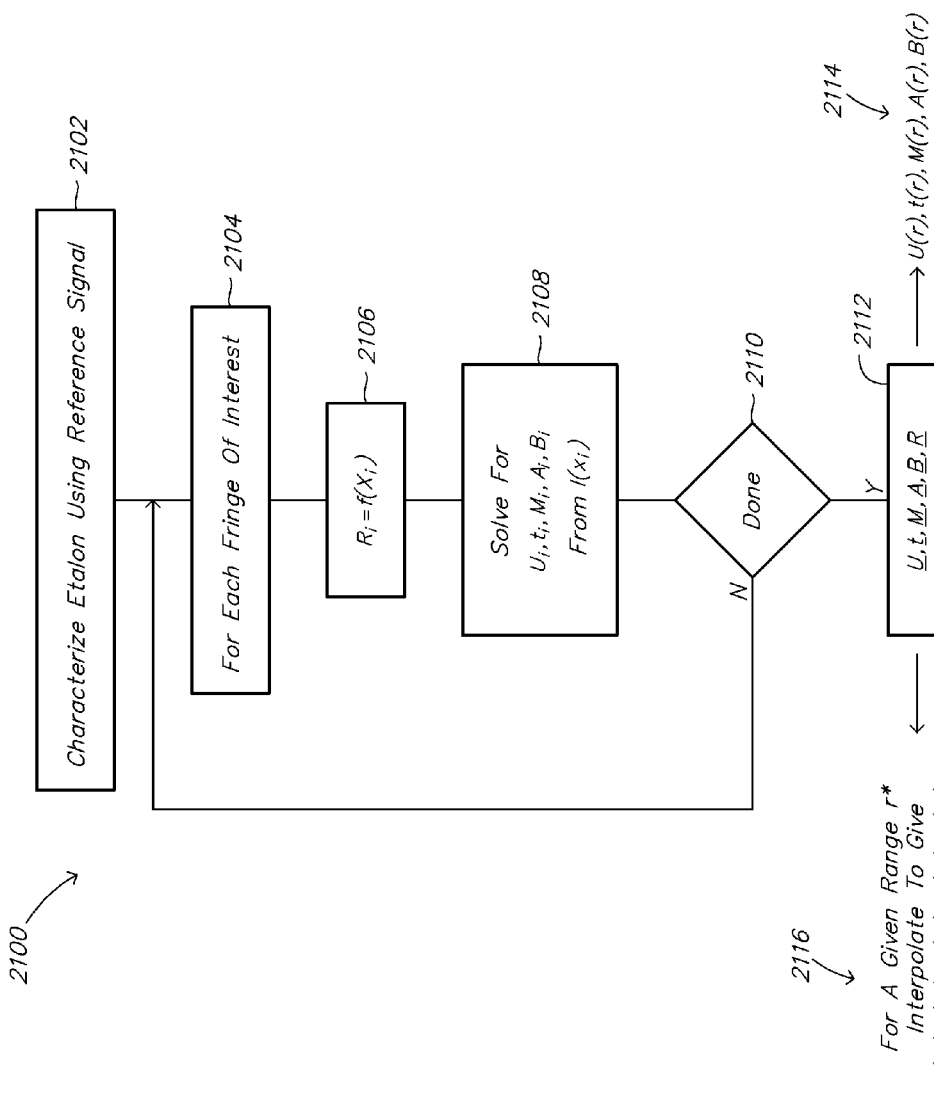
FIG. 21 illustrates a flow chart of a process for determining atmospheric measurements using a range imaging LIDAR system.

More particularly, referring to FIG. 21, in accordance with a process 2100 for determining measures of atmosphere from the scatter electronic image signal 64, in step (2102), the Fabry-Pérot etalon 50 is characterized using the reference electronic image signal 106, wherein the velocity u, molecular counts M and background counts B are all assumed to be zero, as are the partial derivatives with respect to molecular counts M, background counts B and temperature t. Then, beginning with step (2104), for each arcuate fringe 62', $I(X_i)$ of interest, in step (2106), the associated nominal range $R_i$ is given from a pre-determined function or table given the location in the output focal plane 44.2 of the arcuate fringes 62', $I(X_i)$ being analyzed. Then, in step (2108), given the measurement vector $I(X_i)$ of the arcuate fringe 62', one or more of the atmospheric measures: aerosol counts A, molecular counts M, velocity u, temperature t, and background counts B is solved as described hereinabove. Then, in step (2110), if all of the arcuate fringes 62', $I(X_i)$ of interest have not been analyzed, then the above process repeats with step (2104). Otherwise, in step (2112), vectors $\overline{U}$, $\overline{t}$, $\overline{M}$, $\overline{A}$, and/or $\overline{B}$ of the one or more measures for each of the arcuate fringes 62', $I(X_i)$ analyzed in step (2108) are returned, together with a nominal range vector $\overline{R}$ of associated nominal ranges R, wherein the nominal ranges $R_i$ of the nominal range vector will depend upon the associated velocities $U_i$ (responsive to Doppler shift), and the gap 58 of the Fabry-Pérot etalon 50. These vectors can then be used to either determine functions of one or more measures U(r), t(r), M(r), A(r*) or B(r) as a function of nominal range R, as indicated by step (2114), or to interpolate values one or more measures U(r*), t(r*), M(r*), A(r*) or B(r*) at a particular nominal range R*, as indicated by step (2116). Alternatively, the nominal range vector R may be fixed, i.e. associated with a set of predetermined nominal ranges R, by adjusting the gap 58 of the Fabry-Pérot etalon 50 responsive to Doppler shift, for example, with the etalon control actuator 72, so that the associated arcuate fringes 62' being analyzed remain at substantially fixed locations regardless of the conditions of the atmosphere 16.

Figure 22:
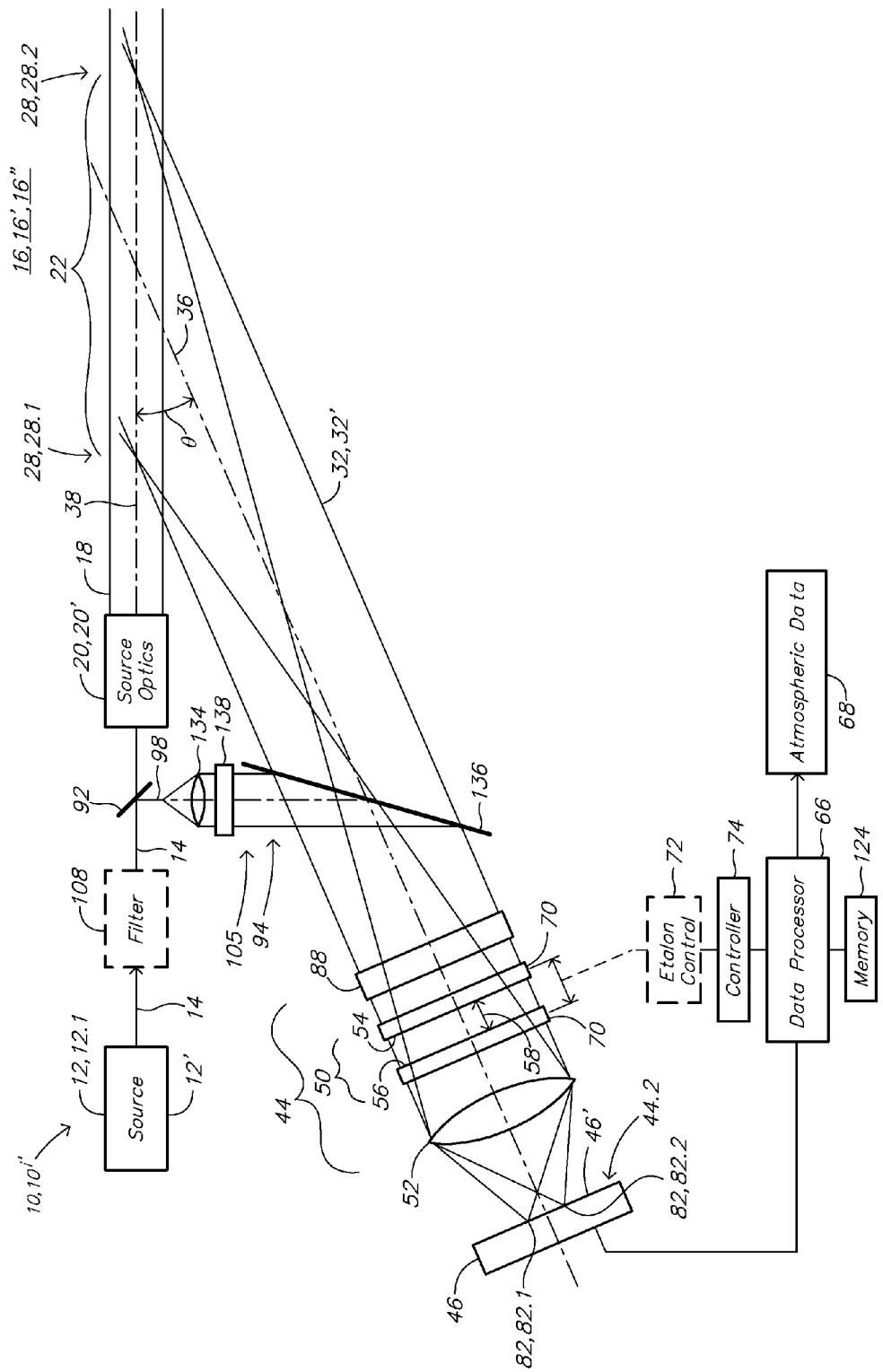
FIG. 22 illustrates a second embodiment of the first aspect of the range imaging LIDAR system, incorporating a Fabry-Pérot interferometer without an associated collimating lens.

Referring to FIG. 22, in accordance with a second embodiment of the first aspect, the range imaging LIDAR system 10, 10′′ may be built without the collimating lens 48 and input telescope 24'. With the detector 46' of the detection system 46 located in the output focal plane 44.2 of the imaging optics 52—which is where the circular fringes 80' produced by the Fabry-Pérot etalon 50 are sharpest—when the scattered light signal 32' is relatively close to the sensor, the resulting image 114 of the scatter fringe pattern 60 will be out of focus, but the pertinent information is still present in the image. The geometry between the source beam of light 18 and the field-of-view 34 of the receiver optics 24 is essentially the same as the system with the input telescope 24' and collimating lens 48.

A reference beam portion 90 of the substantially monochromatic light 14 from the light source 12 is reflected from a first beam splitter optic 92 so as to generate an associated reference source 94 which is coupled into an associated fiber optic 98 that routes the signal to where it is needed. The output from the fiber optic 98 is divergent and is subsequently collimated by an associated lens 134 and then combined with the scattered light 32 using a second beam splitter optic 136 that reflects a relatively small portion of the substantially monochromatic light 14 from the reference source 94 into the Fabry-Pérot interferometer 44 as the associated reference light signal 105 while transmitting a substantial portion of the scattered light 32 therethrough into the Fabry-Pérot interferometer 44 as the scattered light signal 32'.

The position of the fiber optic 98 in the image plane of the lens 134 determines where the associated image 114 of the reference light signal 105 will appear on the detection system 46. In one embodiment, the image 114 of the reference light signal 105 is positioned so as to not overlap the associated scattered light signal 32' in the output focal plane 44.2 of the Fabry-Pérot interferometer 44. In another embodiment, in accordance with the eighth aspect of the range imaging LIDAR system 10, 10$^{viii}$ described more fully herein below, the image 114 of the reference light signal 105 is positioned so as to overlap the associated scattered light signal 32', with the portion of the reference light signal 105 overlapping the scattered light signal 32' blocked by an associated mask 138 between the lens 134 and the second beam splitter optic 136.

The associated optics can be designed so that the reference light signal 105 will be sufficient to determine the center of the interference pattern produced by the Fabry-Pérot interferometer 44 as well as the location of the associated arcuate fringes 62', 62".

Figure 23:
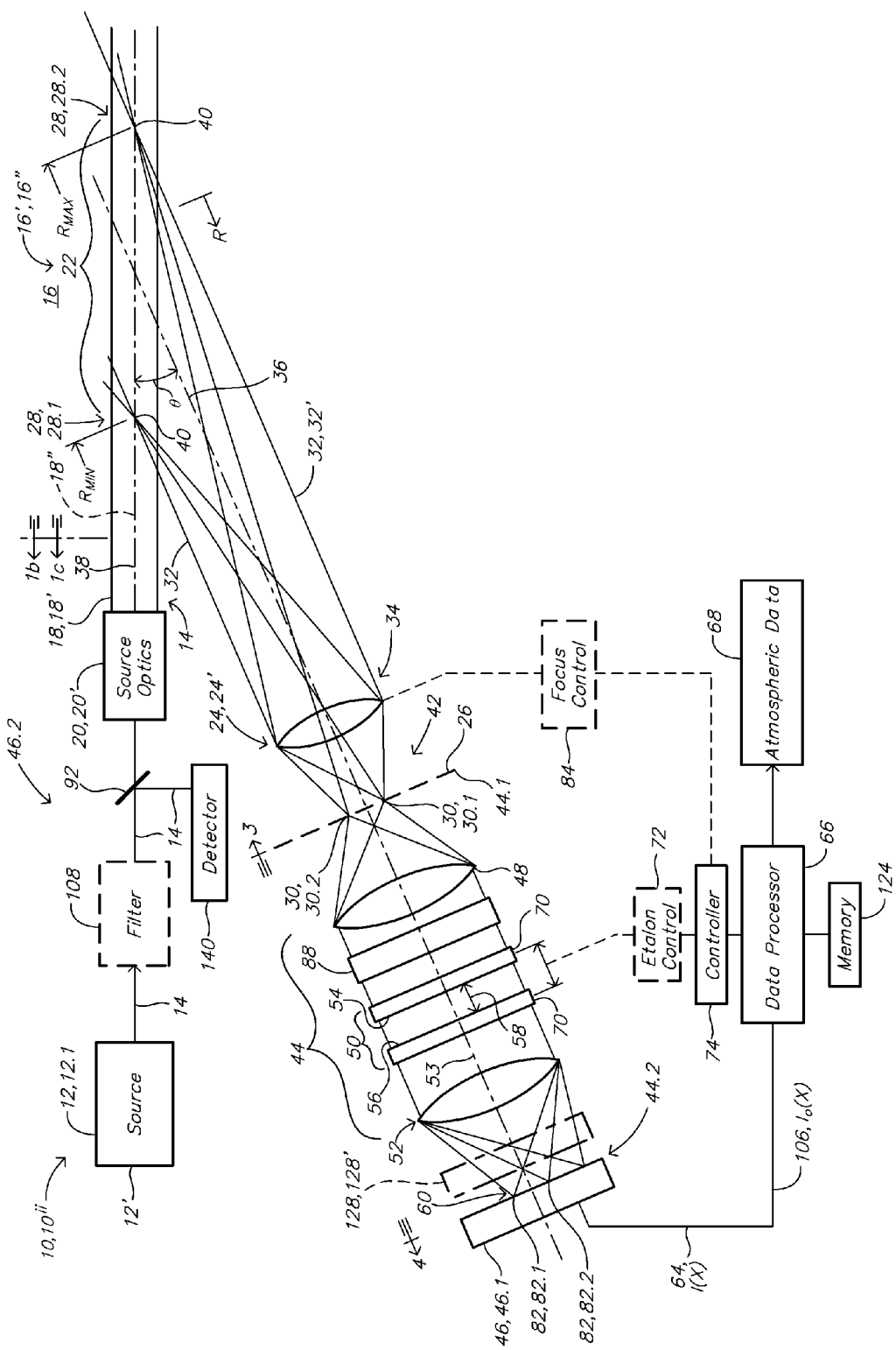
FIG. 23 illustrates an embodiment of a second aspect of range imaging LIDAR system incorporating a second aspect of an associated detection system, suitable for determining atmospheric measurements that are not dependent upon relative wind velocity.

Referring to FIG. 23, in accordance with a second aspect, the range imaging LIDAR system 10, 10$^{ii}$ may be adapted in accordance with a second aspect of an associated detection system 46.2 to measure the overall intensity of the reference source 94 with a detector 140, rather than processing the reference beam through the Fabry-Pérot interferometer 44, for example, so as to provide for either reducing the total number of signals processed with the Fabry-Pérot interferometer 44. Such an arrangement would be suitable when the associated atmospheric data 68 being measured therewith is not dependent upon relative wind velocity, the latter of which measure is calibrated responsive to a measure of frequency shift of the reference light signal 105 using the Fabry-Pérot interferometer 44. For example, the range imaging LIDAR system 10, 10$^{ii}$ illustrated in FIG. 23 would be suitable for measuring either or both of static density ρ and static temperature $T_S$, or to provide for deriving therefrom one or more of static air pressure, total air temperature, speed of sound, air density ratio or pressure altitude.

Referring to FIGS. 24a and 24b, a first embodiment of a third aspect of an associated detection system 46.3, 46.3' of a range imaging LIDAR system 10 incorporates a digital micromirror device (DMD) 142 comprising an array—for example, a Cartesian array of N rows and M columns—of associated micromirrors 144, each of which constitutes a controllable pixel 146 that is individually addressable and controllable to one of at least three possible associated pixel mirror rotational states 148, 150, 152. The digital micromirror device (DMD) 142 is located in the output focal plane 44.2 of the imaging optics 52 of the Fabry-Pérot interferometer 44 so as to receive the scatter 60 and reference 104 fringe patterns processed by the Fabry-Pérot interferometer 44, portions of which, when processed, are selectively reflected onto a pair of photodetectors 154$^A$, 154$^B$, for example, photomultiplier detectors 154$^{A'}$, 154$^{B'}$, from which complementary signals 156, 158 detected thereby are processed by the data processor 66 so as to provide for determining the associated measures of the atmosphere 16 therefrom as a function of nominal range R.

The micromirrors 144 of the associated array of micromirrors 144 of the digital micromirror device (DMD) 142 in the first pixel mirror rotational state 148 cause first portions 160' of either the scatter fringe pattern 60 or the reference fringe pattern 104 from the Fabry-Pérot interferometer 44 impinging thereupon to be reflected in a first direction 162 to an associated first objective lens 164, and to be directed thereby to the a first photomultiplier detector 154$^{A'}$. Similarly, micromirrors 144 of the associated array of micromirrors 144 of the digital micromirror device (DMD) 142 in the second pixel mirror rotational state 150 cause second portions 160" of either the scatter fringe pattern 60 or the reference fringe pattern 104 from the Fabry-Pérot interferometer 44 impinging thereupon to be reflected in a second direction 166 to an associated second objective lens 168, and to be directed thereby to the a second photomultiplier detector 154$^{B'}$. Finally, micromirrors 144 of the associated array of micromirrors 144 of the digital micromirror device (DMD) 142 in the third pixel mirror rotational state 152 cause third portions 160''' of either the scatter fringe pattern 60 or the reference fringe pattern 104 from the Fabry-Pérot interferometer 44 impinging thereupon to be reflected in a third direction 170 to the light block 172 that provides for absorbing light impinging thereupon. For example, in one embodiment, the third pixel mirror rotational state 152 corresponds to a state of substantially no rotation of the associated micromirrors 144, which may be achieved, for example, by applying a common voltage to the associated micromirror 144 and it associated mirror address electrodes and yoke address electrodes, so as to create an equal state of electrostatic repulsion between all associated pairs of electrodes associated with the micromirror 144, thereby maintaining the micromirror 144 in a substantially unrotated condition.

The micromirrors 144 of the digital micromirror device (DMD) 142 are relatively efficient, with overall efficiency approaching 90% in one set of embodiments. Accordingly, the digital micromirror device (DMD) 142 provides for digitally isolating light impinging thereupon into two disjoint sets for the portion of the light being analyzed, and for masking a remaining portion of the light. More particularly, the digital micromirror device (DMD) 142 is used to interrogate portions the scatter 60 and reference 104 fringe patterns from the Fabry-Pérot interferometer 44, and in cooperation with the associated first 154$^{A'}$ and second 154$^{B'}$ photomultiplier detectors, to provide for generating associated one or more pairs of associated complementary signals 156, 158, each responsive to the number of photons in the associated two disjoint sets of light reflected by the digital micromirror device (DMD) 142 resulting from a particular pattern of pixel mirror rotational states to which the associated array of micromirrors 144 of the digital micromirror device (DMD) 142 are set for a particular set of measurements, wherein the associated first 154$^{A'}$ and second 154$^{B'}$ photomultiplier detectors provide for counting the corresponding number of photons associated with each of the disjoint sets of light reflected by the digital micromirror device (DMD) 142.

Figure 25:
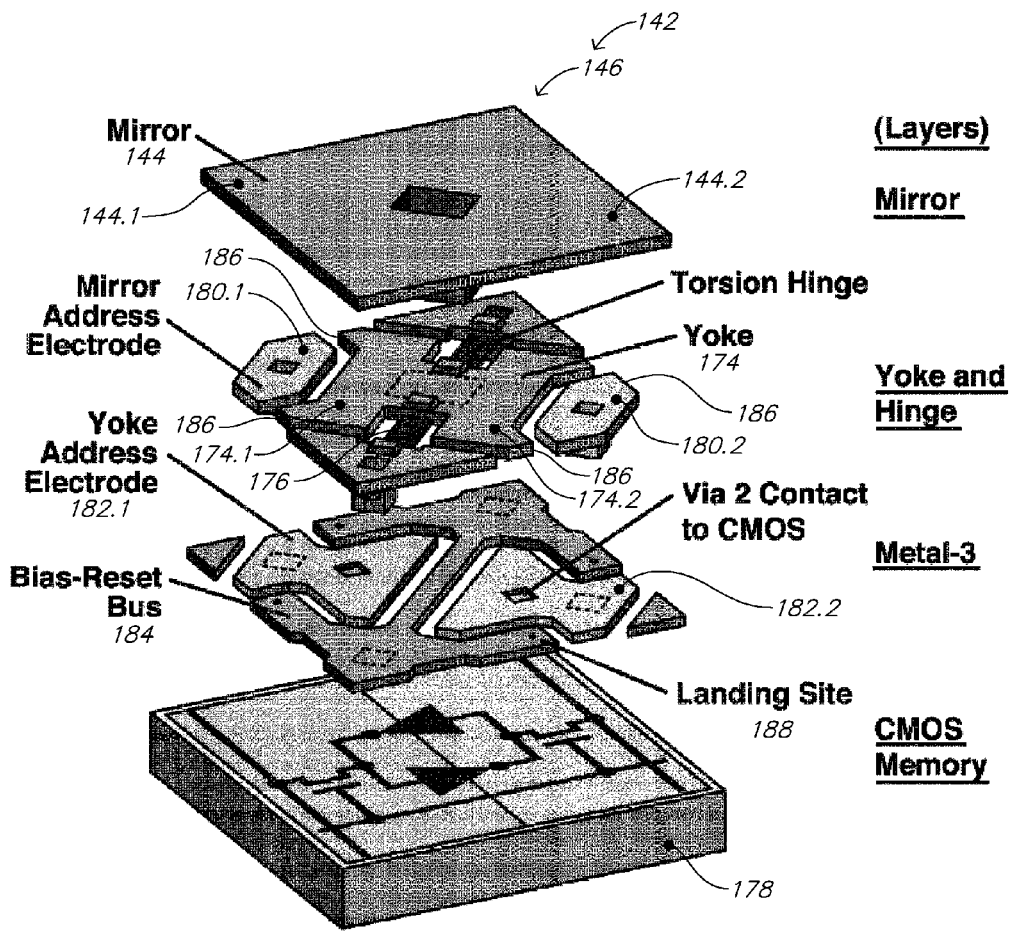
FIG. 25 illustrates a pixel element of a digital micromirror device.
Figure 26:
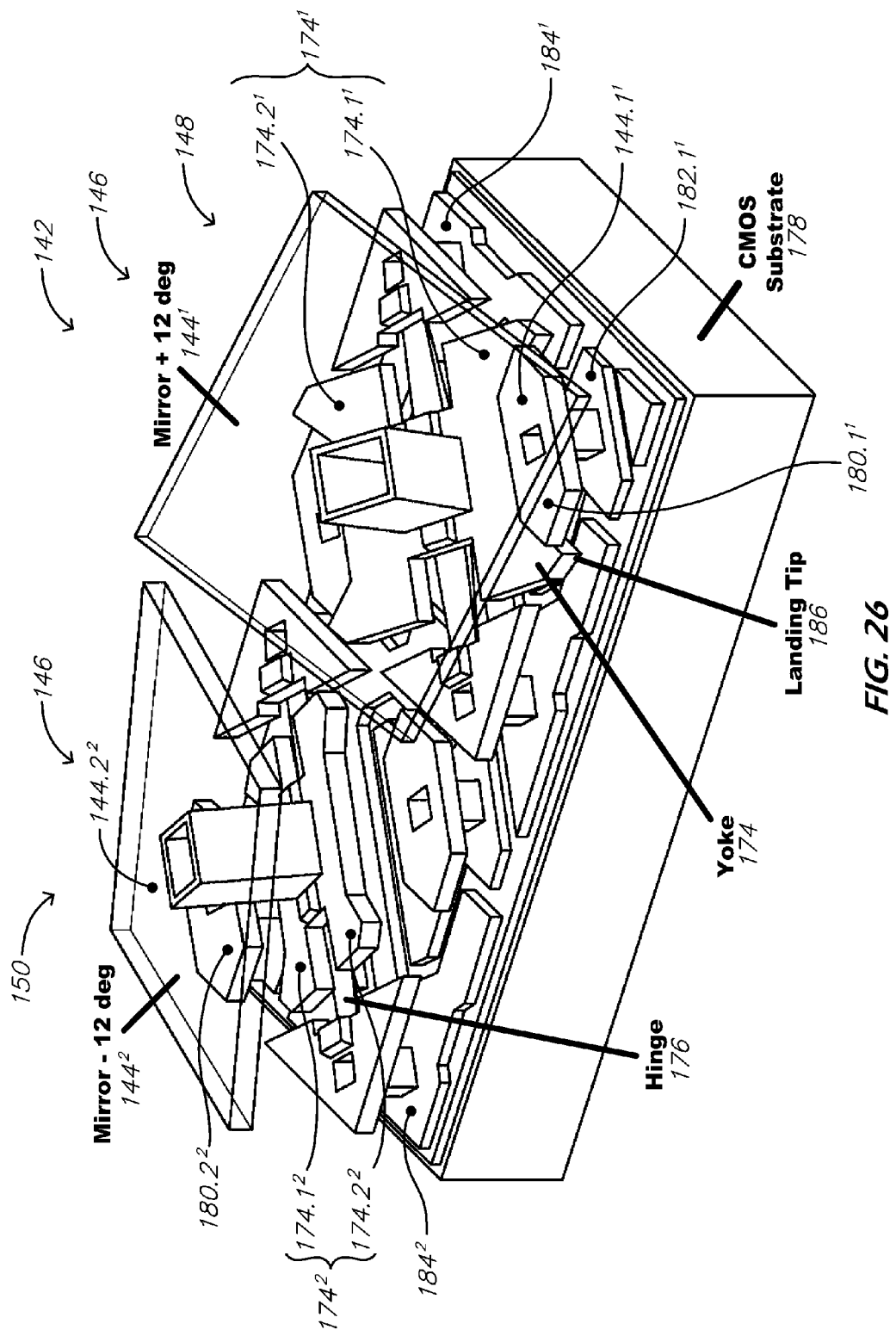
FIG. 26 illustrates two adjacent pixel elements of a digital micromirror device, each in a different pixel mirror rotational state.

For example, referring also to FIGS. 25 and 26, in accordance with the teachings of U.S. Pat. No. 5,535,047, and with the publication entitled "The Digital Micromirror Device: A Historic Mechanical Engineering Landmark", published by Texas Instruments Inc. and the American Society of Mechanical Engineers on 1 May 2008 with 20 pages, both of which references are incorporated herein by reference, one embodiment of the digital micromirror device (DMD) 142 comprises an array of 16 micron square movable micromirrors 144 on 17 micron centers, each micromirror 144 of which is mechanically supported by a yoke 174 suspended from a pair of compliant torsion hinges or flexures 176 operatively coupled to a common CMOS substrate 178. Each micromirror 144 is rotatable into one of two stable pixel mirror rotational states responsive to electrostatic attraction between a corner portion 144.1, 144.2 of the micromirror 144 and one of two associated elevated mirror address electrodes 180.1, 180.2, and responsive to electrostatic attraction between a corresponding on of two opposed portions 174.1, 174.2 of the yoke 174 and one of two associated yoke address electrodes 182.1, 182.2. The micromirror 144 is rotated to one of the two stable pixel mirror rotational states by applying a first voltage to the micromirror 144 and yoke 174 via a bias-reset bus 184 in electrical connection therewith, and applying a second voltage to one of the mirror address electrodes 180.1, 180.2, and a corresponding one of the yoke address electrodes 182.1, 182.2, wherein first corresponding mirror 180.1 and yoke 182.1 address electrodes are electrically connected with one another, second corresponding mirror 180.2 and yoke 182.2 address electrodes are electrically connected with one another, and the first and second voltages are set so as to provide for attraction between the first or second mirror 180.1, 180.2 and yoke 182.1, 182.2 address electrodes and corresponding portions of the micromirror 144.1, 144.2 and yoke 174.1, 174.2.

For example, referring to FIG. 26, with the first voltage applied to a first micromirror $144^1$ and associated yoke $174^1$ via the associated bias-reset bus $184^1$, a second voltage applied to the associated first mirror address electrode $180.1^1$ and to the associate first yoke address electrode $182.1^1$, causes the first corner portion $144.1^1$ of the first micromirror $144^1$ to be electrostatically attracted to the associated first mirror address electrode $180.1^1$, and causes the first opposed portion $174.1^1$ of the associated yoke $174^1$ to be electrostatically attracted to the associated first yoke address electrode $182.1^1$, thereby causing the first micromirror $144^1$ to rotate to the first pixel mirror rotational state 148, which for example, is illustrated in FIG. 26 as +12 degrees for a particular commercial embodiment, wherein the first and second voltages are adapted to provide for an electrostatically attractive force therebetween. Similarly, with the first voltage applied to a second micromirror $144^2$ and associated yoke $174^2$ via the associated bias-reset bus $184^2$, a third voltage applied to the associated second mirror address electrode $180.2^2$ and to the associate second yoke address electrode $182.2^2$, causes the second corner portion $144.2^2$ of the second micromirror $144^2$ to be electrostatically attracted to the associated second mirror address electrode $180.2^2$, and causes the second opposed portion $174.2^2$ of the associated yoke $174^2$ to be electrostatically attracted to the associated second yoke address electrode $182.2^2$, thereby causing the second micromirror $144^2$ to rotate to the second pixel mirror rotational state 150, which for example, is illustrated in FIG. 26 as −12 degrees for the particular commercial embodiment, wherein the first and third voltages are adapted to provide for an electrostatically attractive force therebetween. The tips 186 of the yoke 174 contact corresponding landing sites 188 on the associated bias-reset bus 184, and the landing sites 188 may be passivated so as to prevent or reduce stiction, so as to provide for reducing the voltage needed to either reset the micromirror 144 to a flat state, or to rotate the micromirror 144 to the other pixel mirror rotational state. Another commercial embodiment, for example, provides for mirror rotational states of +/−10 degrees. In the rest state, the micromirror 144 is flat, but this state is not addressable for individual pixels in one set of commercial embodiments.

Commercial digital micromirror devices (DMD) 142 comprise arrays of micromirrors 144 ranging from an array of 640×480 micromirrors 144 containing approximately a half million micromirrors 144 in total, to an array of 2048×1080 micromirrors 144 containing over two million micromirrors 144 in total. Each micromirror 144 of the array represents one pixel 146 of a pattern 190 of associated pixel mirror rotational states 148, 150, 152, wherein each pixel is independently controllable or programmable responsive to a signal from the data processor 66.

The scattered light signal 32' of the associated scattered light signal 32' received from the interaction region 22 associated with the field-of-view 34 of the telescope 24' is processed by the Fabry-Pérot interferometer 44 to generate an associated scatter fringe pattern 60 that is then separated by the digital micromirror device (DMD) 142 into disjoint portions 60', 60" that are then detected by the corresponding associated first $154^{A'}$ and second $154^{B'}$ photomultiplier detectors. The reference light signal 105 is processed by the same Fabry-Pérot interferometer 44, either simultaneously or sequentially, to generate an associated reference fringe pattern 104 that is then separated by the digital micromirror device (DMD) 142 or a separate corresponding digital micromirror device (DMD) (not illustrated) into disjoint portions 104', 104" that are then detected by the corresponding associated first $154^{A'}$ and second $154^{B'}$ photomultiplier detectors, or by a separate set of first and second photomultiplier detectors (not illustrated). The resulting complementary signals 156, 158 associated with the reference light signal 105 are used to provide for calibrating atmospheric measurements associated with the scattered light signal 32'. Accordingly, the range imaging LIDAR system 10 uses the Fabry-Pérot interferometer 44 to directly detect information from the scattered laser energy, wherein the scatter 32' and reference 105 light signals are each detected separately, and information from the reference light signal 105 can then be used to calibrate the associated scattered light signal 32'. The detection process is responsive to an incoherent Doppler shift of the laser light scattered by molecules and aerosols in the atmosphere 16 responsive to Rayleigh and Mie scattering respectively.

The response of a Fabry-Pérot interferometer 44 is well documented in the literature, for example, as described by P. B. Hays and R. G. Roble in "*A Technique for Recovering Doppler Line Profiles from Fabry-Perot Interferometer Fringes of very Low Intensity*", Applied Optics, 10,193-200, 1971, which is incorporated herein by reference. The ideal intensity distribution of a the fringe pattern for a single wavelength transmitted through a Fabry-Pérot interferometer 44 by a LIDAR system without optical defects is given by $$H_{ideal}(\varphi) = \frac{T^2}{1 + R^2 - 2R\cos(\varphi)} \tag{50.1}$$

where $$\varphi = \frac{4\pi\mu d}{\lambda}\left(1 - 2\frac{u}{c}\right)\cos(\theta) \tag{50.2}$$

wherein T is the transmissivity, R is the reflectivity, μ is the refractive index of the Fabry-Pérot etalon 50, d is the thickness of the gap 58, 58.1 of the Fabry-Pérot etalon 50, λ, is the wavelength of the source, θ is the angle of transmission through the Fabry-Pérot etalon 50, c is the speed of light, and u is the line-of-sight air velocity. Hence, the Doppler shift is 2 u/c. In the presence of a source distribution including many wavelengths and optical defects it is advantageous to use the Fourier cosine series expansion of the response. The distribution of intensity transmitted per molecular weight (of the scattering species) is given by:

$$H(\phi, m) = \frac{T^2}{1 - R^2}\left(1 + 2\sum_{n=1}^{\infty} R^n \exp\left(-\frac{n^2}{4}G^2(t)\right)\prod_k D_{n,k}\cos(n\phi)\right) \tag{51.1}$$

where $$G(t) = \frac{4\pi\mu d}{\lambda c}\sqrt{\frac{2A_0 kt}{m}} \tag{51.2}$$

where t is the atmospheric temperature, k is the Boltzmann constant, $A_0$ is Avogadro's number, m is the molecular mass of the scattering species, and the convolution effects of the optical defects are represented by associated defect coefficients $D_{n,k}$.

If there were no optical defects, then each of the defect coefficients $D_{n,k}$ would be identically equal to one. However, in a system with optical defects, these may be accounted for in various ways. For example, in accordance with a first method, the defect coefficients $D_{n,k}$ are calibrated using a reference source 94 that does not interact with the atmosphere 16. As long as the range imaging LIDAR system 10 stays calibrated then these defect coefficients $D_{n,k}$ may be used directly in the inversion of data to recover atmospheric state variables. As another example, in accordance with a second method, a signal from the reference light signal 105 is periodically collected together with one or more associated signals from the corresponding one or more scattered light signals 32', and the effect of the defect coefficients $D_{n,k}$ is computed by de-convolving the ideal signal, $H_{ideal}$, —for example, $H_{ideal}$ as given by equation (50.1),—from the recovered data using the Fourier transform of the ideal signal, $H_{ideal}$, for example, as given by equations (60.1), (60.2) and (61) described hereinbelow. The function G(t) approximates the effect of thermal broadening of a source by a low density gas, which effects are more precisely accounted for by Rayleigh-Brillouin scattering, although that level of detail is not essential to the practice of the range imaging LIDAR system 10.

For an atmosphere 16 containing both aerosols and molecules, and for the range imaging LIDAR system 10 adapted to sample the entire circular fringe pattern 80, the associated total response is given by:

$$I(\varphi) = AH(\varphi, m_A) + MH(\varphi, m_M) + \frac{T^2}{1-R^2} B \quad (52)$$

where I is the total number of photons reaching the photodetector 154, A is the number of photons that have been scattered by aerosols, M is the number of photons that have been scattered by molecules, B is the number of background photons transmitted to the range imaging LIDAR system 10 by the ambient atmosphere 16, $m_A$ is the molecular mass of an aerosol particle (for example, a very large number on the order of 1.0e5), and $m_M$ is the molecular mass of air (about 28.92). Given this model, the sensitivity of the system to the atmospheric variables A, M, u, t and B is respectively given by respectively taking partial derivatives of equation (52) with respect to each respective variable, as follows:

$$\frac{\partial I}{\partial A} = H(\varphi, m_A) \quad (53.1)$$

$$\frac{\partial I}{\partial M} = H(\varphi, m_M) \quad (53.2)$$

$$\frac{\partial I}{\partial u} = \left(A \frac{\partial}{\partial \varphi} H(\varphi, m_A) + M \frac{\partial}{\partial \varphi} H(\varphi, m_M)\right) \frac{\partial \varphi}{\partial u} \quad (53.3)$$

$$\frac{\partial I}{\partial t} \approx M \frac{\partial}{\partial t} H(\varphi, m_M), \text{ and} \quad (53.4)$$

$$\frac{\partial I}{\partial B} = \frac{T^2}{1-R^2} \quad (53.5)$$

where $$\frac{\partial \varphi}{\partial u} = -2 \frac{4\pi \mu d}{\lambda c} \cos(\theta). \quad (53.6)$$

Figure 27:
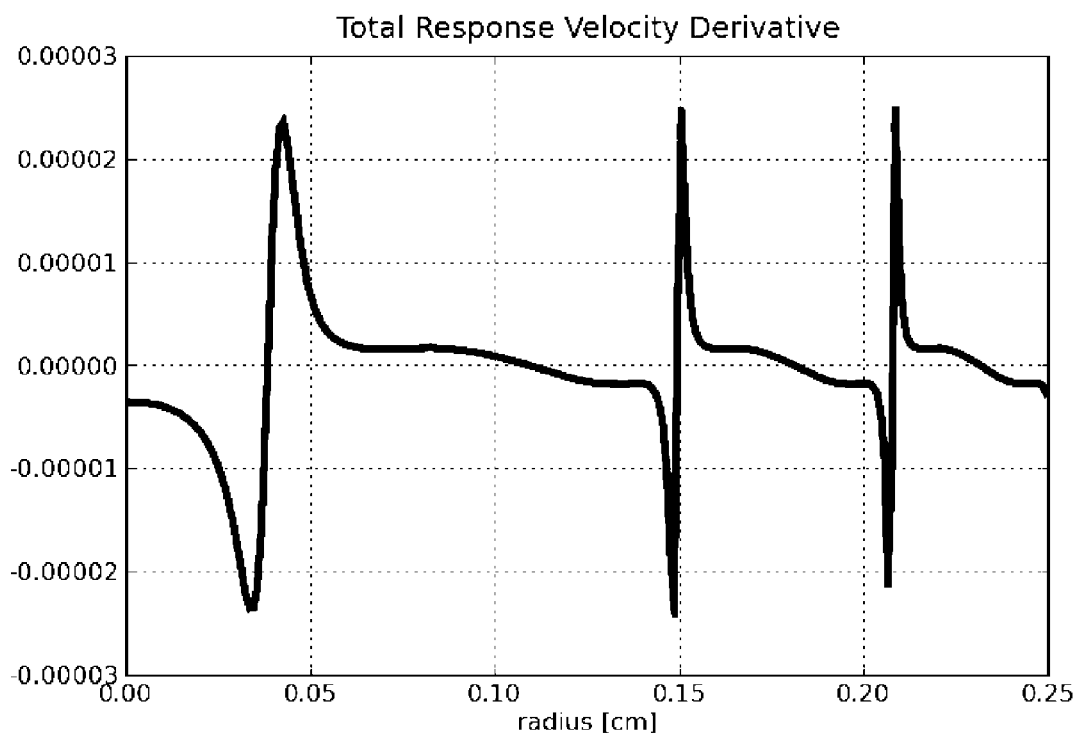
Figure 28:
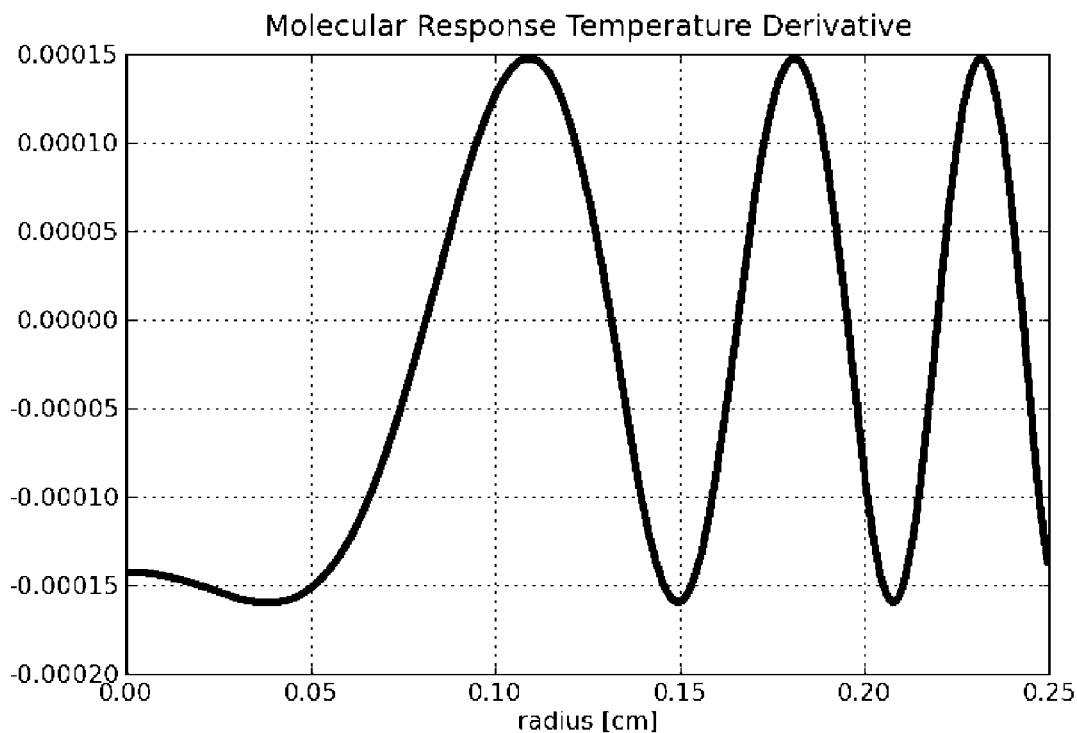

For example, FIG. 11a illustrates total fringe response I from equation (52) as a function of radius through the circular fringe pattern 80, and FIGS. 27 and 28 respective illustrate the corresponding partial derivatives thereof with respect to velocity u and temperature t, respectively, as given by equations (53.3) and (53.4), respectively.

The separate influence of molecules and aerosols is evident in the partial derivative of the total fringe response I with respect to velocity u illustrated in FIG. 27, wherein the aerosol contributions 192 are relatively narrow, with relatively sharp dipole-like features in the middle of each associated pattern; and the molecular contributions 194 are the relatively wide regions outside of the narrow aerosol contributions 192. Variations in the aerosol contributions 192 cause the centers 196 thereof to expand and contract as the density of aerosols changes, as illustrated in FIG. 11b. The temperature derivative illustrated in FIG. 28 is not affected by aerosol density, but an unknown variation in aerosol content will confuse the determination of temperature. Accordingly, the mutual influences of temperature t, velocity u, aerosol counts A, molecular counts M, and background counts B upon one another can be accounted for by simultaneously or contemporaneously measuring or determining all of the variables that exhibit mutual dependencies upon one another.

Generally, the range imaging LIDAR system 10 provides for sampling, collecting and integrating separate portions, for example, disjoint portions 60', 60", 104', 104", of the scatter 60 and reference 104 fringe patterns, and then using the resulting associated signals, for example complementary signals 156, 158, for each of a set of different disjoint portions 60', 60", 104', 104", to determine the values of the variables or parameters characterizing the associated scatter fringe pattern 60. The scatter 60 and reference 104 fringe patterns are sampled by the digital micromirror device (DMD) 142, with the pixel mirror rotational states 148, 150, 152 of the associated micromirrors 144 controlled according to a particular pattern 190, so that the micromirrors 144 in the first pixel mirror rotational state 148 provide for reflecting light from a first disjoint portion 60', 104' of the scatter 60 or reference 104 fringe pattern to the first objective lens 164, which focuses the light onto the first photomultiplier detector $154^{A'}$ that provides for integrating the light from the first disjoint portion 60', 104' of the scatter 60 or reference 104 fringe pattern so as to generate a first complementary signal 156; and so that the micromirrors 144 in the second pixel mirror rotational state 150 provide for simultaneously reflecting light from a second disjoint portion 60", 104" of the scatter 60 or reference 104 fringe pattern to the second objective lens 168, which focuses the light onto the second photomultiplier detector $154^{B'}$ that provides for integrating the light from the second disjoint portion 60", 104" of the scatter 60 or reference 104 fringe pattern so as to generate a second complementary signal 158. This process is repeated for each different set of N different sets of disjoint portions 60', 60" of the scatter fringe pattern 60, and for one set of disjoint portions 104', 104" of the reference fringe pattern 104, so as to provide for generating N corresponding sets of complementary signals 156, 158, from which up to N different variables or parameters can be characterized.

For example, in accordance with a first aspect, the scatter fringe pattern 60 is characterized with respect to the following N=5 variables: aerosol counts A, molecular counts M, velocity u, temperature t, and background counts B as provided by equations (51.1), (51.2) and (52) hereinabove, using a corresponding N=5 different patterns 190 of pixel mirror rotational states 148, 150, 152 of the micromirrors 144 of the digital micromirror device (DMD) 142, wherein each of the associated patterns 190 is chosen in advance based upon the expected sensitivity of the optical response with respect to each of these variables. For example, in on embodiment, the pattern 190 of pixel mirror rotational states 148, 150, 152 for each of the N=5 variables are chosen responsive to the sign of the partial derivatives of the total fringe response I($\phi$) with respect to that variable, i.e. responsive to the sign of equations (53.1)-(53.5), subject to a fixed offset, respectively. For example, FIGS. 29-33 are examples of patterns 190 of pixel mirror rotational states 148, 150, 152 of the micromirrors 144 of the digital micromirror device (DMD) 142 for determining measures of aerosol counts A, molecular counts M, velocity u, temperature t, and background counts B, respectively, as given by the sign of equations (53.1)-(53.5), respectively, wherein the black regions in FIGS. 29-33 are where the value of the corresponding equations (53.1)-(53.5), plus an offset, are negative, for which the associated digital micromirror device (DMD) 142 are controlled to a first pixel mirror rotational state 148; and the white regions in FIGS. 29-33 are where the value of the corresponding equations (53.1)-(53.5), plus an offset, are positive, for which the associated digital micromirror device (DMD) 142 are controlled to a second pixel mirror rotational state 150. FIGS. 34a-e illustrate radial cross-sections through the corresponding patterns illustrated in FIGS. 29-33, respectively, from the center of each pattern 190 of pixel mirror rotational states 148, 150, 152, outwards.

More particularly, FIG. 29 illustrates an example of the pattern 190, 190.1 of pixel mirror rotational states 148, 150, 152 of the micromirrors 144 of the digital micromirror device (DMD) 142, based upon the sign of the value of equation (53.1), used to obtain a corresponding first set of complementary signals 156.1, 158.1 responsive to a measure of aerosol counts A, wherein the a radial cross-section through the pattern 190, 190.1 of pixel mirror rotational states illustrated in FIG. 29, from the center thereof outwards, is illustrated in FIG. 34a. Furthermore, FIG. 30 illustrates and example of the pattern 190, 190.2 of pixel mirror rotational states 148, 150, 152 of the micromirrors 144 of the digital micromirror device (DMD) 142, based upon the sign of the value of equation (53.2), used to obtain a corresponding second set of complementary signals 156.2, 158.2 responsive to a measure of molecular counts M, wherein the a radial cross-section through the pattern 190, 190.2 of pixel mirror rotational states illustrated in FIG. 30, from the center thereof outwards, is illustrated in FIG. 34b. Yet further, FIG. 31 illustrates and example of the pattern 190, 190.3 of pixel mirror rotational states 148, 150, 152 of the micromirrors 144 of the digital micromirror device (DMD) 142, based upon the sign of the value of equation (53.3), used to obtain a corresponding third set of complementary signals 156.3, 158.3 responsive to a measure of velocity u, wherein the a radial cross-section through the pattern 190, 190.3 of pixel mirror rotational states 148, 150, 152 illustrated in FIG. 31, from the center thereof outwards, is illustrated in FIG. 34c. Yet further, FIG. 32 illustrates and example of the pattern 190, 190.4 of pixel mirror rotational states 148, 150, 152 of the micromirrors 144 of the digital micromirror device (DMD) 142, based upon the sign of the value of equation (53.4), used to obtain a corresponding fourth set of complementary signals 156.4, 158.4 responsive to a measure of temperature t, wherein the a radial cross-section through the pattern 190, 190.4 of pixel mirror rotational states 148, 150, 152 illustrated in FIG. 32, from the center thereof outwards, is illustrated in FIG. 34d. Yet further, FIG. 33 illustrates and example of the pattern 190, 190.5 of pixel mirror rotational states 148, 150, 152 of the micromirrors 144 of the digital micromirror device (DMD) 142, based upon the sign of the value of equation (53.5), used to obtain a corresponding fifth set of complementary signals 156.5, 158.5 responsive to a measure of temperature t, wherein the a radial cross-section through the pattern 190, 190.5 of pixel mirror rotational states 148, 150, 152 illustrated in FIG. 33, from the center thereof outwards, is illustrated in FIG. 34e.

It should be noted that the pattern 190, 190.1 of pixel mirror rotational states 148, 150, 152 used for the measure of aerosol counts A is a subset of the pattern 190, 190.2 of pixel mirror rotational states 148, 150, 152 used for the measure of molecular counts M, and that each of the patterns 190, 190.1-190.5 of pixel mirror rotational states 148, 150, 152 is mathematically independent of the others, so that none of these patterns 190, 190.1-190.5 may be constructed by superposition of the other patterns 190, 190.1-190.5 of pixel mirror rotational states 148, 150, 152. Accordingly, the five sets of complementary signals 156.1-156.5, 158.1-158.5 from the first 154$^A$ and second 154$^B$ photodetectors for the circular fringe pattern 80 from the scattered light signal 32' provides sufficient information as necessary to determine aerosol counts A, molecular counts M, velocity u, temperature t, and background counts B therefrom.

Generally, any collection of patterns 190 of pixel mirror rotational states 148, 150, 152 that are spatially independent will work however, not all patterns 190 of pixel mirror rotational states 148, 150, 152 provide the same expected error. The optimum selection of patterns 190 of pixel mirror rotational states 148, 150, 152 depends on the variables of interest in the remote sensing problem at hand and also on the state of the solution being sought. In accordance with the first aspect, the patterns 190 of pixel mirror rotational states 148, 150, 152 are chosen in view of an associated model of the optical response of the range imaging LIDAR system 10, wherein the derivatives of the optical response provide for resulting associated complementary signals 156, 158 that are sensitive to changes in the associated variables of interest. From the partial derivatives of the total fringe response I with respect to aerosol counts A, molecular counts M, velocity u, temperature t, and background counts B as given by equations (53.1)-(53.5), the associated regions of interest are relatively broad and well defined. For example, referring to FIGS. 27 and 28, there are clear zones where the partial derivative is positive and others that where the partial derivative is negative. These zones explicitly map how the velocity u and temperature t information, respectively, is contained in the fringe pattern.

Figure 35:
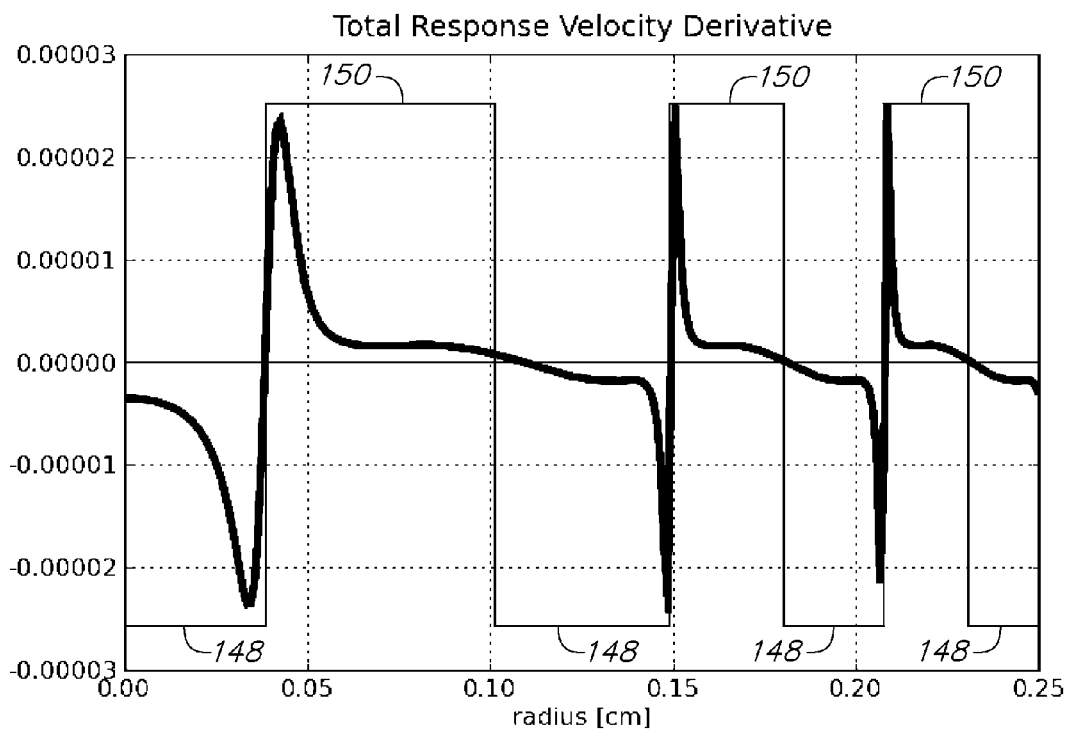
FIG. 35 illustrates a partial derivative with respect to velocity of the intensity distribution of FIG. 11a as in FIG. 27, upon which is superimposed a corresponding radial cross-section of a first set of associated complementary reflection patterns of a digital micromirror device programmed to gather associated complementary velocity signal components, for a first value of a velocity threshold that distinguishes the complementary components of the associated complementary reflection patterns.
Figure 36:
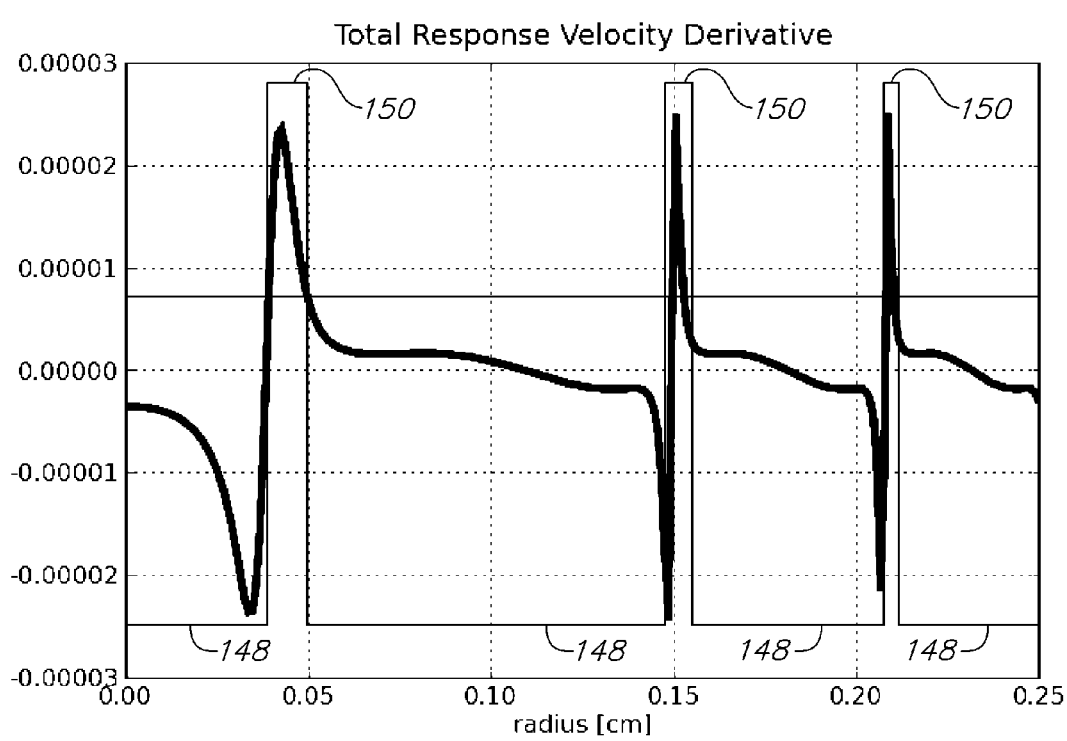
FIG. 36 illustrates a partial derivative with respect to velocity of the intensity distribution of FIG. 11a as in FIG. 27, upon which is superimposed a corresponding radial cross-section of a second set of associated complementary reflection patterns of a digital micromirror device programmed to gather associated complementary velocity signal components, for a second value of a velocity threshold that distinguishes the complementary components of the associated complementary reflection patterns.

In accordance with a second aspect, the patterns 190 may be adapted as with the first aspect, but with the use of an associated threshold when mapping the results of equations (53.1)-(53.5) to the corresponding patterns 190, wherein the patterns 190 are then given responsive whether or not the value of the associated derivative is either greater or less than a chosen threshold, for example, as shown in FIGS. 35 and 36 for two different threshold values—zero and +30% of signal amplitude, respectively—as applied to equation (53.3) for partial derivative with respect to velocity u. More particularly, FIG. 35 illustrates a pattern 190.3 of pixel mirror rotational states 148, 150, 152 for determining a measure of velocity u superimposed upon the partial derivative of the total fringe response I with respect to velocity u as given by equation (53.3), for a circular fringe pattern 80 with three orders on the photodetector, and for a threshold of zero, wherein the corresponding pattern 190.3 of pixel mirror rotational states 148, 150, 152 illustrated in FIG. 34c has three positive regions and four negative regions, so that three complete rings of micromirrors 144 would be tilted in a first pixel mirror rotational state 148 towards the first photodetector 154$^A$ and four complete rings would be tilted in a second pixel mirror rotational state 150 toward the second photodetector 154$^B$. The incomplete rings illustrated in FIG. 31 would not be illuminated by the optical source. A different value for the threshold would cause some of the regions would grow and others to shrink, for example, as shown in FIG. 36 which illustrates the pattern 190.3 of pixel mirror rotational states 148, 150, 152 for a threshold setting of 0.3 times the associated peak amplitude. For the pattern 190.5 of pixel mirror rotational states 148, 150, 152 associated with background counts B, the partial derivative is a constant, so the associated pattern 190.5 of pixel mirror rotational states 148, 150, 152 is chosen to be spatially independent of the others. For example, a pattern 190.5 of pixel mirror rotational states 148, 150, 152 associated with the measure of background counts B could simply divide the radial domain in two by a parameterized proportionality threshold such that all radii above the threshold are imaged onto the first photodetector 154$^A$ and radii below the threshold onto the second photodetector 154.2$^B$. Patterns 190.1, 190.2 and 190.4, respectively, for aerosol counts A, molecular counts M, and temperature t, respectively, can be determined in a similar fashion.

The programmability of the digital micromirror device (DMD) 142 allows the regions being selected to be varied dynamically as the measurement conditions vary. For example: in the case of a LIDAR, the pattern 190.3 of pixel mirror rotational states 148, 150, 152 for velocity u is most sensitive when its divisions coincide with the fringe peaks (which move with velocity dependent Doppler shifts). Accordingly, real time accuracy can be improved if the pattern 190.3 of pixel mirror rotational states 148, 150, 152 for velocity u were adapted in real time to account for this shift. This ability to adapt the observations can be beneficial in a highly variable natural environment. Similarly, the temporal duration of exposure for each pattern 190 of pixel mirror rotational states 148, 150, 152 may be adjusted within a sample set, i.e. the duration of measurement may be different for different patterns 190 of pixel mirror rotational states 148, 150, 152, so as to provide for re-balancing the sensitivity of the range imaging LIDAR system 10 to increase accuracy in the state variable or state variables of greatest interest.

The choice of temporal exposure weighting and patterns 190 of pixel mirror rotational states 148, 150, 152 depend on the present environmental state and a ranking of the parameters of interest. One approach for examining potential systems is by a Monte-Carlo simulation. Another is by a non-linear optimization technique such as the Broyden-Fletcher-Goldfarb-Shanno (BFGS) method, a quasi-Newton, variable metric method, for example, as described by J. Nocedal and, S. Wright, *Numerical Optimization*, Springer-Verlag New York, Inc., 1999, pages 194-201, which is incorporated herein by reference. In these cases one may design a cost function based on the covariance of the minimum variance unbiased estimate—for example, as described by D. Luenberger in "*Optimization by Vector Space Methods*", John Wiley & Sons, Inc. (1969) on page 15, which is incorporated herein by reference—using the system dynamics from the model response and expected environmental noise, for example, as given by equation (70) hereinbelow. At which point Monte-Carlo can be employed to understand how the distribution of solutions vary with respect to the system design, or descent-based schemes can by employed to find a best candidate according to ones rankings of state variable accuracy.

Once a scheme for generating patterns 190 of pixel mirror rotational states 148, 150, 152 is established, the associated thresholds and temporal weighting fractions can then be mathematically optimized. The resulting optimal set of parameters will be referred to as a solution to the optimization problem. Given a pattern 190 of pixel mirror rotational states 148, 150, 152, the system partial derivatives (Jacobean Matrix) and the expected measurement covariance, one can estimate the inversion errors that would occur in using that system. In particular the Jacobean derivative, J, is given $$J = \left[\frac{\partial I}{\partial A}, \frac{\partial I}{\partial M}, \frac{\partial I}{\partial u}, \frac{\partial I}{\partial t}, \frac{\partial I}{\partial B}\right] \quad (54)$$

which allows the intensity at any phase point, $\phi$, to be approximated as $$I \approx I_0 + J[\Delta A, \Delta M, \Delta u, \Delta t, B]^T \quad (55)$$

The expected covariance of the noise in intensity is given by Q. In the case of a shot noise limited system this covariance would be a diagonal matrix of the counts collected in each measurement. The matrix of dynamics, W, is formed by integrating the Jacobean over each pattern 190 of pixel mirror rotational states 148, 150, 152 and applying the corresponding temporal weighting factor. Let $\Omega_A, \Omega_M, \Omega_u, \Omega_t, \Omega_B$ represent the patterns 190 of pixel mirror rotational states 148, 150, 152 that send light to the first photodetector, and $\tilde{\Omega}_A, \tilde{\Omega}_M, \tilde{\Omega}_u, \tilde{\Omega}_t, \tilde{\Omega}_B$ be the complements of these patterns 190 of pixel mirror rotational states 148, 150, 152 which send light to the second photodetector, then one can form a 10×5 matrix where the $k^{th}$ row is given by cycling $\Omega_k$ through the set $\{\Omega_A, \tilde{\Omega}_A, \Omega_M, \tilde{\Omega}_M, \Omega_u, \tilde{\Omega}_u, \Omega_t, \tilde{\Omega}_t, \Omega_B, \tilde{\Omega}_B\}$ and similarly for the temporal weighting fractions $p_k$ through $\{p_A, p_A, p_M, p_M, p_u, p_u, p_t, p_t, p_B, p_B\}$.

$$W[k,:] = p_k\left[\int\int_{\Omega_k}\frac{\partial I}{\partial A}d\Omega, \int\int_{\Omega_k}\frac{\partial I}{\partial M}d\Omega, \int\int_{\Omega_k}\frac{\partial I}{\partial u}d\Omega, \int\int_{\Omega_k}\frac{\partial I}{\partial t}d\Omega, \int\int_{\Omega_k}\frac{\partial I}{\partial B}d\Omega\right] \quad (56)$$

This equation (56) is valid for any set of patterns 190 of pixel mirror rotational states 148, 150, 152 (such as those shown in FIG. 34 *a-e*, 40 or 41). Similarly, for a shot noise limited system with expected intensity, $I_0$, the covariance is $$Q[k,:] = p_k \delta_{ik} \int\int_{\Omega_k} I_0 d\Omega \quad (57)$$

At this point one may compute the standard deviation of the errors expected in each measured parameter through the minimum variance unbiased estimator as $$\sigma = \sqrt{\mathrm{diag}([W^T Q^{-1} W]^{-1})} \quad (58)$$

Figure 37:
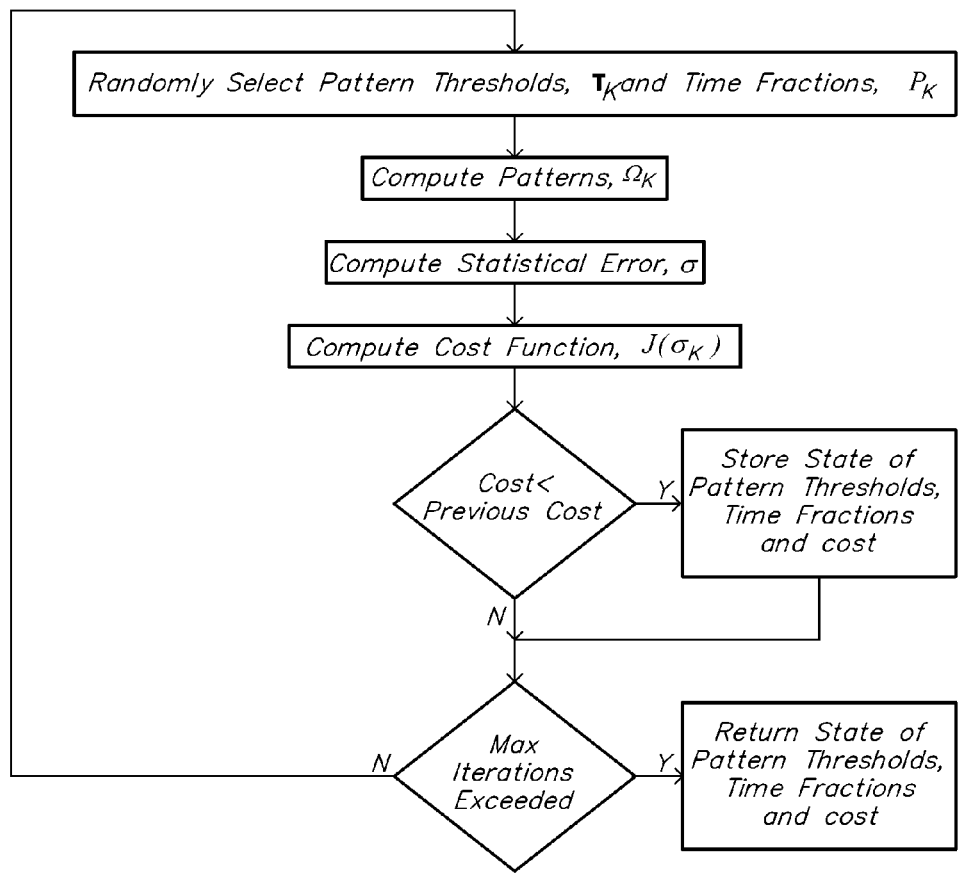
FIG. 37 illustrates a flowchart of a Monte Carlo simulation process.

Each element of the $\sigma$ vector represents the expected error in A, M, u, t, B respectively. With this ability to estimate the errors in each parameter of the system, one may perform a Monte-Carlo analysis to vary the associated thresholds and temporal weighting factors to see how the parameters affect the accuracy of the system, for example, in accordance with the Monte-Carlo procedure is illustrated in FIG. 37.

Figure 38:
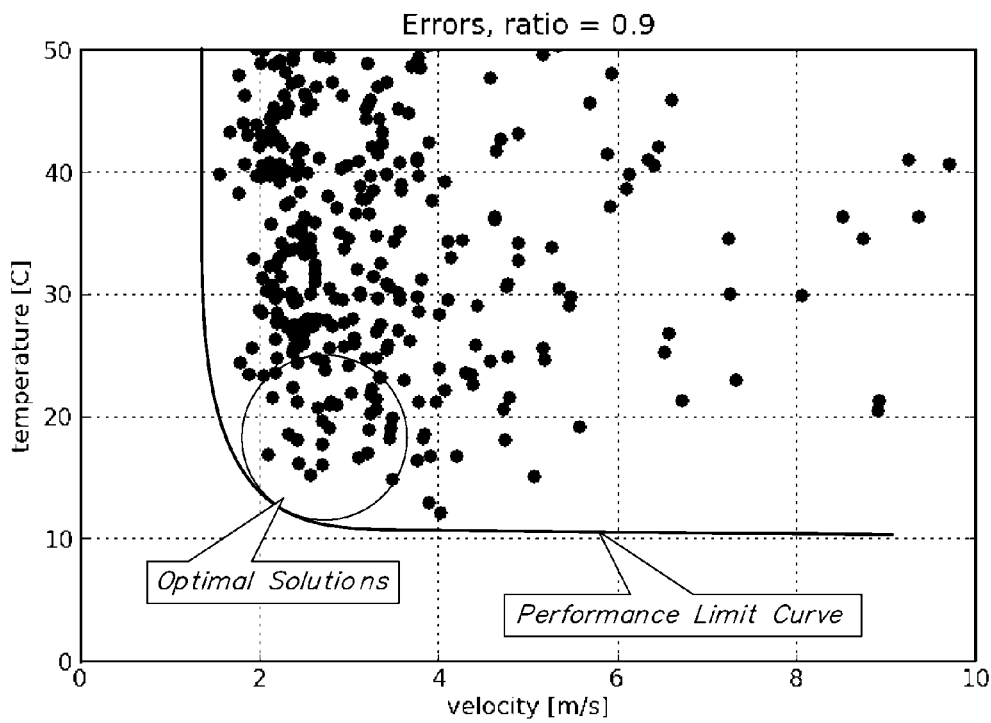
FIG. 38 illustrates the results from a Monte Carlo simulation used to optimize parameters associated with the complementary reflection patterns used to program a digital micromirror device for gathering signals used to determine atmospheric measurements from a fringe pattern output from a Fabry-Pérot interferometer.

The distribution of the solution space can be understood by viewing the Monte-Carlo results, for example, such as those shown in FIG. 38, where each point (solution) corresponds to a choice of temporal weightings and pattern thresholds. Such results can aid in choosing a cost function for a descent-based optimization. The simplest form of cost function is a dot product of weights with the standard deviations, $J(\sigma) = \langle \omega, \sigma \rangle$, where $\omega_k$ is a vector of length 5 whose entries magnitude reflect the relative importance of each variable that are particular to one's interest. Note that the effects of the selected thresholds and temporal weighting factors are embedded in the calculation of $\sigma$. Other more elaborate cost functions may be constructed as well by using any non-negative functional form (such as a Gaussian or logarithmic) such as:

Example Linear Cost Functional $$J(\sigma) = \langle \omega, \sigma \rangle = \sum_k \omega_k \sigma_k \qquad (59.1)$$

Example Gaussian Multivariate Functional $$J(\sigma) = B\exp\left(-\frac{1}{2}\sigma^T A \sigma\right) \qquad (59.2)$$

Example Logarithmic Functional $$J(\sigma) = \log(\langle \omega, \sigma \rangle^n + \gamma) \qquad (59.3)$$

FIG. 38 shows that there is a trade-off between accurately measuring velocity or temperature. The horizontal axis shows the expected error in velocity and the vertical axis shows the expected error in temperature. Some solutions work well for velocity determination and others for temperature. Normally, the best solution for velocity is not the best solution for temperature and one must compromise. The curve in FIG. 38 labeled "Performance Limit Curve" indicates the performance limit achievable by the system. There are many different solutions (weighting schemes and thresholds) in the knee of the curve identified by the circle labeled "Optimal Solutions" which will provide useful answers with expected errors as small as possible. In some cases it may be worthwhile to alternate between several system solutions in order to take turns giving answers that are best for each state of interest.

Figure 39:
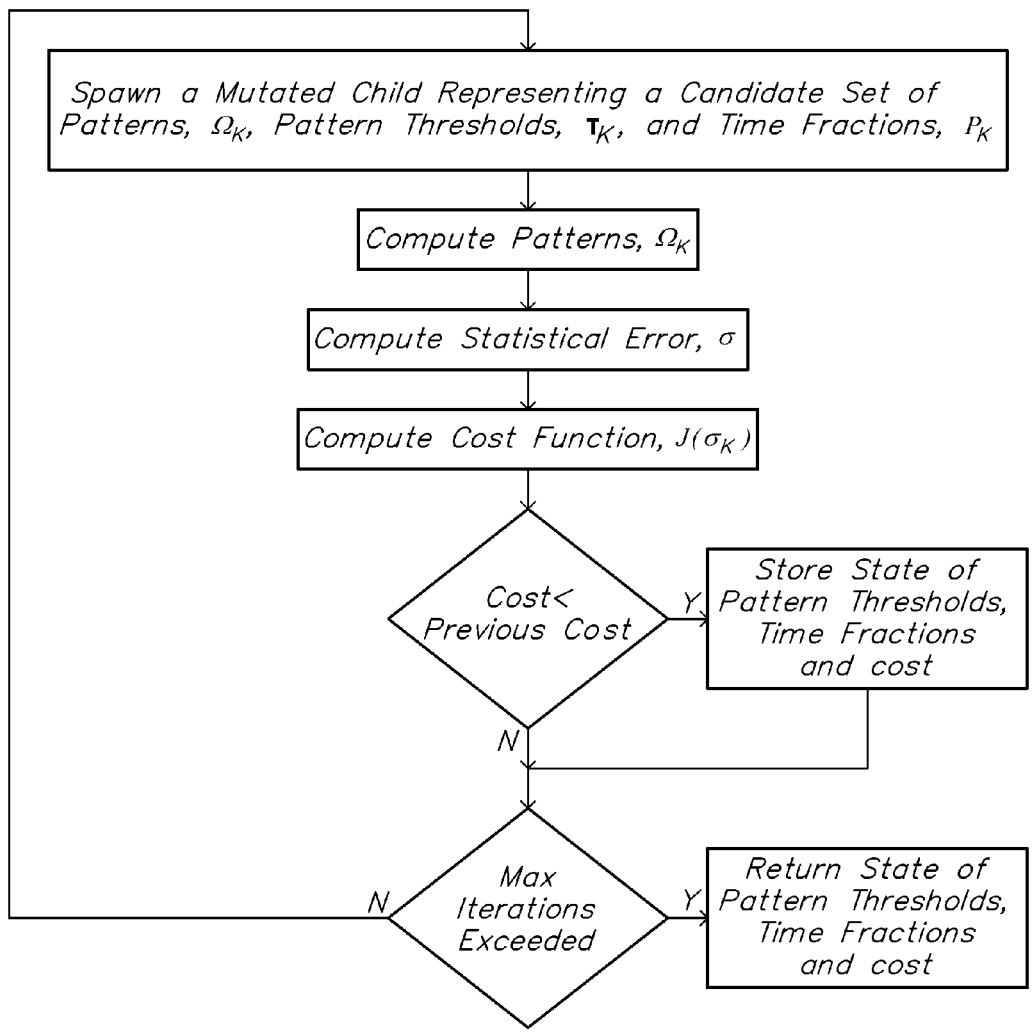
FIG. 39 illustrates a flowchart of a Genetic Algorithm process.

Alternatively, any number of schemes could be used to find patterns 190 of pixel mirror rotational states 148, 150, 152 which optimize a cost function. For example, in a Genetic algorithm procedure, the first step of FIG. 37 is changed from "Randomly select pattern thresholds" to "spawn a mutated child representing a candidate set of patterns 190 of pixel mirror rotational states 148, 150, 152 (or thresholds) and time fractions", as illustrated in FIG. 39.

Figure 40:
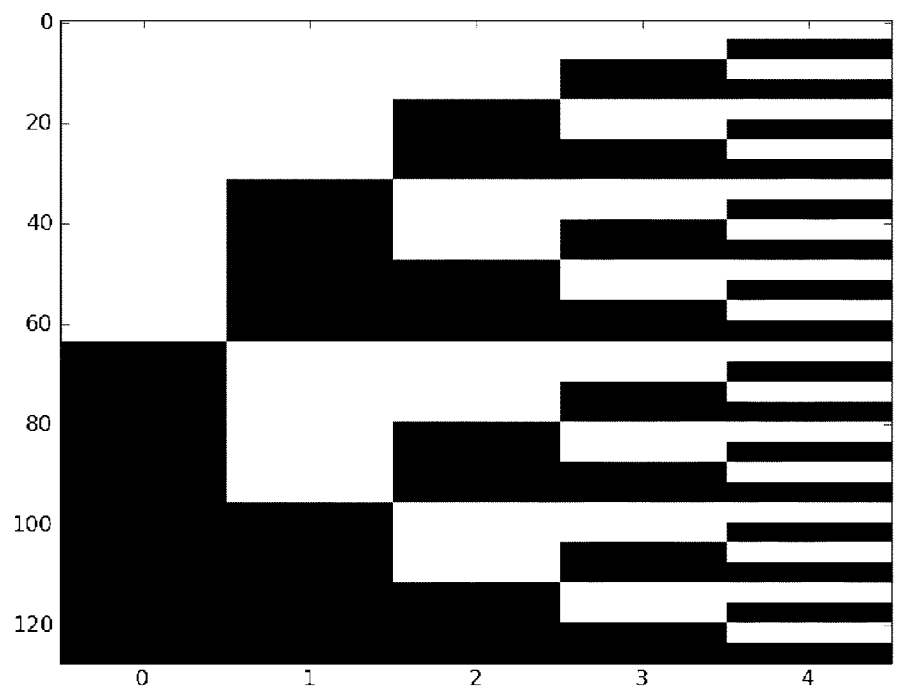
FIG. 40 illustrates a composite of radial cross-sections through a first alternative set of complementary reflection patterns.

It is an interesting point that the patterns 190 of pixel mirror rotational states 148, 150, 152 used with the Fabry-Pérot interferometer 44 are not required to be generated without regard to the expected fringe pattern. In fact, the only requirement is that the patterns 190 of pixel mirror rotational states 148, 150, 152 are algebraically independent, such that no pattern 190 of pixel mirror rotational states 148, 150, 152 can be constructed as a linear combination of the other patterns 190 of pixel mirror rotational states 148, 150, 152 in the set Referring to FIG. 40, as one example, an alternative set of patterns 190 of pixel mirror rotational states 148, 150, 152 can be generated by dyadic divisions in the radii, similar to a wavelet decomposition.

Figure 41:
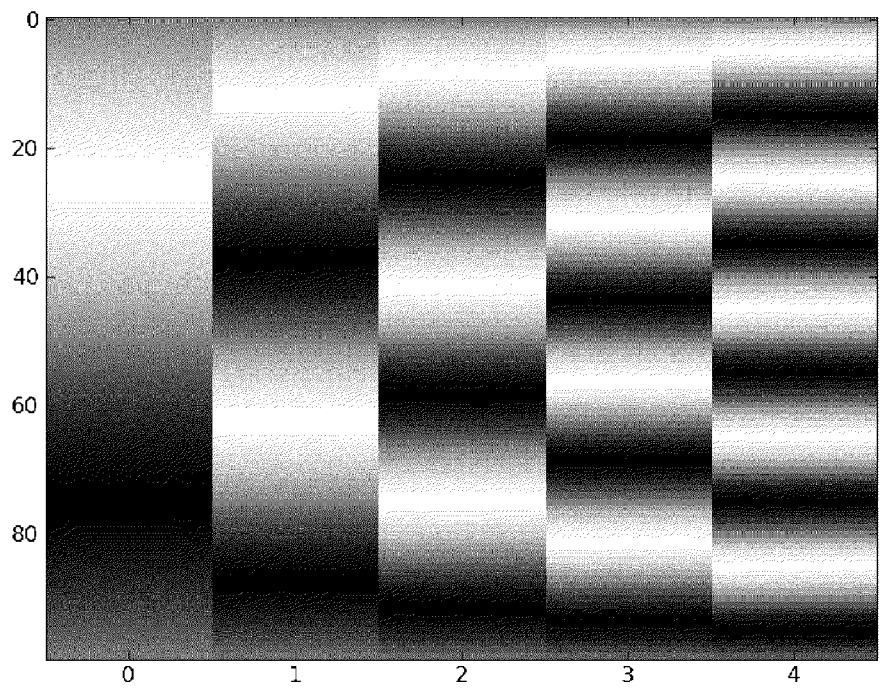
FIG. 41 illustrates a composite of radial cross-sections through a second alternative set of complementary reflection patterns.

Furthermore, the patterns 190 of pixel mirror rotational states 148, 150, 152 do not necessarily have to be radially symmetric. Although the information content of a Fabry-Pérot interferometer 44 is circularly symmetric, if circular symmetry of the selected patterns 190 of pixel mirror rotational states 148, 150, 152 is broken then one may consider the value of the pattern 190 of pixel mirror rotational states 148, 150, 152 for that specific radii to be the fraction (or probability) of pixels in either the first 148 or second 150 pixel mirror rotational states. Such a pattern 190 of pixel mirror rotational states 148, 150, 152 is shown in FIG. 41 where the gray values connote probabilities between 0 and 1.

The set of measurements of the complementary signals 156, 158 for the corresponding set of patterns 190 of pixel mirror rotational states 148, 150, 152 can then be used to estimate the parameters or measurements from the range imaging LIDAR system 10. All routines must account for the optical defects in the system as in equations (51.1-51.2). These defects typically have a convolution type response such as a defocus-blurring or an etalon wedge defect. In a Fabry-Pérot imaging system one can usually acquire a reference fringe pattern of the laser before it has interacted with the atmosphere. This response will contain all the information necessary to model the system's optical defects and any changes to the Fabry-Pérot etalon 50. For example changes in the temperature of a solid Fabry-Pérot etalon 50 will change its refractive index thereby changing the systems response to velocity and temperature. This information is readily accessible by comparing the Fourier Transform of the reference to the Fourier transform of the ideal signal. Term by term (i.e. per mode) division reveals the defect coefficients (in a noise free environment), for example, as described by T. L. Killeen and P. B. Hays in "*Doppler line profile analysis for a multi-channel Fabry-Perot interferometer,*" Applied Optics 23, 612 (1984), which is incorporated herein by reference. These can be applied to the forward model of the Fabry-Perot response as discussed earlier. As such, the Fourier expansion of an ideal signal, $H_{ideal} = H_0(\phi)$, and the reference signal, $H_{ref}(\phi)$, is $$H_0(\phi) = \frac{T^2}{1-R^2}\left(1 + 2\sum_{n=1}^{\infty} R^n \cos(n\phi)\right) = \sum_{n=0}^{\infty} \hat{H}_0[n] \times \cos(n\phi) \text{ and} \qquad (60.1)$$

$$H_{ref}(\phi) = \frac{T^2}{1-R^2}\left(1 + 2\sum_{n=1}^{\infty} R^n D_n \cos(n\phi)\right) = \sum_{n=0}^{\infty} \hat{H}_{ref}[n] \times \cos(n\phi), \qquad (60.2)$$

where the $\hat{H}[n]$ terms are the Fourier coefficients of the normalized responses. The orthogonality of the cosine basis implies that the nth coefficient of the optical defects can be obtained from $$D_n = \frac{\hat{H}_{ref}[n]}{\hat{H}_0[n]}. \qquad (61)$$

These are the terms to be computed in the calibration of the instrument. The reference signal is also used to track the intensity of the beam and any phase shifts in response due to drift of the gap 58, 58.1 of the Fabry-Pérot etalon 50. The refractive index of the Fabry-Pérot etalon 50 may be obtained by independently monitoring the temperature of the Fabry-Pérot etalon 50. This tracking is accomplished in an iterative process using measurements akin to equation (56). Starting with the matrix of dynamics $$W_{ref}[k,:] = p_k\left[\int\int_{\Omega_k} \frac{\partial I}{\partial A} d\Omega, \int\int_{\Omega_k} \frac{\partial I}{\partial u} d\Omega, \int\int_{\Omega_k} \frac{\partial I}{\partial B} d\Omega\right] \qquad (62)$$

and the vector of measurements $$M[k] = p_k \delta_{ik} \int \int_{\Omega_k} I_0 d\Omega \qquad (63)$$

then the change in those measurements is expected to be driven by changes in the state of the system. Hence the measurements at time j+1 are given by the previous measurements, j, and the system dynamics existing at the time of the jth measurement:

$$M_{j+1} = M_j + W_j \delta x \qquad (64)$$

where $\delta x = [\delta A, \delta u, \delta B]^T$. Recall that the phase is given by $$\varphi = \frac{4\pi \mu d}{\lambda}\left(1 - 2\frac{u}{c}\right)\cos(\theta) \qquad (65)$$

The velocity term should be zero, however changes in length d of the gap 58, 58.1 of the Fabry-Pérot etalon 50, will have a similar impact as velocity, namely $\delta d = -2 d \delta u/c$. Because the reference signal has not been broadened its response is exactly the same as the scatter signal from aerosols. As such, the aerosol term will be used to track the change in laser power. Equation (64) is then solved for the updates $[\delta A, \delta d, \delta B]^T$. These updates then define the normalization and phase changes necessary to consider for inversion of the total scatter signal. The reference state may be computed with each scattered signal, or as often as necessary to capture the rate at which the optical system changes (for example with temperature). If one can guarantee thermal stability via a temperature controlled Fabry-Pérot etalon 50 and housing then it may only be necessary to evaluate the reference periodically or on system initialization.

A similarly related technique is to divide the Fourier Transform coefficients of the reference fringe from the fringe pattern produced by the scattered atmospheric response. The remaining response reveals a phase shift (linearly correlated to the velocity via the expected Doppler shift) and broadening function related to the thermal effects. This method is very sensitive to noise in the collected data. More than the five patterns 190.1-190.5 of pixel mirror rotational states 148, 150, 152 already described would be used in order to recover the defect coefficients. One generally requires at least as many patterns 190 of pixel mirror rotational states 148, 150, 152 states as Fourier coefficients that one needs to faithfully represent the signal. In a rich aerosol environment this could be anywhere from 45 to 100 coefficients thus requiring the same number or more of independent measurements. One simple method gaining these measurements is to create a pattern 190 of pixel mirror rotational states 148, 150, 152 of rings which sweep outward from the center. These measurements may be made periodically within normal system operation and post-processed later to produce the analytical representation of the reference fringe. Alternatively, a large enough digital micromirror device (DMD) 142 could simultaneously image the atmospheric response with one set of patterns 190 of pixel mirror rotational states 148, 150, 152 and a reference fringe pattern with another set of patterns 190 of pixel mirror rotational states 148, 150, 152.

One method for estimating the parameters of the atmospheric state from the scattered signal is the classic Levenberg-Marquardt nonlinear least squares method which provides for varying smoothly between an inverse-Hessian method and a steepest descent method, as described, along with other suitable non-linear methods, by W. H. Press, S. A. Teukolsky, W. T Vetterling, and B. P. Flannery in *Numerical Recipes in C, The Art of Scientific Computing, Second Edition, Cambridge University Press*, 1992, pp. 656-661 and 681-706 which is incorporated herein by reference. This method works by iteratively minimizing the mean square error of a set of acquired samples against the output of a forward model (such as the model for the Fabry-Perot transmitted fringe pattern). It only requires the system dynamics equation given in equation (56) for any given state of the parameters. It operates by performing Quasi-Newton decent type steps toward the parameter state which minimizes the residual (mean square error of the difference between the data and the model). The algorithm works as follows:

Consider the measurements made with each pattern 190 of pixel mirror rotational states 148, 150, 152 to be the vector:

$$M[k] = p_k \delta_{ik} \int \int_{\Omega_k} I_0 d\Omega. \qquad (66)$$

Let $$Y[k] = p_k \delta_{ik} \int \int_{\Omega_k} I_{model}(A, M, u, t, B) d\Omega \qquad (67)$$

be the estimates of return signal given the model described in equations (50-52). As described in equation (56), the Jacobean of this model is:

$$W[k,:] = p_k \left[ \int \int_{\Omega_k} \frac{\partial I}{\partial A} d\Omega, \int \int_{\Omega_k} \frac{\partial I}{\partial M} d\Omega, \right.$$
$$\left. \int \int_{\Omega_k} \frac{\partial I}{\partial u} d\Omega, \int \int_{\Omega_k} \frac{\partial I}{\partial t} d\Omega, \int \int_{\Omega_k} \frac{\partial I}{\partial B} d\Omega \right] \qquad (68)$$

such that, given a state vector, $x=(A,M,u,t,B)$ (and another nearby state, $x_0$, the measured response is approximately:

$$Y(x) \approx Y(x_0) + W \cdot (x-x_0). \qquad (69)$$

One can form a cost functional for the mismatch of the model to the data:

$$F(x) = \|(Y(x)-M)\|_\sigma^2 = \Sigma_k (Y[k])^2/\sigma_k^2 = (Y-M)^T Q^{-1}(Y-M) \qquad (70)$$

Where $\sigma_k$ is the standard deviation (in counts) of the $k^{th}$ measurement, namely $\sqrt{M[k]}$ and Q is defined in equation (57).

One selects a candidate solution for x and then seeks to update it in a fashion that minimizes the cost functional. One method of minimizing this is via steepest descent iteration. A steepest descent step simply updates the guess using some fraction of the gradient, $x_{j+1}=x_j-\Delta t \cdot \nabla F(x_j)$. The gradient of the cost functional given in equation (68) is simply $$\nabla F(x) = W^T Q^{-1}(Y(x_0)-M+W \cdot (x-x_0)) \qquad (71)$$

The Levenberg-Marquardt algorithm extends this to handle quasi Newton steps by adding a curvature dependent regularization term and iteratively solving:

$$(W^T Q^{-1} W + \lambda \cdot \text{diag}(W^T Q^{-1} W)) \cdot \delta = W^T Q^{-1}(M-Y(x_0)) \qquad (72)$$

where $$\delta = (x_{j+1} - x_j), \qquad (73)$$

and the regularization parameter is updated via $$\lambda = \begin{cases} \lambda/\varepsilon, & \varepsilon > 1 : F \text{ decreasing} \\ \lambda \cdot \varepsilon, & \varepsilon > 1 : F \text{ increasing} \end{cases} \quad (74)$$

In the case of a velocity only solution, one may correlate the phase shift of the acquired data against the response of the model. A normalized correlation operation will produce a maximum for the correct response when swept through a sequence of parameters. This may be efficiently implemented by Fast Fourier Transforms. Correlation has a long history of utilization in Radar applications. This concept may be extended to solve for temperature and aerosol and molecular density.

One advantage of the range imaging LIDAR system 10 is that the associated ring or pattern parameters can be reconfigured rapidly. The micromirrors 144 of the digital micromirror device (DMD) 142 can be reconfigured in about 10 microseconds. This allows the instrument to adapt as the environment changes. One other advantage of this type of system is that there is no read noise from the pixels like there is with an imaging photodetector such as a CCD. The only noise is from the first $154^{A'}$ and second $154^{B'}$ photomultiplier detectors which when cooled produces very low background signals. Also, the range imaging LIDAR system 10 uses the molecular response as well as the strong aerosol response which has a very high signal to noise ratio and effectively reduces the system error due to noise; the range imaging LIDAR system 10 can account for and exploit the known effects due to thermal broadening; the range imaging LIDAR system 10 can simultaneously measure velocity, temperature, aerosol and molecular components, and the range imaging LIDAR system 10 can adapt to the changing environment in order to always produce measurements based on the highest sensitivity.

However, this is subject to several limitations, the first being the relatively low quantum efficiency of the first $154^{A'}$ and second $154^{B'}$ photomultiplier detectors and the second being the fact that only two of the patterns 190 of pixel mirror rotational states 148, 150, 152 or "ring sets" are being monitored at any given time. However, there is need to cycle amongst all of the patterns 190 of pixel mirror rotational states 148, 150, 152 with equal temporal resolution. The knowledge of aerosol content might only be required infrequently to provide a reasonable measurement of the Ratio parameter. Temperature is not always required and again could be provided only at infrequent intervals. Accordingly, the basic advantage of the edge type of detection can be achieved with the range imaging LIDAR system 10, and most of the limitations associated with the simple edge detection can be eliminated.

The range imaging LIDAR system 10 can be employed utilized for any optical remote sensing scenario. Every remote sensing problem is solved by fitting a model for the system response to the data observed while accounting for the expected deviations in the data. In a Fabry-Pérot interferometer 44 system this response is a collection of fringes for which exists a wealth of phenomenological models. The range imaging LIDAR system 10 incorporates a digital micromirror device (DMD) 142 in cooperation with a Fabry-Pérot interferometer 44 to segment the optical response between two fast photodetectors. These segmented measurements are made using patterns 190 of pixel mirror rotational states 148, 150, 152 based on the derivatives of the model with respect to each parameter to be estimated thereby granting the highest sensitivity possible. An optimization with respect to segmentation thresholds and timing exposure resolution is performed to minimize the covariance of the minimum variance unbiased estimator of the system. Cost functions based on this covariance may be formed to allow trade-offs to be computed automatically with nonlinear optimization techniques such as BFGS or the Nelder-Mead Simplex algorithm. The ability to use fast photodetectors allows one to apply the range imaging LIDAR system 10 to problems where one wishes to measure state variable with a fine spatial resolution.

There are future possibilities for improving the range imaging LIDAR system 10 when digital micromirror devices (DMD) 142 become available having more than two programmable angle states. In this case one could step the digital micromirror device (DMD) 142 through a range of angles and, by using an array of photomultiplier detectors 154', observe many more patterns 190 of pixel mirror rotational states 148, 150, 152 at one time. The patterns 190 of pixel mirror rotational states 148, 150, 152 producing these observations could be optimized in much the same way as described here by simply increasing the number of threshold states used for each derivative.

In operation of the third aspect of an associated detection system 46.3 of a range imaging LIDAR system 10 first calibrates the Fabry-Pérot etalon 50 by analyzing the reference fringe pattern 104, and then generates measures of aerosol counts A, molecular counts M, velocity u, temperature t, and background counts B from the scatter 60 and reference 104 fringe patterns at one or more particular nominal ranges R, or as a function of nominal range R, by parsing the scatter fringe pattern 60 in accordance with the process illustrated in FIG. 21 and described hereinabove and illustrated in FIGS. 27-41 and 12, so as to separately analyze each arcuate fringe 62' of interest using the hereinabove methodology to analyze the selected portions of the scatter 60 and reference 104 fringe patterns by successively setting the associated patterns 190, 190.1, 190.2, 190.3, 190.4, 190.5 of pixel mirror rotational states 148, 150 for the subset of micromirrors 144 illuminated by the selected portions of the scatter 60 and reference 104 fringe patterns being analyzed at any given time, and setting the remaining micromirrors 144 to the third pixel mirror rotational state 152 so as to preclude that portion of the scatter 60 and reference 104 fringe patterns from being detected, so as to determine the measures of aerosol counts A, molecular counts M, velocity u, temperature t, and background counts B responsive thereto, wherein the final results are processed in accordance with steps (2112)-(2116) of FIG. 21 as described hereinabove. More particularly, when analyzing the reference fringe pattern 104, the micromirrors 144 not illuminated thereby are set to the third pixel mirror rotational state 152 so that only light from the reference fringe pattern 104 is then processed as described hereinabove, and the remaining light is reflected to the light block 172 so as to be blocked from detection by the photodetectors $154^A$, $154^B$. Furthermore, when analyzing the scatter fringe pattern 60, the micromirrors 144 not illuminated by the particular arcuate fringe 62' being analyzed at a particular time are set to the third pixel mirror rotational state 152 so that only light from that particular arcuate fringe 62' is then processed as described hereinabove, and the remaining light is reflected to the light block 172 so as to be blocked from detection by the photodetectors $154^A$, $154^B$.

Figure 42:
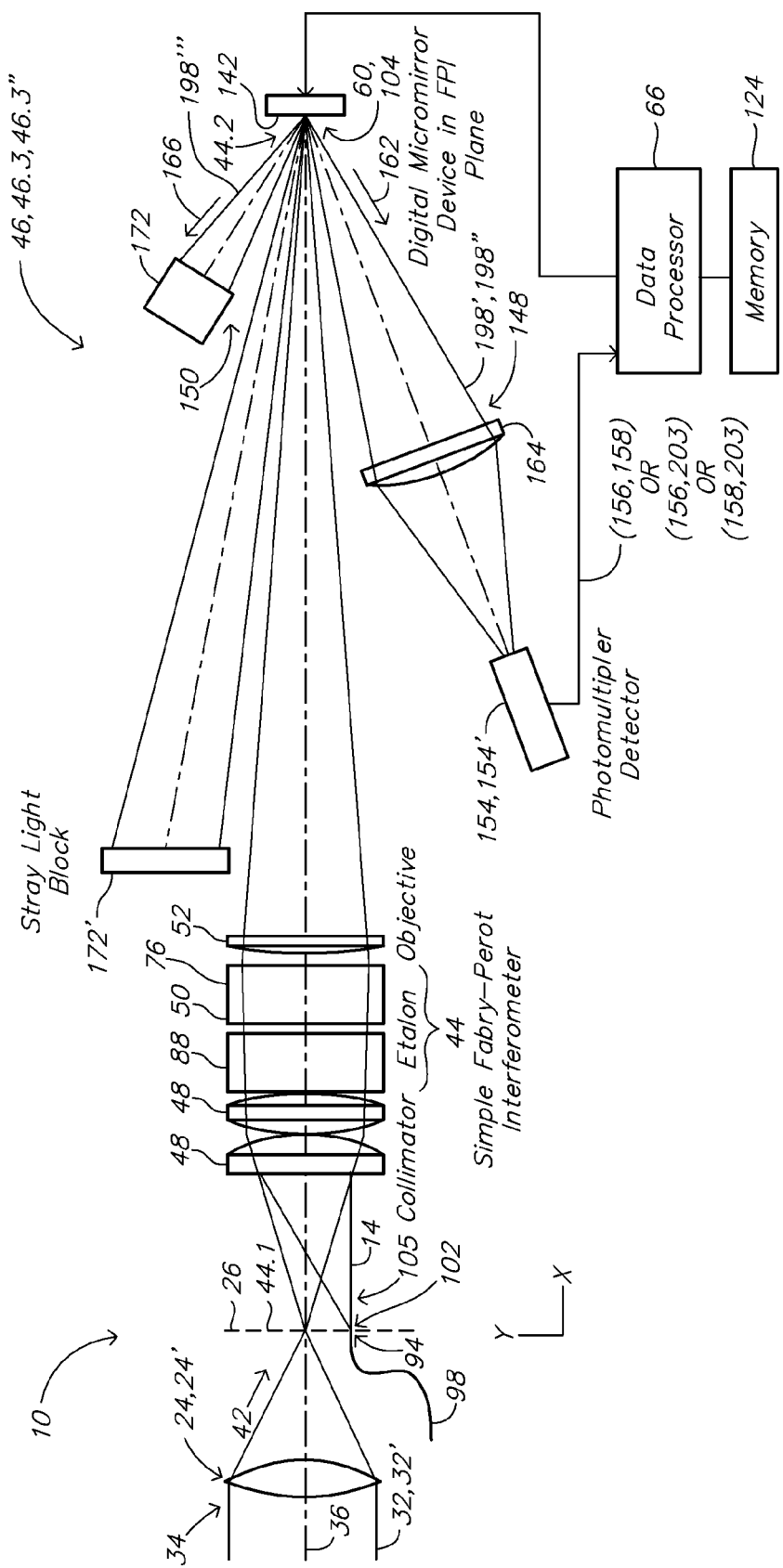
FIG. 42 illustrates a second embodiment of the third aspect of an associated detection system of a range imaging LIDAR system.

Referring to FIG. 42, a second embodiment of a third aspect of an associated detection system 46.3, 46.3" is the same as for the first embodiment the third aspect of the associated detection system 46.3, 46.3' except that the associated digital micromirror device (DMD) 142 is adapted so that the associated micromirrors 144 thereof are individually addressable and controllable to one of at least two possible associated pixel mirror rotational states 148, 150. The micromirrors 144 of the associated array of micromirrors 144 of the digital micromirror device (DMD) 142 in the first pixel mirror rotational state 148 cause first 198' and second 198" portions of either the scatter fringe pattern 60 or the reference fringe pattern 104 from the Fabry-Pérot interferometer 44 impinging thereupon to be reflected in the first direction 162 to the associated first objective lens 164, and to be directed thereby to the a photodetector 154, for example, a photomultiplier detector 154', wherein the first 198' and second 198" portions are sequentially reflected using different associated pixel mirror rotational states 148, 150 of the associated array of micromirrors 144 of the digital micromirror device (DMD) 142 at different times. Corresponding associated signals 200, 202 are sampled sequentially, rather than simultaneously—in contradistinction with the first embodiment the third aspect of the associated detection system 46.3, 46.3' for which the associated complementary signals 156, 158 are sampled simultaneously. The micromirrors 144 of the associated array of micromirrors 144 of the digital micromirror device (DMD) 142 in the second pixel mirror rotational state 150 cause third portions 198''' of either the scatter fringe pattern 60 or the reference fringe pattern 104 from the Fabry-Pérot interferometer 44 impinging thereupon to be reflected in the second direction 166 to a light block 172 that provides for absorbing light impinging thereupon.

In accordance with a first aspect of signal processing associated with the second embodiment of a third aspect of an associated detection system 46.3, 46.3", the first 198' and second 198" portions are sequentially reflected using different associated pixel mirror rotational states 148, 150 of the associated array of micromirrors 144 of the digital micromirror device (DMD) 142 at different times, wherein the first 198' and second 198" portions are relatively disjoint as for the first embodiment the third aspect of the associated detection system 46.3, 46.3', so that the resulting signals 200, 202 correspond to the complementary signals 156, 158 that would otherwise be sampled by the first embodiment the third aspect of the associated detection system 46.3, 46.3'. Accordingly, for each and every parameter, the micromirrors 144 of the digital micromirror device (DMD) 142 associated with the first disjoint portion 60' of the scatter fringe pattern 60, or the first disjoint portion 104' of the reference fringe pattern 104, within the region being processed are set to the first pixel mirror rotational state 148 at a first point in time to measure the first complementary signal 156, and the micromirrors 144 of the digital micromirror device (DMD) 142 associated with the second disjoint portion 60" of the scatter fringe pattern 60, or the second disjoint portion 104" of the reference fringe pattern 104, within the region being processed are set to the first pixel mirror rotational state 148 at a second point in time to measure the second complementary signal 158. During both the first and second points in time, the micromirrors 144 of the associated array of micromirrors 144 of the digital micromirror device (DMD) 142 outside of the region being processed are set to the second pixel mirror rotational state 150 so as to cause the remaining portion of either the scatter fringe pattern 60 or the reference fringe pattern 104 from the Fabry-Pérot interferometer 44 impinging thereupon to be reflected in the second direction 166 to a stray light block 172' that provides for absorbing light impinging thereupon. An additional stray light block 172' is provided to receive stray light reflected from the digital micromirror device (DMD) 142. This process is repeated for each of the parameters being detected. Accordingly, a total of 2N measurements are needed in order to identify N parameters using the first aspect of signal processing associated with the second aspect of the second embodiment of a third aspect of an associated detection system 46.3, 46.3".

In accordance with a second aspect of signal processing associated with the second embodiment of a third aspect of an associated detection system 46.3, 46.3", only N+1 measurements are needed within each region of the scatter 60 or reference 104 fringe patterns to identify N parameters associated with that region, wherein one of the measurements is of the light from the entire region, and the remaining N measurements are for one of the disjoint portions 60', 104' or 60", 104" associated with each of the parameters. Then, either the signals associated with the remaining disjoint portions 60", 104" or 60', 104' are then found for each parameter by subtracting the corresponding measurement for the one of the disjoint portions 60', 104' or 60", 104" from the corresponding measurement of the total signal 203 for the entire region, or the N parameters are identified by solving a system of equations based upon the N+1 measurements directly, rather than the corresponding 2N complementary signals.

Accordingly, the measurement of the total signal 203 for the entire region is made by setting the associated micromirrors 144 of the digital micromirror device (DMD) 142 to the first pixel mirror rotational state 148 at a first point to make a measurement of the total signal 203 from the light of that entire region as one of the first 200 and second 202 signals. Then, for each parameter, as corresponding distinct points in time, the micromirrors 144 of the digital micromirror device (DMD) 142 associated with either the first 60', 104' or second 60", 104" disjoint portion within the region being processed is set to the first pixel mirror rotational state 148 at that point in time to measure the other of the first 200 and second 202 signals corresponding to the first 156 or second 158 complementary signal. While these measurements are being made, the micromirrors 144 of the associated array of micromirrors 144 of the digital micromirror device (DMD) 142 outside of the region being processed are set to the second pixel mirror rotational state 150 so as to cause the remaining portion of either the scatter fringe pattern 60 or the reference fringe pattern 104 from the Fabry-Pérot interferometer 44 impinging thereupon to be reflected in the second direction 166 to a light block 172 that provides for absorbing light impinging thereupon. The remaining second 158 or first 156 complementary signal is then found by subtracting the measured first 156 or second 158 complementary signal from the total signal 203, for each of the N different parameters, or the first 200 and second 202 signals are used directly to solve for the N parameters.

The method of processing the disjoint portions 60', 60", 104', 104" of the associated scatter 60 and reference 104 fringe patterns, or one of the disjoint portions 60', 60", 104', 104" in combination with the corresponding total signal 203, can also be applied in cooperation with other systems that provide for generating the associated disjoint portions 60', 60", 104', 104" similar to that provided for by one or more digital micromirror devices (DMD) 142 as described hereinabove, but without requiring a digital micromirror device (DMD) 142.

For example, in one embodiment, a Liquid Crystal Device (LCD), could be used to generate the associated disjoint portions 60', 60", 104', 104" that are extracted from the associated underlying scatter 60 or reference 104 fringe pattern by controlling the pattern of transmission of associated pixels of the LCD provide for transmitting corresponding selected disjoint portions 60', 60", 104', 104" at any given time. For example, this can be accomplished by replace one of the polarizers normally used in the LCD with a polarization selective beam splitter, wherein the beam splitter provides for a transmission of one polarization while reflecting the other polarization. The output of the LCD would then consist of the selected disjoint pattern and its compliment, one transmitted and the other reflected.

As another example, a Holographic Optical Element (HOE), could be fabricated that would direct the light from disjoint regions onto individual areas. A Holographic Optical Element (HOE) could be constructed that would focus the light from a ring for example onto a single small area where a detector could be located. Separate disjoint areas would direct the light to different detectors which would then be used to detect the light in each disjoint pattern.

As yet another example, micro-machined mirrors could be fabricated to focus the light in a selected pattern onto a particular region. Detectors located at those regions would then convert the light to an electrical signal that would be measured and processed.

As yet another example, individual masks could be moved into position to generate the disjoint patterns. These masks could be configured around the edge of a disk and the individual masks rotated into position or the masks could be arranged in a linear or two dimensional array, and either a linear or a pair of linear actuators could be used to move the selected masks into position.

Alternatively, the disjoint portions 60', 60", 104', 104" can be extracted from an electronically captured image 114 of the scatter 60 or reference 104 fringe pattern that—or the corresponding regions thereof to be processed corresponding to the associated scattered 32' and reference 105 light signals—is subsequently compressed by using electronic or software integration or binning as described hereinabove. For example, the image 114 may be captured using the first aspect of the associated detection system 46.1, for example, using an electronic camera, for example, a CCD detection system 46.1', from which the corresponding linear scatter $60^L$ and reference $104^L$ fringe patterns are for example formed in accordance with the methodology described hereinabove and illustrated in FIGS. 7a-10, or using a circle-to-line interferometer optic (CLIO) elements 128 or a holographic optical element 128' as described hereinabove. The associated disjoint portions 60', 60", 104', 104" of the corresponding linear scatter $60^L$ and reference $104^L$ fringe patterns are then extracted electronically or by software, and then processed in accordance with the methodology described hereinabove and illustrated in FIGS. 27-41 and 12, for example, so as to provide for determining the corresponding atmospheric data 68 for each of the associated scattered light signals 32'.

Figure 43:
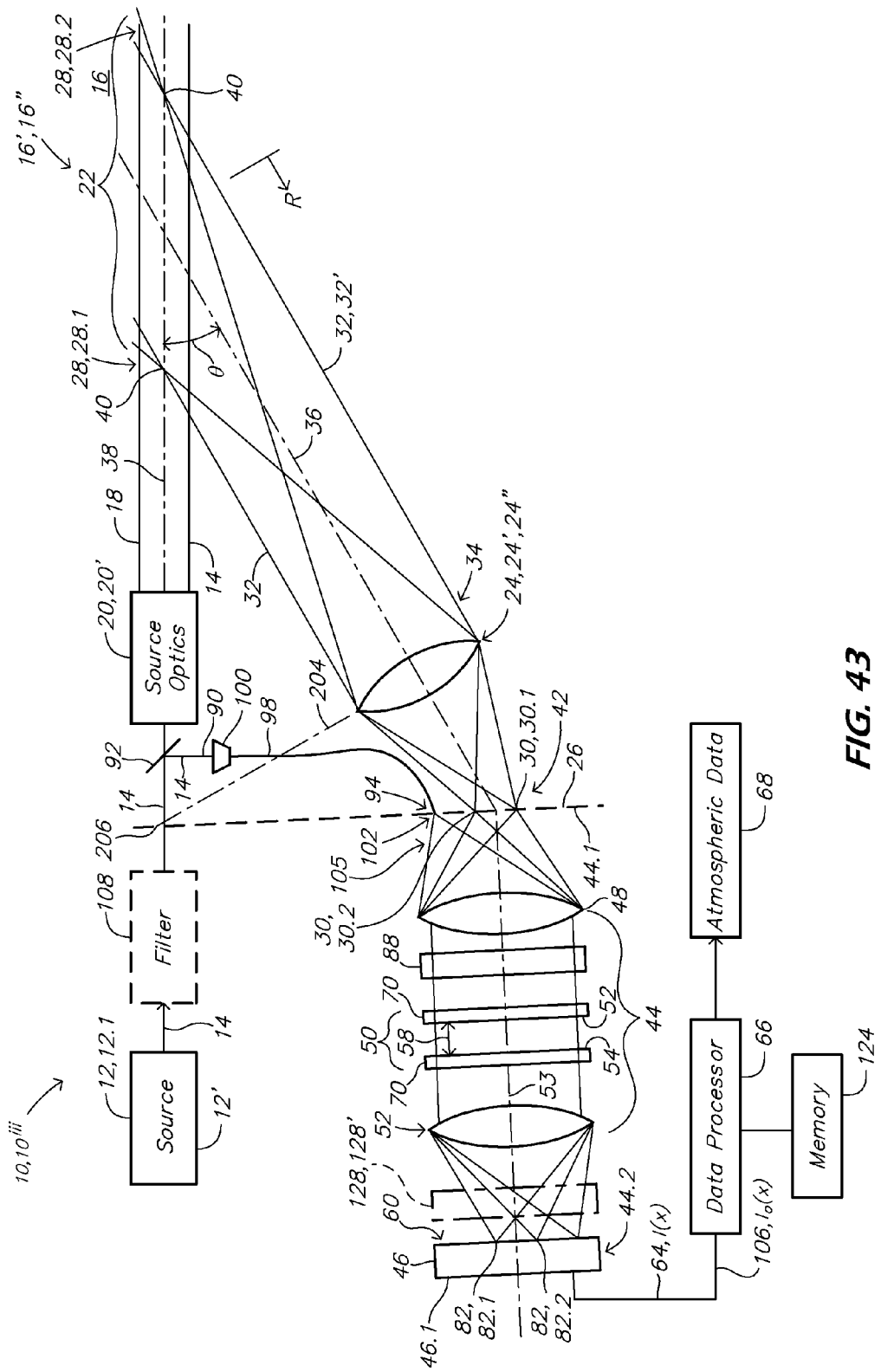
FIG. 43 illustrates an embodiment of a third aspect of a range imaging LIDAR system.

Referring to FIG. 43, in accordance with a third aspect, the range imaging LIDAR system 10, $10^{iii}$ is substantially the same as the first aspect of the range imaging LIDAR system 10, $10^i$ except that the near-range blur in the intermediate image 42 can be reduced by orienting the Fabry-Pérot interferometer 44, and particularly, the collimating lens 48 thereof, in relation to the receiver optics 24 so that the intermediate image plane 26 satisfies the Scheimpflug condition, whereby the optic axis 38 of the beam of light 18, the plane 204 of the effective lens 24" of the receiver optics 24 and the intermediate image plane 26 all interest at a common point of intersection 206, also known as a Scheimpflug intersection. Reducing the blur in the intermediate image 42 provides for reducing the breadth of the scatter fringe pattern 60 in the Y-direction 110 in the output focal plane 44.2, thereby simplifying the requirements of the associated detection system 46, for example, so as to enable the use of a linear photodetector array or a linear array of photo detectors.

Figure 44:
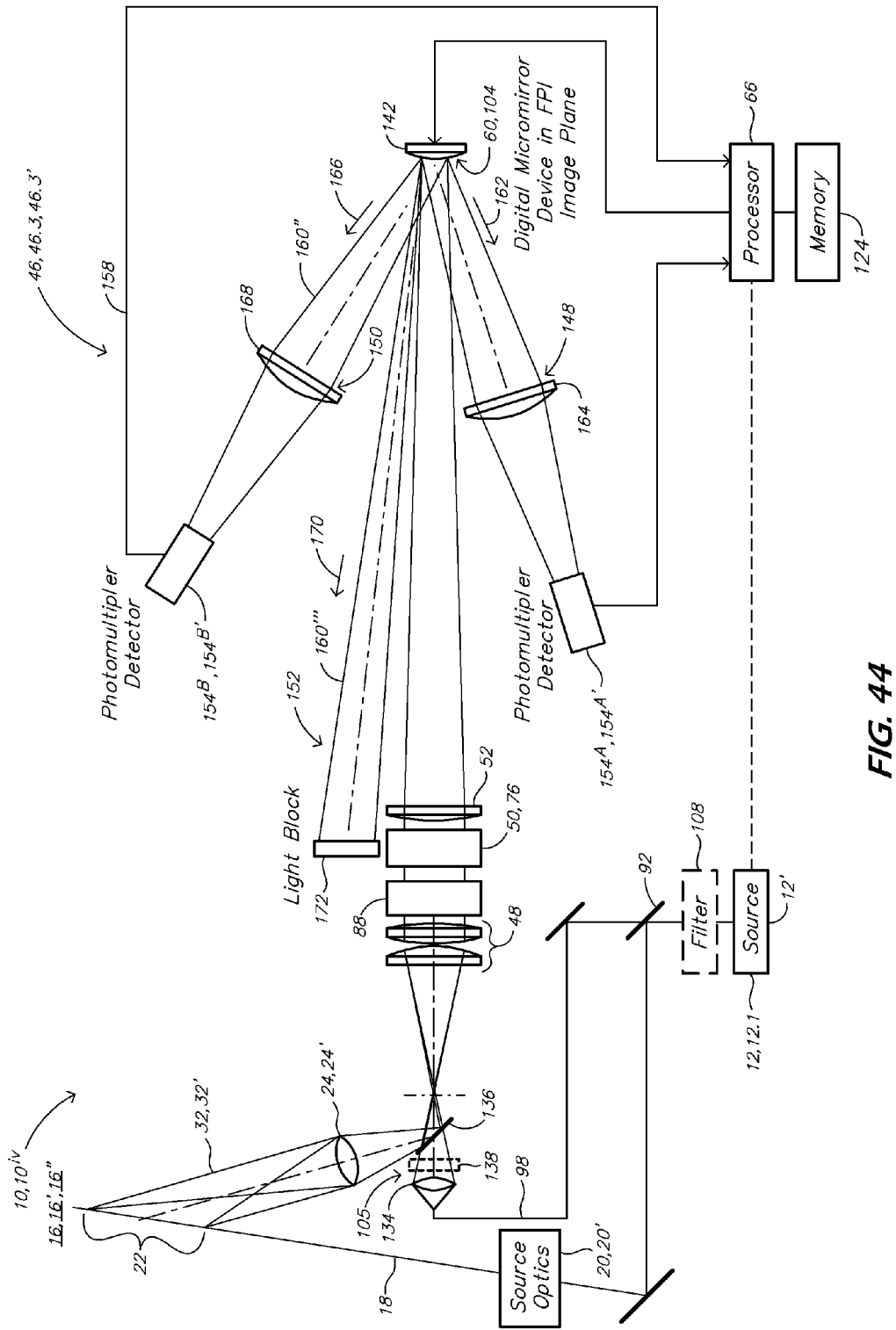
FIG. 44 illustrates and embodiment of a fourth aspect of a range imaging LIDAR system.

Referring to FIG. 44, in accordance with a fourth aspect, a range imaging LIDAR system 10, $10^{iv}$ is similar to the second embodiment of the first aspect of the range imaging LIDAR system 10, $10^i$ illustrated in FIG. 22 but incorporating the first embodiment of the third aspect of an associated detection system 46.3, 46.3' illustrated in FIG. 24a, a collimating lens 48 in cooperation with the Fabry-Pérot interferometer 44, an input telescope 24' for receiving the scattered light 32, and with the scattered light 32 and reference source 94 juxtaposed relative to the associated second beam splitter optic 136. A substantial portion of the scattered light 32 is reflected from the second beam splitter optic 136, and the reference light signal 105 from the reference source 94 is transmitted through the second beam splitter optic 136, wherein the reference source 94 is embodied substantially the same as illustrated and described in accordance with the second embodiment of the first aspect of the range imaging LIDAR system 10, $10^i$.

In one embodiment, the image 114 of the reference light signal 105 is positioned so as to not overlap the associated scattered light signal 32' in the output focal plane 44.2 of the Fabry-Pérot interferometer 44. In another embodiment, in accordance with the eighth aspect of the range imaging LIDAR system 10, $10^{viii}$ described more fully herein below, the image 114 of the reference light signal 105 is positioned so as to overlap the associated scattered light signal 32', with the portion of the reference light signal 105 overlapping the scattered light signal 32' blocked by an associated mask 138 between the lens 134 and the second beam splitter optic 136. In yet another embodiment, the light source 12 is pulsed, for example, a pulsed Nd:YAG laser 12.1, and the associated detection system 46—for example, using a fast CCD detection system 46.1' instead of the relatively slower DVD-based detection system 46.3 as illustrated—is sampled in synchronism with the light source 12 so as to provide for initially capturing the reference light signal 105 prior to receiving the scattered light signal 32', and to then receive the process the scattered light signal 32' thereafter.

Figure 45:
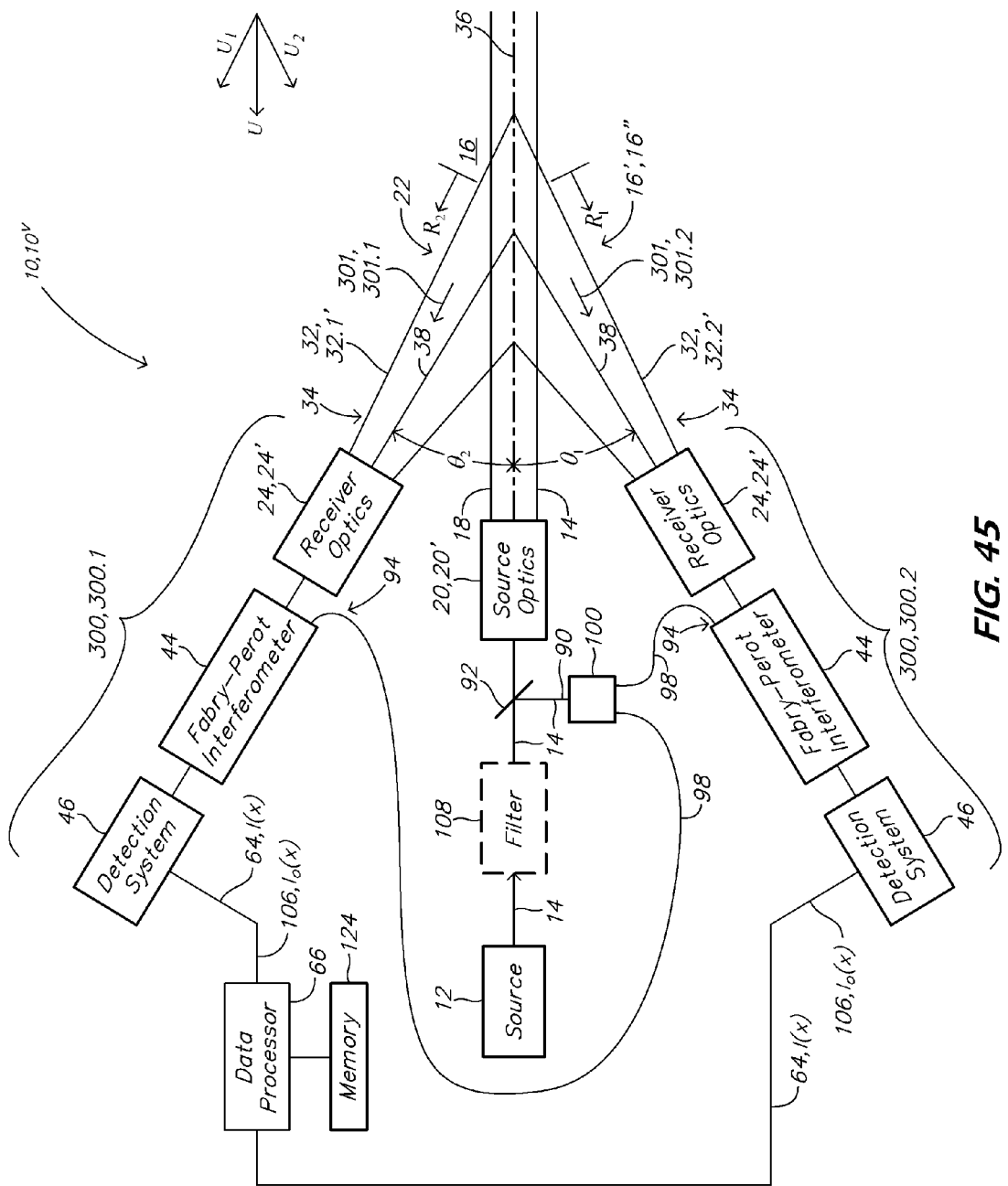
FIG. 45 illustrates an embodiment of a fifth aspect of a range imaging LIDAR system.

Referring to FIG. 45, in accordance with a fifth aspect of a range imaging LIDAR system 10, $10^v$, a plurality of separate receivers 300, 300.1, 300.2 are adapted to cooperate with a common beam of light 18, wherein each receiver 300, 300.1, 300.2 comprises an associated combination of receiver optics 24, a Fabry-Pérot interferometer 44 and a detection system 46 constructed and operated in accordance with any of the above-described aspects of the range imaging LIDAR systems 10 described hereinabove, wherein the reference source 94 associated with each receiver 300, 300.1, 300.2 is obtained from a common beam of light 18. The scatter 64 and reference 106 electronic image signals from the receivers 300, 300.1, 300.2 are separately processed by the data processor 66 in accordance with any of the above-described aspects of the range imaging LIDAR systems 10 described hereinabove, and in accordance with the process 2100 illustrated in FIG. 21, so as to provide for generating a set of one or more measures of aerosol counts A, molecular counts M, velocity u, temperature t, and background counts B at one or more selected nominal ranges R, or as a function of nominal range R, for each of the receivers 300, 300.1, 300.2. More particularly, in one embodiment, separate measures of velocity u, $u_1$, $u_2$ at one or more selected nominal ranges R, or as a function of nominal range R, are generated for each receiver 300, 300.1, 300.2, wherein the associated Doppler shift to the frequency of the common beam of light 18 is dependent upon the velocity u of the atmosphere 16 in the direction 301, 301.1, 301.2 of the receiver 300, 300.1, 300.2. The separate measures of velocity u, $u_1$, $u_2$ in combination then provide for determining a measure of a velocity vector U at one or more selected nominal ranges R, or as a function of nominal range R, so as to provide for determining a velocity field within the atmosphere 16. For example, the fifth aspect of a range imaging LIDAR system 10, 10$^v$ could be used in a wind tunnel to provide for probing the velocity field of the flow field therein without perturbing that flow field.

Figure 46:
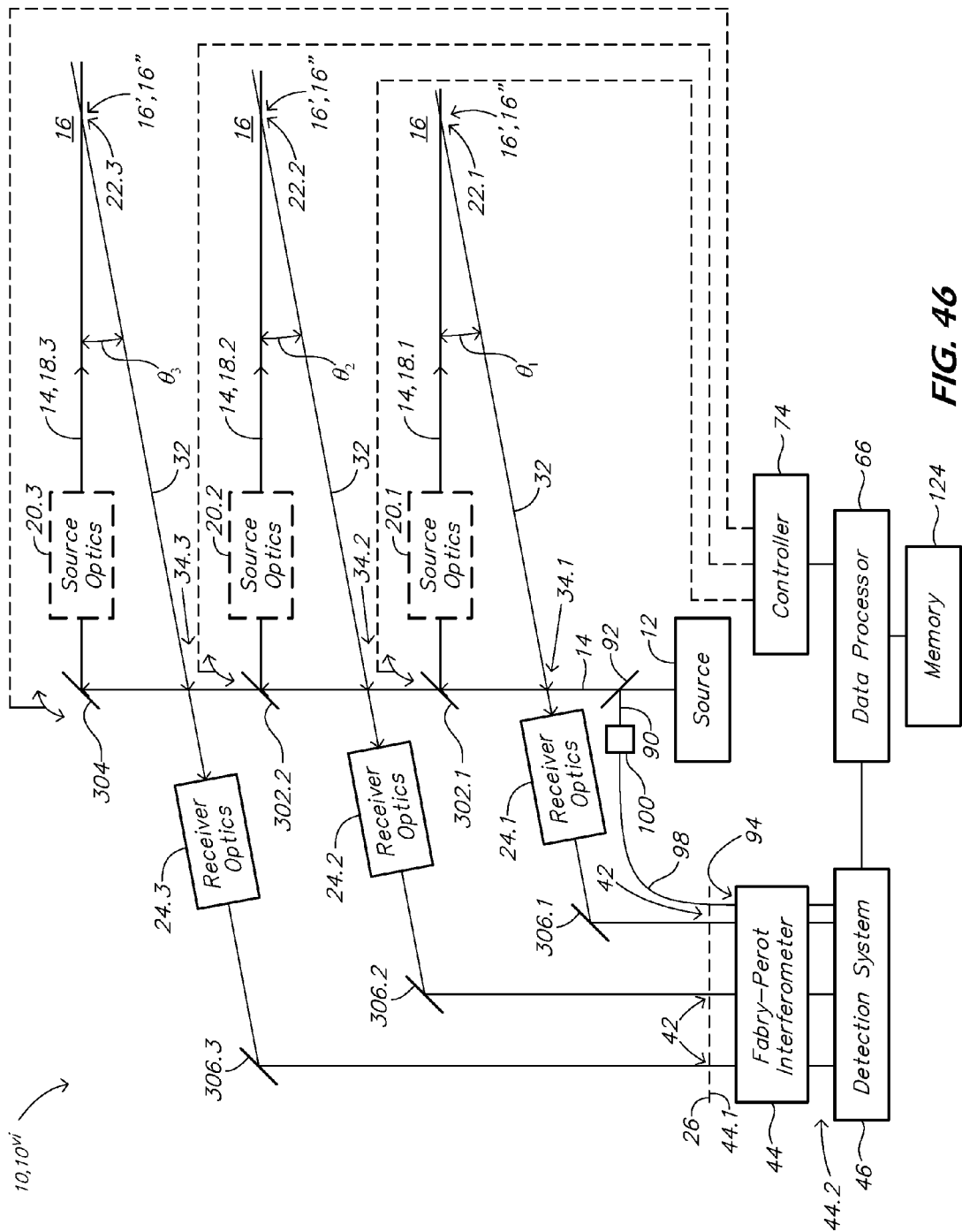
FIG. 46 illustrates an embodiment of a sixth aspect of a range imaging LIDAR system.

Referring to FIG. 46, in accordance with a sixth aspect of a range imaging LIDAR system 10, 10$^{vi}$, a plurality of beams of light 18, 18.1, 18.2, 18.3 are generated from a common light source 12 that is distributed thereto by a corresponding set of beam splitters 302.1, 302.2 and a mirror 304. For example, different beams of light 18, 18.1, 18.2, 18.3 may be directed in different directions or at different locations into the atmosphere 16, for example, so as to provide for either probing different portions of the atmosphere, or so as to provide for a velocity vector U of the range imaging LIDAR system 10, 10$^{vi}$ relative to the atmosphere 16, for example, with the range imaging LIDAR system 10, 10$^{vi}$ used as an optical air data system in a vehicle, for example, an aircraft. For example, in one set of embodiments, the attitude or position of one or more of the beam splitters 302.1, 302.2 and mirror 304 may be controlled by a controller 74 operatively associated with or a part of the data processor 66 so as to provide for controlling the position or orientation of one or more of the associated beams of light 18, 18.1, 18.2, 18.3. In some embodiments, the range imaging LIDAR system 10, 10$^{vi}$ may incorporate one or more sets of source optics 20, 20.1, 20.2, 20.3 associated with one or more of the corresponding beams of light 18, 18.1, 18.2, 18.3 so as to provide for shaping the one or more beams of light 18, 18.1, 18.2, 18.3 and setting the size and divergence thereof. A plurality of receiver optics 24, 24.1, 24.2, 24.3 are adapted to receive scattered light 32 from corresponding interaction regions 22, 22.1, 22.2, 22.3 of the one or more of the corresponding beams of light 18, 18.1, 18.2, 18.3 within the corresponding fields-of-view 34, 34.1, 34.2, 34.3 of the associated receiver optics 24, 24.1, 24.2, 24.3, wherein each receiver optics 24, 24.1, 24.2, 24.3 is oriented at a corresponding parallax angle $\theta$, $\theta_1$, $\theta_2$, $\theta_3$ with respect to the corresponding beam of light 18, 18.1, 18.2, 18.3, so that the associated interaction regions 22, 22.1, 22.2, 22.3 span a substantial range of nominal ranges R. Each set of receiver optics 24, 24.1, 24.2, 24.3 is adapted to image the corresponding interaction region 22, 22.1, 22.2, 22.3 at different locations on a common intermediate image plane 26 that is located at the input focal plane 44.1 of a common Fabry-Pérot interferometer 44. For example, scattered light 32 from the receiver optics 24, 24.1, 24.2, 24.3 is reflected onto the intermediate image plane 26 by an associated set of mirrors 306.1, 306.2, 306.3. Furthermore, a reference beam portion 90 of the substantially monochromatic light 14 is extracted from the light source 12 with a beam splitter optic 92 and then input as a reference source 94 at a location on the intermediate image plane 26 that is distinct from the locations of the intermediate images 82 from each of the receiver optics 24, 24.1, 24.2, 24.3. The reference source 94 is processed by the Fabry-Pérot interferometer 44 to generate a corresponding reference fringe pattern 104, and the intermediate images 82 from each of the receiver optics 24, 24.1, 24.2, 24.3 are processed by the Fabry-Pérot interferometer 44 to generate corresponding scatter fringe patterns 60, 60.1, 60.2, 60.3.

Figure 47:
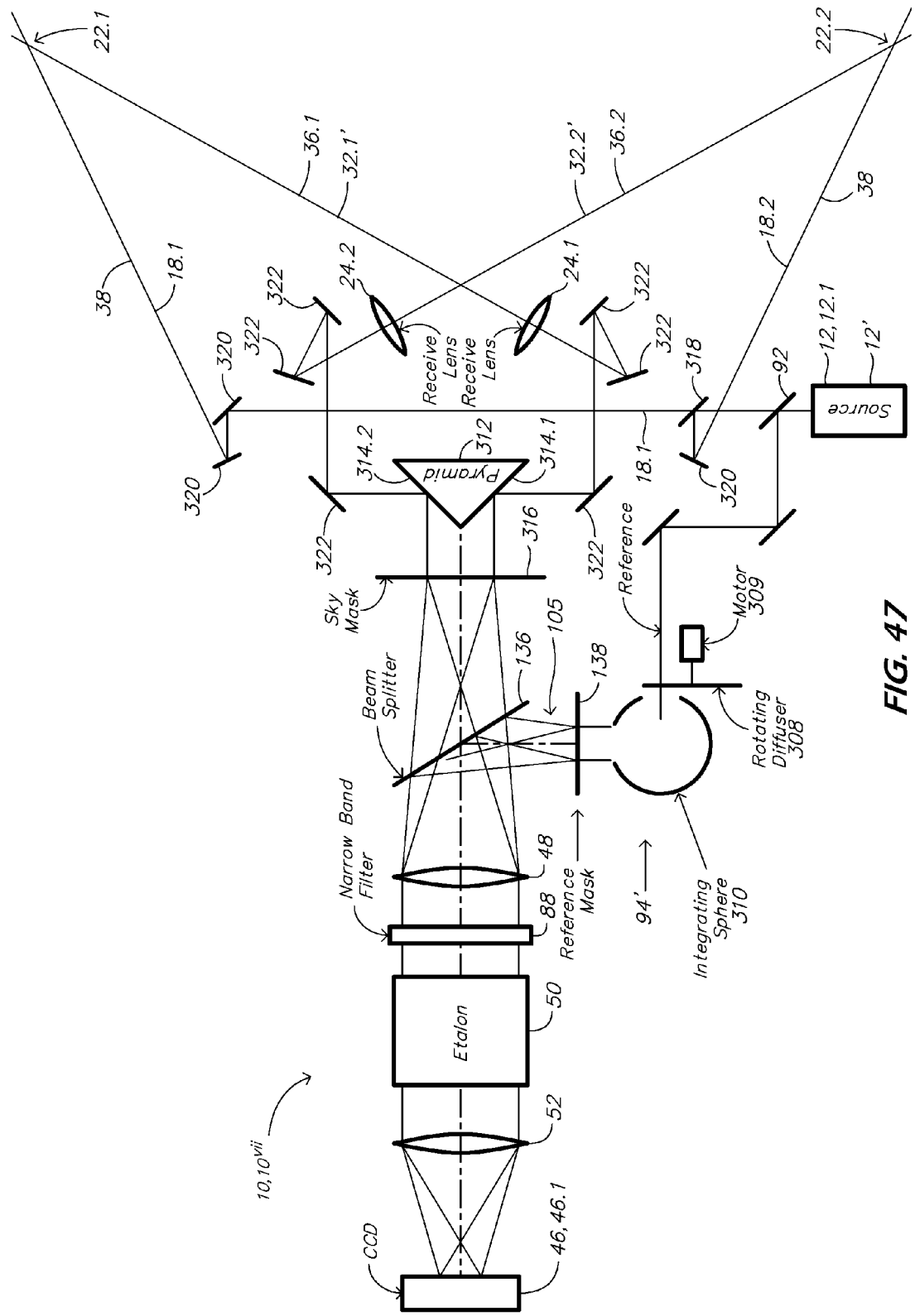
FIG. 47 illustrates an embodiment of a seventh aspect of a range imaging LIDAR system.

Referring to FIG. 47, in accordance with a seventh aspect, the range imaging LIDAR system 10, 10$^{vii}$ is adapted to provide for interleaving the scattered 32' and reference 105 light signals in the associated image 114 at the output focal plane 44.2 of the Fabry-Pérot interferometer 44, for example, as illustrated in FIGS. 7a and 8 for four separate associated scattered fringe patterns 60, 60.1, 60.2, 60.3, 60.4, although the range imaging LIDAR system 10, 10$^{vii}$ illustrated in FIG. 47 would provide only two of the four scattered fringe patterns 60, 60.1, 60.2, 60.3, 60.4. The seventh aspect of the range imaging LIDAR system 10, 10$^{vii}$ incorporates a second aspect of a reference source 94' that is used in the eighth aspect of the range imaging LIDAR system 10, 10$^{viii}$ that is more fully described hereinbelow. Generally, the second aspect of a reference source 94' uses a rotating diffuser 308—driven by a motor 309—in cooperation with an integrating sphere 310 so as to provide for substantial angular diversity of the associated reference light signal 105. A second beam splitter optic 136 interleaves the reference light signal 105 with associated scattered light signals 32', wherein portions of the reference light signal 105 that would otherwise overlay the scattered light signals 32' are blocked by a first mask 138 prior to combination with the scattered light signals 32' by the second beam splitter optic 136 so that the reference light signal 105 and scattered light signals 32' are disjoint with respect to one another in the resulting image 114.

The seventh aspect of the range imaging LIDAR system 10, 10$^{vii}$ comprises a pyramidal image combiner 312 that provides for separating the scattered light signals 32' from one another in the image 114, for example, uniformly separating the scattered light signals 32' from one another as illustrated in FIGS. 7a and 8. More particularly, the pyramidal image combiner 312 comprises a plurality of reflective faces 314, each of which provides for reflecting a different scattered light signal 32' into a second mask 316 that is configured to block portions of the scattered light signal 32' that would otherwise overlap the reference light signal 105. More particularly, the range imaging LIDAR system 10, 10$^{vii}$ incorporates associated beam steering optics 210 comprising a third beam splitter optic 318 that divides the beam of light 18 from the light source 12 into first 18.1 and second 18.2 beams of light that are directed into separate regions of the atmosphere 16 by a series of associated mirrors 320. The range imaging LIDAR system 10, 10$^{vii}$ further incorporates first 24.1 and second 24.1 receiver optics with associated first 36.1 and second 36.2 optic axes directed at separate first 22.1 and second 22.2 interaction regions along the first 18.1 and second 18.2 beams of light within the atmosphere 16, that provide for receiving corresponding associated first 32.1 and second 32.2 scattered light therefrom that is directed to the corresponding first 314.1 and second 314.2 reflective faces of the pyramidal image combiner 312 by a plurality of associated mirrors 322. In one embodiment the reflective faces 314 are flat, whereas in another embodiment the reflective faces 314 are conical circle-to-line interferometer optic (CLIO) elements 128 that also provide for azimuthally compressing the associated resulting scatter fringe patterns 60, 60.1, 60.2.

Figure 48:
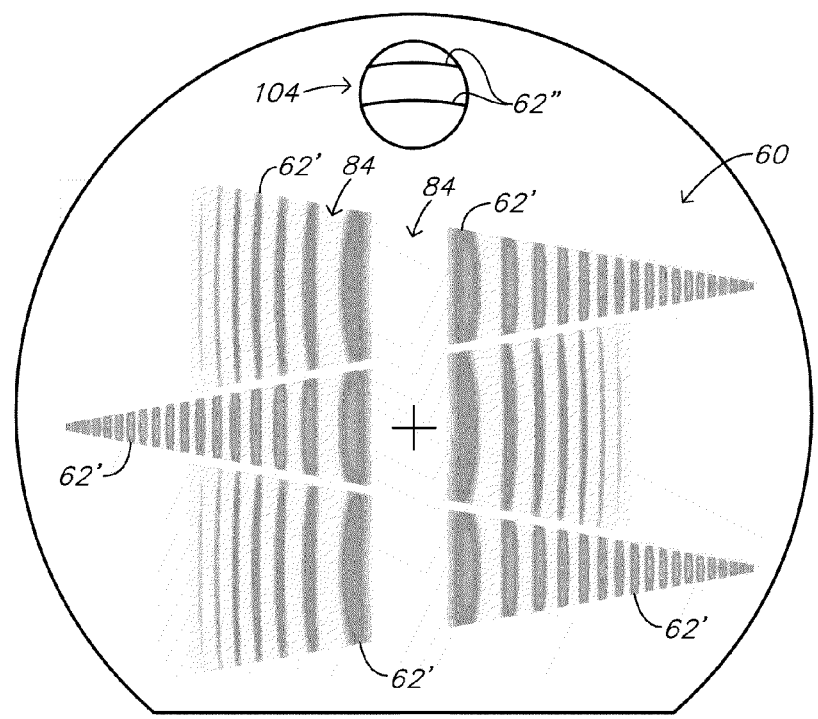
FIG. 48 illustrates a first aspect of plural fringe patterns generated by the sixth aspect of a range imaging LIDAR system illustrated in FIG. 46.
Figure 49:
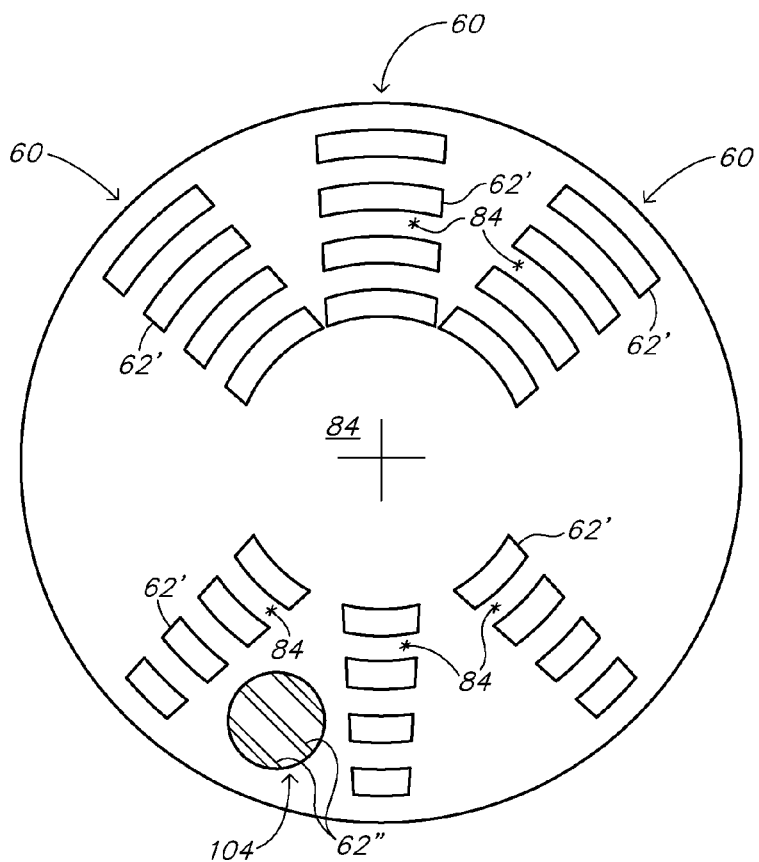
FIG. 49 illustrates a second aspect of plural fringe patterns generated by the sixth aspect of a range imaging LIDAR system illustrated in FIG. 46.
Figures 54A, 54B, 54C, 54D, 54E:
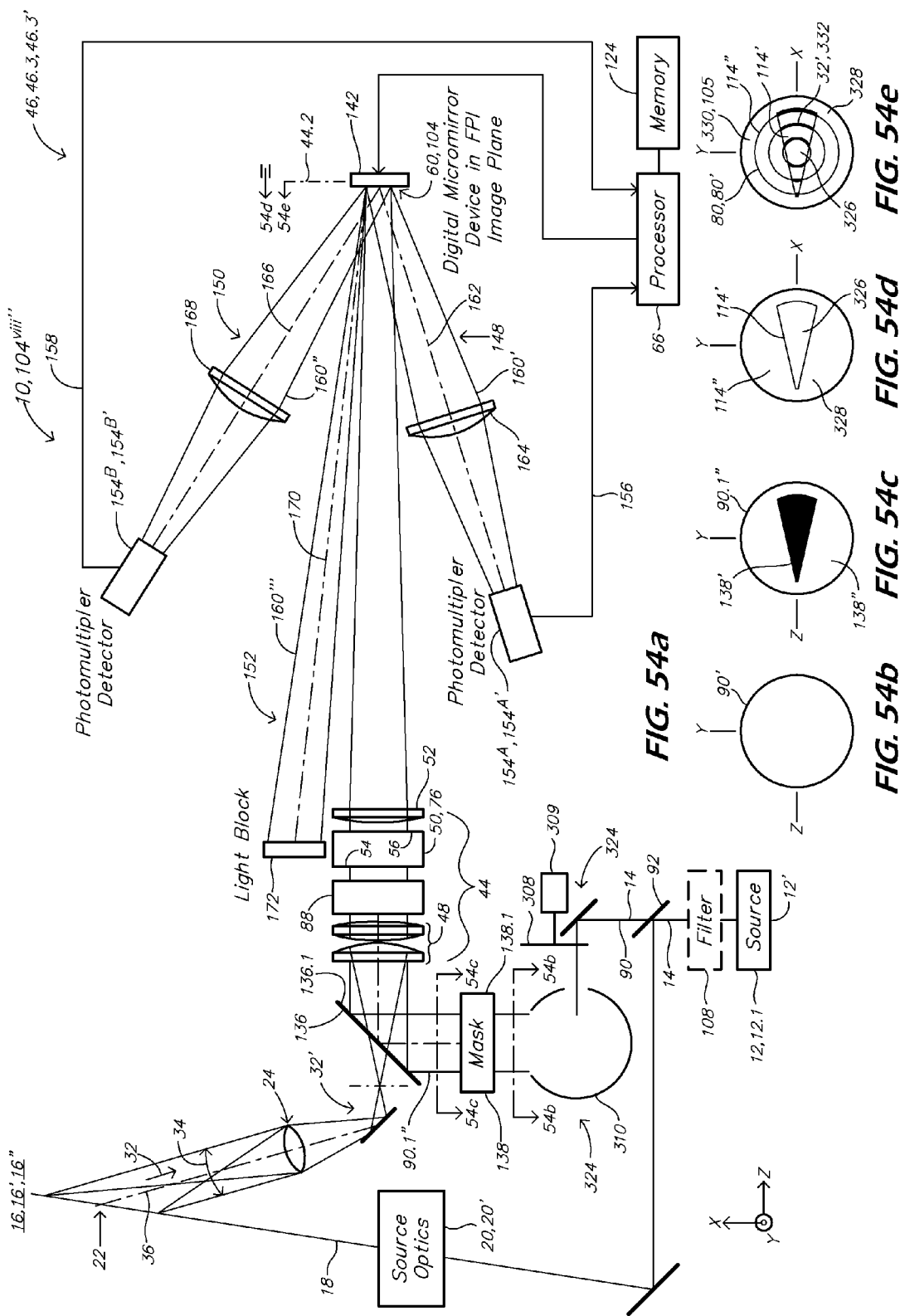
FIG. 54a illustrates a second embodiment of the eighth aspect of a range imaging LIDAR system incorporating the first aspect of the associated mask system and the third aspect of an associated detection system.
FIG. 54b-e illustrate various images associated with the second embodiment of the eighth aspect of a range imaging LIDAR system corresponding to corresponding images of FIG. 50d-g for the first embodiment of the eighth aspect.

Referring to FIG. 48, in accordance with a first aspect, the plural scatter fringe patterns 60, 60.1, 60.2, 60.3 generated by the sixth aspect of a range imaging LIDAR system 10, 10$^{vi}$ illustrated in FIG. 46 are translated with respect to one another in the output focal plane 44.2 of the Fabry-Pérot interferometer 44, whereas referring to FIG. 49, in accordance with a second aspect, the plural scatter fringe patterns 60, 60.1, 60.2, 60.3 generated by the sixth aspect of a range imaging LIDAR system 10, 10$^{vi}$ illustrated in FIG. 46 are rotated with respect to one another relative to the optic axis 53 of the Fabry-Pérot interferometer 44. The separate arcuate fringes 62' of each of the scatter fringe patterns 60, 60.1, 60.2, 60.3 are separately processed by the data processor 66 in accordance with any of the above-described methods so as to provide for generating a set of one or more measures of aerosol counts A, molecular counts M, velocity u, temperature t, and background counts B at one or more selected nominal ranges R, or as a function of nominal range R, for each of the interaction region 22, 22.1, 22.2, 22.3 within the associated fields-of-view 34, 34.1, 34.2, 34.3 of the associated receiver optics 24, 24.1, 24.2, 24.3.

Referring to FIG. 50*a*, in accordance with a first embodiment of an eighth aspect, the range imaging LIDAR system 10, 10$^{viii'}$ is similar to the third aspect of the range imaging LIDAR system 10, 10$^{iii}$ illustrated in FIG. 43 but instead incorporating the second aspect of the reference source 94' and explicitly incorporating the first aspect of the associated detection system 46.1. In accordance with the second aspect of the reference source 94', the reference beam portion 90 emanating from the first beam splitter optic 92 is directed therefrom to a reference illuminator 324, for example, comprising an associated rotating diffuser 308 in combination with an integrating sphere 310 relatively located behind and illuminating the mask 138, 138.1. The rotating diffuser 308 produces the phase diversity necessary to reduce the speckle in the reference beam thus providing uniform illumination. Accordingly, the reference illuminator 324 provides for generating a uniform and diffuse reference beam 90', for example, as illustrated in FIG. 50*b*, which is then directed through a first aspect of a mask 138, 138.1 that blocks a portion of the uniform and diffuse reference beam 90' from transmission therethrough, resulting in a corresponding first embodiment of a masked reference beam 90.1" that is then reflected of a partially reflective surface 136.1 of a second beam splitter optic 136, then through and collimated by the collimating lens 48 of the Fabry-Pérot interferometer 44, through the associated filter system 88, then through the associated Fabry-Pérot etalon 50, and finally through the associated imaging optics 52 of the Fabry-Pérot interferometer 44. The scattered light signal 32' is transmitted through the second beam splitter optic 136, then through and collimated by the collimating lens 48 of the Fabry-Pérot interferometer 44, through the associated filter system 88, then through the associated Fabry-Pérot etalon 50, and finally through the associated imaging optics 52 of the Fabry-Pérot interferometer 44. In the absence of the Fabry-Pérot etalon 50, the imaging optics 52 in cooperation with the collimating lens 48 provides for generating an image 114" of the masked reference beam 90.1" in the output focal plane 44.2 of the Fabry-Pérot interferometer 44, wherein a corresponding image of the mask 138, 138.1 is illustrated in FIG. 50*c*. Similarly, in the absence of the Fabry-Pérot etalon 50, the imaging optics 52 in cooperation with the collimating lens 48 provides for generating an image 114' of the scattered light signal 32' in the output focal plane 44.2 of the Fabry-Pérot interferometer 44. Referring to FIG. 50*c*, in accordance with the first aspect, the mask 138, 138.1 comprises an opaque region 138' and a remaining transparent region 138", wherein the opaque region 138' is sized so as to correspond in profile—in the output focal plane 44.2 of the Fabry-Pérot interferometer 44—to the image 114' of the associated scattered light signal 32'. Referring to FIG. 50*d*, a hypothetical image in the output focal plane 44.2 of the Fabry-Pérot interferometer 44 absent the associated Fabry-Pérot etalon 50 illustrates the disjoint regions 326, 328 therein of the image 114' of the scattered light signal 32' and the image 114" of the masked reference beam 90.1", respectively.

The mask 138, 138.1 is configured and aligned so as to provide for masking all of the light from the uniform and diffuse reference beam 90' for which the image thereof at the output focal plane 44.2 of the Fabry-Pérot interferometer 44 would otherwise overlap the corresponding image 114' of the scattered light signal 32'. Accordingly, within the output focal plane 44.2 of the Fabry-Pérot interferometer 44, the light within the region 326 associated with the image 114' of the scattered light signal 32' is exclusively from the scattered light 32, and light associated with the remaining region 328 of the output focal plane 44.2 is exclusively from the uniform and diffuse reference beam 90'.

The reference illuminator 324 that provides for illuminating the mask 138 could be implemented in various ways. For example, in one embodiment, the rotating diffuser 308 may be replaced with a scanning mirror that would scan a narrow laser beam across the inside of the integrating sphere 310. In another embodiment, the integrating sphere 310 could be replaced by either single or multiple diffusers. In yet another embodiment, optics could be employed to provide for a uniform illumination of the mask 138.

Referring to FIG. 50*e*, with the Fabry-Pérot etalon 50 in place, the Fabry-Pérot interferometer 44 generates two sets of fringes in the output focal plane 44.2, i.e. focal plane, of the imaging optics 52 as follows: a first set of fringes 330 of an associated reference fringe pattern 104 in the region 328 associated with the uniform and diffuse reference beam 90', and a second set of fringes 332 of a scatter fringe pattern 60 in the region 326 associated with the scattered light signal 32', wherein each set of fringes 330, 332 is generated responsive to a transmission function of the Fabry-Pérot etalon 50. The uniform and diffuse reference beam 90' provides an illumination pattern that is uniform and sufficient in extent so as to fully illuminate the first set of fringes 330 that fall on the detection system 46, 46.1. Otherwise, the first 330 and second 332 sets of fringes are processed as described hereinabove in accordance with any of the above-described aspects of the range imaging LIDAR system 10.

The range imaging LIDAR system 10, 10$^{viii}$ may be expanded with additional sets of receiver optics 24, either with one or more associated beams of light 18, in cooperation with a common Fabry-Pérot interferometer 44,—for example, similar to the fifth through seventh aspects of the range imaging LIDAR system 10, 10$^{v\text{-}vii}$ illustrated in FIGS. 45-47, but using the reference illuminator 324, mask 138 and second beam splitter optic 136 of the first embodiment of an eighth aspect of range imaging LIDAR system 10, 10$^{viii}$ as illustrated in FIG. 50*a*. For the example of such an range imaging LIDAR system 10, 10$^{viii}$ with three scattered light signals 32.1', 32.2', 32.3' resulting in a corresponding three distinct second sets of fringes 332.1, 332.2, 332.3 associated with three distinct scatter fringe patterns 60, 60.1, 60.2, 60.3, referring to FIGS. 51*a*-53*b*, the scatter fringe patterns 60, 60.1, 60.2, 60.3 and the associated opaque regions 138$^{i'}$, 138$^{ii'}$ and 138$^{iii'}$ of the associated mask 138, 138.1 can be arranged in various orientations relative to one for processing by the Fabry-Pérot interferometer 44.

For example, FIG. 51*a* illustrates an example of a mask 138, 138.1$^a$ with three opaque regions 138$^{i'}$, 138$^{ii'}$ and 138$^{iii'}$ used with a range imaging LIDAR system 10, 10$^{viii\text{-}a}$ with three scatter signal channels for which, referring to FIG. 51*b*, the associated three distinct scatter fringe patterns 60, 60.1, 60.2, 60.3 are translated with respect to one another, and with one of the scatter fringe patterns 60.2' flipped with respect to the other two scatter fringe patterns 602.1', 60.3', in the output focal plane 44.2 of the Fabry-Pérot interferometer 44, wherein relative to the first embodiment of the eighth aspect of the range imaging LIDAR system 10, 10$^{viii}$ illustrated in FIG. 50*a*, FIG. 51*a* corresponds in location to FIG. 50*c* and FIG. 51*b* corresponds in location to FIG. 50*e*. The mask 138, 138.1$^a$ is configured (i.e. sized and shaped) and aligned so as to provide for masking all of the light from the uniform and diffuse reference beam 90' for which the image thereof at the output focal plane 44.2 of the Fabry-Pérot interferometer 44 would otherwise overlap the corresponding image 114' of the scattered light signals 32.1', 32.2', 32.3'. Accordingly, within the output focal plane 44.2 of the Fabry-Pérot interferometer 44, the light within the region 326 of the image 114' of the scattered light signals 32.1', 32.2', 32.3' is exclusively from the associated scattered light 32 thereof, and light associated with the remaining region 328 of the output focal plane 44.2 is exclusively from the uniform and diffuse reference beam 90'.

As another example, FIG. 52a illustrates an example of a mask 138, 138.1$^b$ with three opaque regions 138$^{i'}$, 138$^{ii'}$ and 138$^{iii'}$ used with a range imaging LIDAR system 10, 10$^{viii.b}$ with three scatter signal channels for which, referring to FIG. 52b, the associated three distinct scatter fringe patterns 60, 60.1, 60.2, 60.3 are rotated with respect to one another and intersecting one another so that each spans a substantial portion of the diametrical image space in the output focal plane 44.2 of the Fabry-Pérot interferometer 44, wherein relative to the first embodiment of the eighth aspect of the range imaging LIDAR system 10, 10$^{viii}$ illustrated in FIG. 50a, FIG. 52a corresponds in location to FIG. 50c and FIG. 52b corresponds in location to FIG. 50e. The mask 138, 138.1$^b$ is configured (i.e. sized and shaped) and aligned so as to provide for masking all of the light from the uniform and diffuse reference beam 90' for which the image thereof at the output focal plane 44.2 of the Fabry-Pérot interferometer 44 would otherwise overlap the corresponding image 114' of the scattered light signals 32.1', 32.2', 32.3'. Accordingly, within the output focal plane 44.2 of the Fabry-Pérot interferometer 44, the light within the region 326 of the image 114' of the of the scattered light signals 32.1', 32.2', 32.3' is exclusively from the associated scattered light 32 thereof, and light associated with the remaining region 328 of the output focal plane 44.2 is exclusively from the uniform and diffuse reference beam 90'.

As yet another example, FIG. 53a illustrates an example of a mask 138, 138.1$^c$ with three opaque regions 138$^{i'}$, 138$^{ii'}$ and 138$^{iii'}$ used with a range imaging LIDAR system 10, 10$^{viii.c}$ with three scatter signal channels for which, referring to FIG. 53b, the associated three distinct scatter fringe patterns 60, 60.1, 60.2, 60.3 are rotated with respect to one another, each separated from one another, extending radially outwards from the optic axis 53 of the imaging optics 52, wherein relative to the first embodiment of the eighth aspect of the range imaging LIDAR system 10, 10$^{viii}$ illustrated in FIG. 50a, FIG. 53a corresponds in location to FIG. 50c and FIG. 53b corresponds in location to FIG. 50e. The mask 138, 138.1$^c$ is configured (i.e. sized and shaped) and aligned so as to provide for masking all of the light from the uniform and diffuse reference beam 90' for which the image thereof at the output focal plane 44.2 of the Fabry-Pérot interferometer 44 would otherwise overlap the corresponding image 114' of the scattered light signals 32.1', 32.2', 32.3'. Accordingly, within the output focal plane 44.2 of the Fabry-Pérot interferometer 44, the light within the region 326 of the image 114' of the of the scattered light signals 32.1', 32.2', 32.3' is exclusively from the associated scattered light 32 thereof, and light associated with the remaining region 328 of the output focal plane 44.2 is exclusively from the uniform and diffuse reference beam 90'.

For each of the embodiments illustrated in FIGS. 51a-53b, the separate arcuate fringes 62' of each of the scattered fringe patterns 60, 60.1, 60.2, 60.3 are separately processed by the data processor 66 in accordance with the multichannel variations of the eighth aspect of the range imaging LIDAR system 10, 10$^{viii.a-c}$ described hereinabove so as to provide for generating a set of one or more measures of line-of-sight relative wind velocity U, static temperature Temp, molecular counts MolCounts, aerosol counts Aero Counts, and background counts BackCounts at one or more selected nominal ranges R, or as a function of nominal range R, for each of the interaction regions 22, 22.1, 22.2, 22.3 within the associated fields-of-view 34 of the associated receiver optics 24.

Referring to FIGS. 54a-e, there is illustrated a second embodiment of the eighth aspect of the range imaging LIDAR system 10, 10$^{viii''}$, that is the same as the second embodiment illustrated in FIGS. 50a-e except that the associated detection system 46 is in accordance with the first embodiment of the third aspect of the detection system 46.3 illustrated in FIGS. 24a and 44. Accordingly, the associated resulting first 330 and second 332 sets of fringes are processed in accordance with the methodology described hereinabove associated with FIGS. 27-41, 12 and 19-21.

Referring to FIGS. 55a-e, there is illustrated a third embodiment of the eighth aspect of the range imaging LIDAR system 10, 10$^{viii'''}$, that is substantially the same as the second embodiment of the eighth aspect of the range imaging LIDAR system 10, 10$^{viii''}$ described hereinabove, except that the third embodiment of the eighth aspect of the range imaging LIDAR system 10, 10$^{viii'''}$ incorporates second aspect of a mask system 138' comprising a programmable mask 138.2 that replaces the mask 138, 130.1 of the second embodiment of the eighth aspect of the range imaging LIDAR system 10, 10$^{viii'}$, wherein the programmable mask 138.2 comprises a second digital micromirror device (DMD) 334 and an associated second light block 336. The second digital micromirror device (DMD) 334 is oriented relative to the reference illuminator 324 and to the second beam splitter optic 136 so that when the associated micromirrors 144 of the second digital micromirror device (DMD) 334 are in a first pixel mirror rotational state 338, light from the uniform and diffuse reference beam 90' incident thereupon is reflected towards the second beam splitter optic 136 and is reflected from the partially reflective surface 136.1 of a second beam splitter optic 136 into to the Fabry-Pérot interferometer 44, and when the associated micromirrors 144 of the second digital micromirror device (DMD) 334 are in a second pixel mirror rotational state 340, light from the uniform and diffuse reference beam 90' incident thereupon is reflected towards the second light block 336 and is substantially absorbed thereby. Accordingly, the micromirrors 144 of the second digital micromirror device (DMD) 334 that would coincide in location with the opaque region 138' of the first aspect of the mask 138, 138.1 used in the first and second embodiments of the eighth aspect of the range imaging LIDAR system 10, 10$^{viii'}$, 10$^{viii''}$ are set to the second pixel mirror rotational state 340 so as to block the corresponding portions of the uniform and diffuse reference beam 90', and the remaining micromirrors 144 of the second digital micromirror device (DMD) 334 are set to the first pixel mirror rotational state 338 so as to generate a masked reference beam 90.2" that corresponds to the masked reference beam 90.1" of the first and second embodiments of the eighth aspect of the range imaging LIDAR system 10, 10$^{viii'}$, 10$^{viii''}$. Otherwise, the third embodiment of the eighth aspect of the range imaging LIDAR system 10, 10$^{viii'''}$ functions the same as the second embodiment of the eighth aspect of the range imaging LIDAR system 10, 10$^{viii''}$, with FIGS. 55b-e corresponding to FIGS. 54b-e, respectively.

Figure 56:
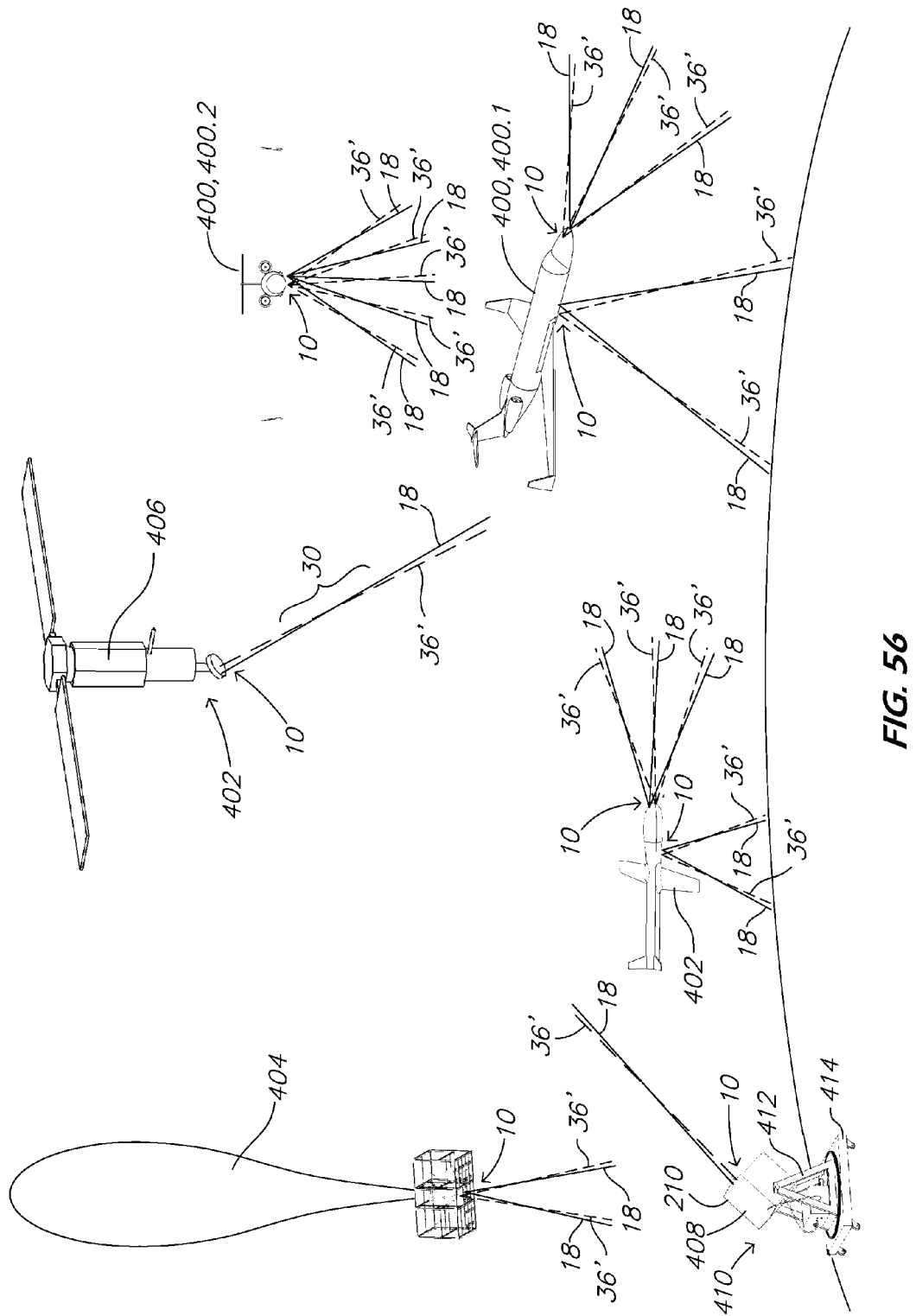
FIG. 56 illustrates various applications of a range imaging LIDAR system.

Referring to FIG. 56, the various aspects of the range imaging LIDAR system 10, 10$^{i}$-10$^{viii}$ can be used in a variety of applications, including flight control or flight data monitoring, for example, for an aircraft 400 or UAV 402; or monitoring atmospheric or weather conditions from an aircraft 400.1, 400.2, UAV 402, balloon 404, satellite 406, or ground-based LIDAR system 408.

For example, the aircraft 400, 400.1 and UAV 402 illustrated in FIG. 56 each incorporate a range imaging LIDAR system 10 that incorporates three lines of sight 36' so as to provide for measuring an associated relative wind vector in addition to other air data products, wherein each line of sight 36' is along the associated optic axis of the corresponding associated receiver optics 24. Generally the range imaging LIDAR system 10 can be adapted for airframe applications which, for example, might otherwise incorporate a pitot-static tube for measuring air speed. In addition to air speed, the range imaging LIDAR system 10 provides for optically measuring, or calculating from optical measurements, a substantial quantity of air data products, and can be adapted to detect wind shear, wake vortices, clear air turbulence, and engine stall (unstart) conditions. Common air data products include, but are not limited to, Mach number, true airspeed, calibrated airspeed, vertical speed, static density, static air temperature, sideslip, angle of attack, pressure altitude, and dynamic pressure. The air data products can be used directly by an aircraft flight computer for flight control purposes. The range imaging LIDAR system 10 provides for an airframe-independent design that can be flush-mounted to the skin of the airframe, e.g. without protrusions that otherwise might increase the airframe's radar cross section and drag, so as to provide for relatively low observability and drag. The range imaging LIDAR system 10 can operate at substantial angles of attack. For example, a properly-configured range imaging LIDAR system 10 can operate at a 90 degree angle of attack. The range imaging LIDAR system 10 can be adapted to a variety of airframes, for example, including highly maneuverable aircraft and hoverable aircraft. The range imaging LIDAR system 10 provides for an airframe-independent design that can be relatively inexpensive to calibrate, recalibrate or service.

As another example, the aircraft 400, 400.1, 400.2, UAV 402, and balloon 404 illustrated in FIG. 56 each incorporate an range imaging LIDAR system 10 adapted with a plurality of lines of sight 36', so as to provide for substantially simultaneously measuring air data products from one or more interaction regions 22 along each of the associated lines of sight 36'. For example, the first aircraft 400.1 incorporates two lines of sight 36' distributed transversely with respect to the associated direction of travel thereof, and the second aircraft 400.2 incorporates five lines of sight 36' distributed transversely with respect to the associated direction of travel thereof, so as to provide for automatically acquiring a substantial amount of atmospheric data (e.g. density, temperature and wind velocity) that can be used for either monitoring or predicting weather, or for monitoring particular emissions into the atmosphere. In accordance with another embodiment, the UAV 402 is illustrated with lines of sight 36' substantially along the direction of travel thereof, which can provide for automatically acquiring a substantial amount of atmospheric data (e.g. density, temperature and wind velocity) that, for example, can be used for either monitoring or predicting weather dynamics, or for monitoring the dynamics of particulate emissions into the atmosphere. Generally, the orientation of the plurality of lines of sight 36' relative to the associated vehicle or the associated direction of travel thereof is not limiting, i.e. either other orientations or a combination of orientations may be used.

As yet another example, the satellite 406 and the ground-based LIDAR system 408 illustrated in FIG. 56 each incorporate an range imaging LIDAR system 10 adapted with a line of sight 36' that is directed respectively downwards or upwards into the atmosphere so as to provide for measuring air data products from one or more interaction regions 22 along each of the associated one or more lines of sight 36', for example, so as to provide for automatically acquiring a substantial amount of atmospheric data (e.g. density, temperature and wind velocity) that can be used for either monitoring or predicting weather, or for monitoring particular emissions into the atmosphere.

As yet another example, the ground-based LIDAR system 408 and associated range imaging LIDAR system 10 may be operatively associated with a gimbal mechanism 410 comprising an azimuthally-rotatable platform 412 which is adapted to pivotally support associated beam steering optics 210 so as to provide for an elevational rotation thereof relative a base 414 to which the azimuthally-rotatable platform 412 is operatively associated. Accordingly, the azimuthally-rotatable platform 412 is adapted to rotate relative to the base 414, for example, responsive to an associated motor drive system, so as to define an associated azimuth angle of the beam steering optics 210, and the beam steering optics 210 is adapted to rotate relative to the azimuthally-rotatable platform 412, for example, responsive to an associated motor drive system, so as to define an associated elevation angle of the beam steering optics 210.

The range imaging LIDAR system 10 in accordance with any of the above-described aspects $10^i$-$10^{viii}$ can be employed utilized for any optical remote sensing scenario. For example, the range imaging LIDAR system 10 could be applied to the detection of Clear Air Turbulence, Optical Air Data systems, Atmospheric Aerosol Characterization, Smog detection and Chemical/Biological Agent detection. The range imaging LIDAR system 10 can be used to provide air data for Field Artillery Fire Direction Control, Small Arms Wind correction, Airport Turbulence Monitoring and Ship Navigation velocity/weather monitoring. The range imaging LIDAR system 10 can also be used to provide air data for predicting winds for any sporting events in which micro-scale airflow plays a significant role such as golf, football, baseball, etc. This range imaging LIDAR system 10 can also be used to provide air data for Wind Farm Site Prospecting, Assessment, and Optimization, Wind Farm Monitoring, Wake Effects Measurement and Analysis Wind Turbine Control, and Weather Forecasting for Wind Farms and Grid Management.

For example, in application to artillery, the range imaging LIDAR system 10 can be mounted on a vehicle or carried by an operator to a location from which artillery is to be fired. The range imaging LIDAR system 10 would then measure atmospheric parameters such as wind speed, wind direction, temperature, density, and pressure in the atmospheric volume through which the projectile will be fired. These are the standard inputs to contemporary fire direction control systems in use by the military, for example, as described in FM 6-40/ MCWP 3-16.4 Tactics, Techniques, and Procedures for FIELD ARTILLERY MANUAL CANNON GUNNERY (Field Manual), which is incorporated herein by reference. By accounting for these atmospheric parameters along the projectile's flight path, the circular error probable (CEP) can be reduced and accuracy improved.

As another example, in application to sailing ships, the range imaging LIDAR system 10 can be used to provide measures of wind speed, wind direction, temperature, density, pressure, or the associated wind field around the ship, for ships that obtain their propulsion from the wind. For example, racing yachts such as used in the America's Cup, can benefit from knowing the winds near their ship as well as the winds near their competition. This information can be used to provide for trimming sails, deploying wings or aerodynamic propulsion devices, or planning trajectories so as to take maximum advantage of the current wind conditions. Recreational users can similarly use information about the winds blowing in the region near their craft.

As yet another example, in application to sporting events, the range imaging LIDAR system 10 can provide information about the local winds so as to enable participants to adapt accordingly. For example, a golf player can compensate for or take advantage of local winds, given information about how the wind is blowing over the entire flight path of the ball, or if a wind gust was approaching or would soon dissipate, so as to enable the golfer to either adjust their shot according, or to wait for better conditions. Even if the wind information is not available to the individual players, it would be of benefit to broadcasters in showing the viewing audience a graphic of the winds, a trajectory of the ball, and how the winds affected a particular shot. The range imaging LIDAR system 10 can also be of benefit in other sporting venues, such as baseball or football, for example, so as to enable broadcasters to illustrate how a baseball might have been held up by the winds in the stadium, or to show how winds had impacted a pass, punt or field goal in football, to as to enhance the viewing experience for fans. Given information about the winds in the stadium, players could adjust their actions accordingly, for example, when hitting a fly ball or kicking a field goal.

As yet another example, in application to the control of wind-induced building sway, the range imaging LIDAR system 10 can provide advance information about the wind field of a building so as to provide for wind-responsive or wind-anticipative control of tall buildings that are otherwise subject to sway in strong winds. Most modern tall buildings incorporate some form of damping to control how much the building sways in strong winds. The range imaging LIDAR system 10 can provide a predictive component (feed forward) to the associated control loops, so as to provide for improving the performance of these damping systems.

As yet another example, in application to road safety, the range imaging LIDAR system 10 can be used to monitor the wind fields that affect bridges, so as either to provide for an active control of the bridge structure responsive thereto, or to provide for controlling or limiting traffic over the bridge. Similarly, the range imaging LIDAR system 10 can be used to monitor wind conditions along roads in zones where high winds regularly pose a danger to travelers, and provide a real-time alert to motorists who are about to enter these zones. The range imaging LIDAR system 10 can be used to detect the presence of fog in fog-prone road zones, and to alert motorists of the presence of fog in advance of entering these zones.

As yet another example, in application to the control and/or dispersal of air pollution, the range imaging LIDAR system 10 can be used in a portable wind measuring system so as to enable responsible parties to more accurately predict where airborne pollution is headed as well as assisting in the assessment how much the pollution is being dispersed or diluted. Local wind mapping along with temperature and pressure measurements would provide input to models for prediction of the Nominal Hazard Zone even when there are no visible aerosols to define the plume.

As yet another example, the range imaging LIDAR system 10 can be used in a wind tunnel to provide for range resolved airflow measurements within the wind tunnel that can provide density and temperature as well as velocity of the air flow within the wind tunnel at a point, along a line, or within a volume of the wind tunnel, without perturbing the associated flow field, wherein the wind tunnel is used to measure how airflow interacts with the objects being tested therein.

As yet another example, the range imaging LIDAR system 10 can be used at an airport to enhance airport safety, for example, by providing for detecting clear air turbulence resulting from large aircraft taking off or landing, and to also provide measures of air temperature and density that can affect the lift, and hence performance, of aircraft operating at that airport.

As yet another example, the range imaging LIDAR system 10 can be used to enhance aircraft safety, for example, by providing for mapping the winds in the vicinity of an aircraft and thus providing the pilot with information that is difficult at best to obtain with other means. For example, in a rotocraft, the range imaging LIDAR system 10 can provide wind information outside of the rotor down wash so as to aid the pilot in maintaining hover in gusty wind conditions. In a conventional fixed-wing aircraft, the range imaging LIDAR system 10 can provide a measure of cross winds during landing or takeoff, and can be used to detect clear air turbulence during flight. In a sail-plane aircraft, the range imaging LIDAR system 10 can provide a measure of the wind field within which the aircraft is operating, and can provide assistance in locating updrafts in order to stay aloft. The range imaging LIDAR system 10 provides for measuring wind speed, air temperature and air density, which, for example, for purposes of landing, might not be otherwise be available at some airfields.

As yet another example, a range imaging LIDAR system 10 can be used support airdrops, for example, by either monitoring the wind field below from the aircraft making the drop so as to determine when to drop the payload, or by monitoring the wind field aloft with a range imaging LIDAR system 10 mounted on the payload so as to provide for adjusting the associated parachute during descent so as to provide for controlling the resulting drop location so that the payload is deposited closer to the desired drop zone than might otherwise be possible. Alternatively, the wind field could be monitored from above by an associated aircraft, and the resulting measurements could then be communicated to the payload to provide for controlling one or more associated parachutes or drag chutes accordingly so as to control the resulting drop location.

As yet another example, a range imaging LIDAR system 10 can be used to characterize the atmosphere. A range imaging LIDAR system 10 can be used to provide range resolved measures of velocity, temperature, and density of the atmosphere 16 that can be used by meteorologists and/or by atmospheric scientists, for example, so as to provide for predicting or analyzing the weather.

As yet another example, a range imaging LIDAR system 10 can be used on ocean and lake buoys and other ocean platforms, for example, site assessment and optimization for off-shore wind farms, oil drilling and production platforms, so as to provide range resolved measures of wind speed and direction, for example, to provide for landing helicopters, to control the location of the platform on the ocean, or to provide a warning for general platform operations in advance of the occurrence of high winds or wind gusts.

Figure 57:
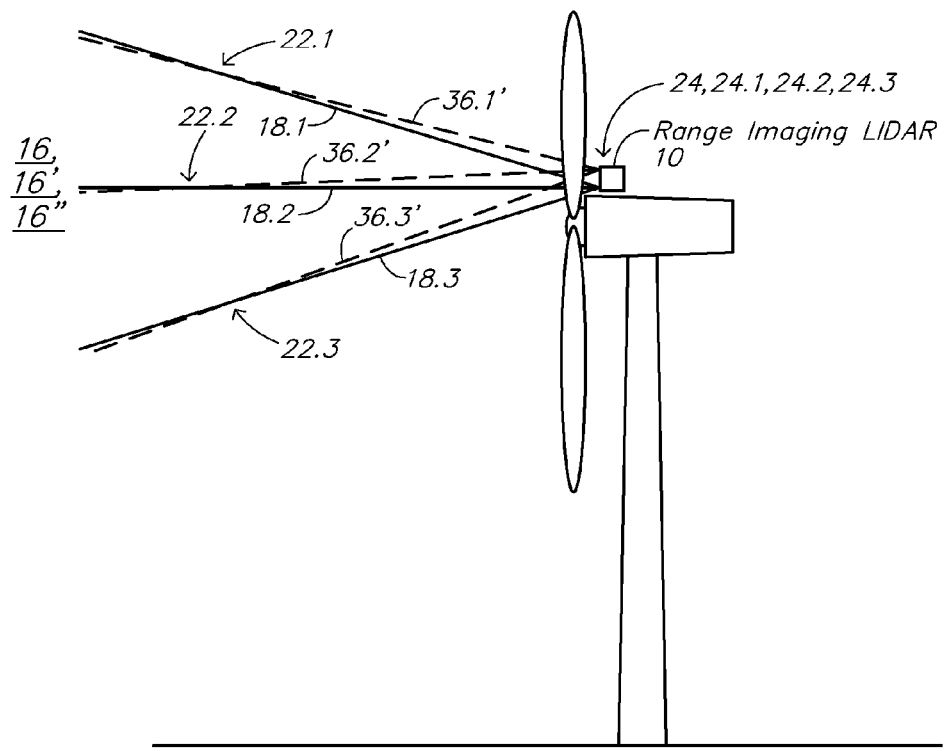
FIG. 57 illustrates a first embodiment a range imaging LIDAR system in cooperation with a wind turbine.
Figure 58:
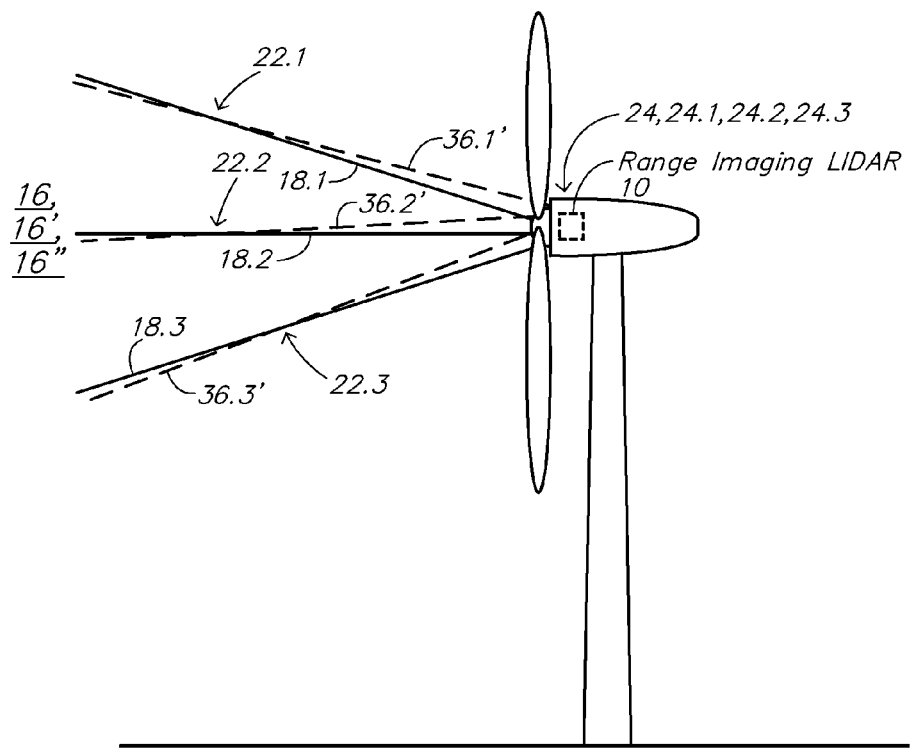
FIG. 58 illustrates a first embodiment a range imaging LIDAR system in cooperation with a wind turbine.

Referring to FIGS. 57 and 58, a range imaging LIDAR system 10 in accordance with any of the above-described aspects is illustrated in cooperation with an associated wind turbine 416 so as to provide for measuring atmospheric data 68 associated with the operation of the wind turbine 416, for example, a plurality of velocity, temperature or density measurements at a plurality of ranges R from the wind turbine 416, so as to provide for assessing both immediate and near term atmospheric conditions, the atmospheric data 68 of which can be used to control the wind turbine 416 so as to provide for optimizing the electrical power generated thereby or to prevent wind-caused damage thereto. For example, FIG.

57 illustrates a first embodiment for which the associated range imaging LIDAR system 10 is attached to the housing or nacelle 418 of the wind turbine 416, and FIG. 57 illustrates a second embodiment wherein the associated range imaging LIDAR system 10 is mounted withing the housing or nacelle 418 of the wind turbine 416 and is operative from within or through a rotatable portion of the wind turbine 416, for example, from within or through a hollow axle 420 of the wind turbine 416. For example, in both the first and second embodiments, the range imaging LIDAR system 10 comprises a plurality of beams of light 18.1, 18.2, 18.3 in a corresponding plurality of different directions, and a corresponding plurality of receiver optics 24, 24.1, 24.2, 24.3 with a corresponding plurality of lines of sight 36.1', 36.2', 36.3' that in cooperation with the corresponding associated beams of light 18.1, 18.2, 18.3 provide for a plurality of associated interaction regions 22.1, 22.2, 22.3, each spanning a range of ranges R, and which collectively provide for measuring a different regions of the atmosphere 16. In the first and second embodiments illustrated in FIGS. 57 and 58, the associated range imaging LIDAR systems 10 are relatively fixed with respect to the wind turbine 416. Alternatively, the associated interaction regions 22.1, 22.2, 22.3 could be scanned within the atmosphere 16. For example, in the second embodiment of the range imaging LIDAR systems 10 illustrated in FIG. 58, the associated beams of light 18.1, 18.2, 18.3 and associated receiver optics 24, 24.1, 24.2, 24.3 could be configured to rotate with the wind turbine 416 and thereby scan the associated interaction regions 22.1, 22.2, 22.3 over one or more conical surface paths. Alternatively or additionally, a ground-based LIDAR system 408 could be used in cooperation with the wind turbine 416 to similarly provide associated atmospheric data 68.

It should be understood that the range imaging LIDAR systems 10 can be used with any fluid medium that provides for generating detectable scattered light 32 when illuminated with a beam of line 18, including, but not limited to, non-atmospheric gases flowing in a pipe and liquids flowing in pipes, channels or sprays. For example, the range imaging LIDAR systems 10 could also be used to measure water flow in pipes or channels, or to provide for measuring the speed of a marine vehicle or the associated conditions of the water upon which or within which the marine vehicle operates.

Although the range imaging LIDAR systems $10, 10^i\text{-}10^{viii}$ described herein have each incorporated a Fabry-Pérot interferometer 44, it should be understood that any type of interferometer could instead also be used, for example, including but not limited to either a Michelson interferometer and associated variations thereof, a Twyman-Green interferometer or a Fizeau interferometer.

Furthermore, although the range imaging LIDAR systems $10, 10^i\text{-}10^{viii}$ described herein have been illustrated with associated geometries that provide for detecting backscattered scattered light 32, it should be understood that a range imaging LIDAR system $10, 10^i\text{-}10^{viii}$ could also or alternatively incorporate an associated geometry that provides for detecting either transversely scattered light 32, or forward scattered light 32. Yet further, although the range imaging LIDAR systems $10, 10^i\text{-}10^{viii}$ described herein have been illustrated as providing for range-responsive measurements responsive to a range R along the optic axis 36 of the receiver optics 24, for example, a range R to the receiver optics 24 or the detection system 46, the range-responsive measurements could also be characterized with respect to a range measured along the optic axis 38 of the beam of light 18, or any other axis, by geometric transformation.

While specific embodiments have been described in detail in the foregoing detailed description and illustrated in the accompanying drawings, those with ordinary skill in the art will appreciate that various modifications and alternatives to those details could be developed in light of the overall teachings of the disclosure. It should be understood, that any reference herein to the term "or" is intended to mean an "inclusive or" or what is also known as a "logical OR", wherein the expression "A or B" is true if either A or B is true, or if both A and B are true. Furthermore, it should also be understood that unless indicated otherwise or unless physically impossible, that the above-described embodiments and aspects can be used in combination with one another and are not mutually exclusive. Accordingly, the particular arrangements disclosed are meant to be illustrative only and not limiting as to the scope of the invention, which is to be given the full breadth of the appended claims, and any and all equivalents thereof.

What is claimed is:

1. A method of remotely sensing a fluid medium, comprising:
   a. receiving scattered light from a portion of said fluid medium, wherein said scattered light is generated along a first beam of substantially monochromatic light projected into said fluid medium along a first axis, and the operation of receiving said scattered light is nominally along a second axis that is oriented in a different direction relative to said first axis;
   b. forming an image of said scattered light through an interferometer, wherein said image of said scattered light comprises a first plurality of fringes, and each fringe of said first plurality of fringes is associated with a different portion of said portion of said fluid medium at a different range;
   c. detecting at least a portion of said image of said first plurality of fringes of said scattered light so as to generate a corresponding plurality of detected signals;
   d. analyzing at least a first fringe of said first plurality of fringes embodied in said plurality of detected signals so as to determine at least one measure of said fluid medium within a first portion of said fluid medium at a first range; and
   e. analyzing at least a second fringe of said first plurality of fringes embodied in said plurality of detected signals so as to determine at least one measure of said fluid medium within at least a second portion of said fluid medium at least a second range, wherein said first portion of said fluid medium is different from said second portion of said fluid medium, and said first range is different from said second range.

2. A method of remotely sensing a fluid medium as recited in claim 1, further comprising:
   a. receiving a portion of said substantially monochromatic light from a source thereof as a reference source; and
   b. detecting said reference source, wherein the operations of analyzing said at least said first fringe of said first plurality of fringes and analyzing said at least said second fringe of said first plurality of fringes are responsive to at least one corresponding reference signal detected from said reference source.

3. A method of remotely sensing a fluid medium as recited in claim 2, wherein the operation of detecting said reference source comprises detecting an intensity of said reference source.

4. A method of remotely sensing a fluid medium as recited in claim 2, further comprising:

a. forming an image of said reference source through said interferometer, wherein said image of said reference source comprises at least a second fringe; and b. processing said at least said second fringe, wherein the operations of analyzing said at least said first fringe of said first plurality of fringes and analyzing said at least said second fringe of said first plurality of fringes are responsive to the operation of processing said at least said second fringe.

5. A method of remotely sensing a fluid medium as recited in claim 4, further comprising interleaving said substantially monochromatic light of said reference source with said scattered light prior to forming said images of said scattered light and said reference source through said interferometer.

6. A method of remotely sensing a fluid medium as recited in claim 5, further comprising masking a portion of said reference source prior to the operation of interleaving said substantially monochromatic light of said reference source with said scattered light, so as to prevent a more than insubstantial overlap of said first plurality of fringes with said at least said second fringe in said images of said scattered light and said reference source through said interferometer.

7. A method of remotely sensing a fluid medium as recited in claim 6, wherein the operation of masking said portion of said reference source comprises blocking said portion of said reference source from transmission to said interferometer.

8. A method of remotely sensing a fluid medium as recited in claim 6, wherein the operation of masking said portion of said reference source comprises controllably reflecting said portion of said reference source away from said interferometer.

9. A method of remotely sensing a fluid medium as recited in claim 5, further comprising masking a portion of said scattered light prior to the operation of interleaving said substantially monochromatic light of said reference source with said scattered light, so as to prevent a more than insubstantial overlap of said first plurality of fringes with said at least said second fringe in said images of said scattered light and said reference source through said interferometer.

10. A method of remotely sensing a fluid medium as recited in claim 5, further comprising diffusing and expanding an angular diversity of said substantially monochromatic light of said reference source prior to the operation of interleaving said substantially monochromatic light of said reference source with said scattered light.

11. A method of remotely sensing a fluid medium as recited in claim 1, further comprising generating said first beam of substantially monochromatic light and projecting said first beam of substantially monochromatic light into said fluid medium along said first axis.

12. A method of remotely sensing a fluid medium as recited in claim 1, further comprising collimating said scattered light prior to the operation of forming said image of said scattered light through said interferometer.

13. A method of remotely sensing a fluid medium as recited in claim 1, wherein each of said at least said first fringe and said at least said second fringe are arcuately shaped, further comprising azimuthally compressing said at least said first fringe and said at least said second fringe so as to form an associated linear fringe pattern, wherein the operation of detecting at least a portion of said image of said first plurality of fringes comprises detecting at least a portion of said associated linear fringe pattern.

14. A method of remotely sensing a fluid medium as recited in claim 13, wherein the operation of azimuthally compressing said at least said first fringe and said at least said second fringe comprises binning at least a portion of said plurality of detected signals corresponding to said image of said first plurality of fringes so as to generate a corresponding at least one set of detected signals representative of said at least said first fringe and said at least said second fringe.

15. A method of remotely sensing a fluid medium as recited in claim 13, wherein the operation of azimuthally compressing said at least said first and said at least said second fringes is performed with either a circle-to-line interferometer optic or a holographic optical element prior to the operation of detecting at least said portion of said image of said first plurality of fringes.

16. A method of remotely sensing a fluid medium as recited in claim 1, wherein said fluid medium comprises an atmosphere.

17. A method of remotely sensing a fluid medium as recited in claim 1, wherein said at least one measure of said fluid medium associated with at least one of said first or second portions of said fluid medium comprises a velocity of said fluid medium.

18. A method of remotely sensing a fluid medium as recited in claim 1, wherein said at least one measure of said fluid medium associated with at least one of said first or second portions of said fluid medium comprises a temperature of said fluid medium.

19. A method of remotely sensing a fluid medium as recited in claim 1, wherein said at least one measure of said fluid medium associated with at least one of said first or second portions of said fluid medium comprises a density of said fluid medium.

20. A method of remotely sensing a fluid medium as recited in claim 1, further comprising defining a first function comprising a model of an optical response of said interferometer underlying said first plurality of fringes, wherein said first function incorporates at least one parameter responsive to said fluid medium, the operation of detecting said image comprises generating a set of image data responsive to an intensity distribution of said image, at least one of the operations of analyzing said at least said first fringe of said first plurality of fringes or analyzing said at least said second fringe of said first plurality of fringes is in accordance with a function fitting process on corresponding fringe data of either said at least said first fringe of said first plurality of fringes or said at least said second fringe of said first plurality of fringes, corresponding to a corresponding portion of said fluid medium, wherein said function fitting process comprises determining said at least one parameter of said first function associated with said corresponding fringe data so that said first function at least approximates a portion of said set of image data corresponding to said corresponding fringe data, and said at least one measure of said fluid medium within said corresponding portion of said fluid medium is responsive to said at least one parameter associated with said corresponding fringe data.

21. A method of remotely sensing a fluid medium as recited in claim 20, wherein said fluid medium comprises an atmosphere, and said first function is responsive to a number of photons responsive to scattering by aerosols in said atmosphere, a number of photons responsive to scattering by molecules in said atmosphere, a number of photons resulting from background radiation, a magnitude of velocity of said atmosphere and a temperature of said atmosphere.

22. A method of remotely sensing a fluid medium as recited in claim 20, further comprising a. receiving a portion of said substantially monochromatic light from a source thereof as a reference source; and b. detecting said reference source, wherein the operations of analyzing said at least said first fringe of said first plurality of fringes and analyzing said at least said second fringe of said first plurality of fringes are responsive to at least one corresponding reference signal detected from said reference source, wherein said first function comprises at least one term related to at least one defect of said interferometer, further comprising characterizing said at least one term related to said at least one defect responsive to said at least one corresponding reference signal.

23. A method of remotely sensing a fluid medium as recited in claim 1, further comprising
   a. defining a first function comprising a model of an optical response of said interferometer underlying said first plurality of fringes, wherein said first function incorporates at least one parameter responsive to said fluid medium,
   b. defining at least one second function as a partial derivative of said first function with respect to a corresponding one said at least one parameter, wherein at least one of the sets of operations of detecting and analyzing said at least said first fringe of said first plurality of fringes or detecting and analyzing said at least said second fringe of said first plurality of fringes is in accordance with an integration and solving process on corresponding fringe data of either said at least said first fringe of said first plurality of fringes or said at least said second fringe of said first plurality of fringes, corresponding to a corresponding portion of said fluid medium, wherein said integration and solving process comprises:
      i. selectively integrating at least one portion of said corresponding fringe data, wherein said at least one portion of said corresponding fringe data is selected responsive to a value of said at least one second function in relation to a corresponding threshold, wherein said at least one second function corresponds to said corresponding one said at least one parameter, and the operation of selectively integrating said at least one portion of said corresponding fringe data provides for generating a corresponding integrated signal value;
      ii. repeating the operation of selectively integrating said at least one portion of said corresponding fringe data for each said at least one parameter to be identified so as to provide for generating a set of integrated signal values, wherein said set of integrated signal values comprises either a set of first and second complementary signals for each said at least one parameter to be identified or a combination of at least one of said first or second complementary signals corresponding to each said corresponding one said at least one parameter and an integrated signal value resulting from an integration of an entirety of said corresponding fringe data, said first complementary signal corresponds to said corresponding integrated signal value for a first portion of said corresponding fringe data for which said at least one second function exceeds a first threshold, and said second complementary signal corresponds to said corresponding integrated signal value for a second portion of said corresponding fringe data for which said at least one second function is less than a second threshold; and
      iii. determining said at least one parameter of said first function associated with said corresponding fringe data from said set of integrated signal values, wherein said at least one measure of said fluid medium within said corresponding portion of said fluid medium is responsive to said at least one parameter associated with said corresponding fringe data.

24. A method of remotely sensing a fluid medium as recited in claim 23, wherein said fluid medium comprises an atmosphere, and said first function is responsive to a number of photons responsive to scattering by aerosols in said atmosphere, a number of photons responsive to scattering by molecules in said atmosphere, a number of photons resulting from background radiation, a magnitude of velocity of said atmosphere and a temperature of said atmosphere.

25. A method of remotely sensing a fluid medium as recited in claim 23, wherein said fluid medium comprises an atmosphere, and said first function is of the form $I(phi)=A*H(phi,mA)+M*H(phi,mM)+B*T^2/(1-R^2)$, wherein I is an intensity of said portion of said image of said first plurality of fringes responsive to phi, phi is a function responsive to one said at least one parameter corresponding to a velocity of said atmosphere and responsive to a radial dimension of said first plurality of fringes, A is one said at least one parameter representative of a number of photons scattered by aerosol particles in said atmosphere, mA is a molecular mass of said aerosol particles, M is one said at least one parameter representative of a number of photons scattered by molecules in said atmosphere, mM is a molecular mass of said molecules, B is one said at least one parameter representative of a number of background photons from said atmosphere, T is a transmissivity associated with said interferometer, R is a reflectivity associated with said interferometer, and H is a function responsive to at least one measure of defects of said interferometer and responsive to one said at least one parameter responsive to a temperature of said atmosphere.

26. A method of remotely sensing a fluid medium as recited in claim 23, further comprising:
   a. receiving a portion of said substantially monochromatic light from a source thereof as a reference source; and
   b. detecting said reference source, wherein the operations of analyzing said at least said first fringe of said first plurality of fringes and analyzing said at least said second fringe of said first plurality of fringes are responsive to at least one corresponding reference signal detected from said reference source, and said first function comprises at least one term related to at least one defect of said interferometer, further comprising characterizing said at least one term related to said at least one defect responsive to said corresponding reference signal.

27. A method of remotely sensing a fluid medium as recited in claim 23, wherein said first and second thresholds are dependent upon said at least one parameter.

28. A method of remotely sensing a fluid medium as recited in claim 23, wherein the operation of selectively integrating said at least one portion of said corresponding fringe data comprises selectively reflecting at least one portion of light associated with said corresponding fringe data to at least one photodetector, wherein said at least one photodetector generates said corresponding integrated signal value.

29. A method of remotely sensing a fluid medium as recited in claim 28, wherein the operation of selectively reflecting said at least one portion of light associated with said corresponding fringe data to said at least one photodetector comprises reflecting a first disjoint portion of said at least one portion of light associated with said corresponding fringe data to a first photodetector to generate said first complementary signal and reflecting a second disjoint portion of said at least one portion of light associated with said corresponding fringe data to a second photodetector to generate said second complementary signal.

30. A method of remotely sensing a fluid medium as recited in claim 28, wherein the operation of selectively reflecting said at least one portion of light associated with said corresponding fringe data to said at least one photodetector comprises reflecting one of a first and second disjoint portion of said at least one portion of light associated with said corresponding fringe data to a common one said at least one photodetector so as to provide for generating a corresponding either said first complementary signal or said second complementary signal.

31. A method of remotely sensing a fluid medium as recited in claim 11, wherein said fluid medium comprises an atmosphere, and the operations of generating said first beam of substantially monochromatic light and receiving said scattered light from said portion of said atmosphere are performed from an air vehicle, and said at least one measure of said atmosphere within each of said first and second portions of said atmosphere provides for generating air data used for controlling said air vehicle.

32. A method of remotely sensing a fluid medium as recited in claim 11, wherein said fluid medium comprises an atmosphere, and the operations of generating said first beam of substantially monochromatic light and receiving said scattered light from said portion of said atmosphere are performed from an air vehicle, and said at least one measure of said atmosphere within each of said first and second portions of said atmosphere provides for monitoring said atmosphere.

33. A method of remotely sensing a fluid medium as recited in claim 11, wherein said fluid medium comprises an atmosphere, and the operations of generating said first beam of substantially monochromatic light and receiving said scattered light from said portion of said atmosphere are performed from at least one of a housing of a wind turbine or a central axis of a rotating portion of said wind turbine, and said at least one measure of said atmosphere within each of said first and second portions of said atmosphere provides for controlling said wind turbine.

34. A method of remotely sensing a fluid medium as recited in claim 11, wherein said fluid medium comprises an atmosphere, and the operations of generating said first beam of substantially monochromatic light and receiving said scattered light from said portion of said atmosphere are performed from a ground station, and said at least one measure of said atmosphere within each of said first and second portions of said atmosphere provides monitoring or predicting at least one weather condition in said atmosphere.

35. A system for remotely sensing a fluid medium, comprising:
a. a first beam of substantially monochromatic light projected into the fluid medium along a first axis;
b. an interferometer configured to receive scattered light of said first beam of substantially monochromatic light from said fluid medium along a portion of said first beam of substantially monochromatic light;
c. a set of imaging optics that comprises an optic axis along which said scattered light is received, said set of imaging optics is operatively associated with or a part of said interferometer, said set of imaging optics provides for generating an image of a first plurality of fringes from said interferometer responsive to said scattered light, wherein said image of said first plurality of fringes is located at a focal plane of said set of imaging optics, and said optic axis is oriented in a different direction relative to said first axis;
d. at least one detector operatively associated with said set of imaging optics, wherein said at least one detector provides for detecting said image of said first plurality of fringes, and different fringes of said first plurality of fringes are associated with different portions of said fluid medium along said portion of said first beam of substantially monochromatic light; and
e. a processor operatively coupled to said at least one detector, wherein said processor provides for determining at least one measure of said fluid medium within a first portion of said fluid medium responsive to a detection of a first fringe of said image of said first plurality of fringes by said at least one detector, and said processor provides for determining at least one measure of said fluid medium within a second portion of said fluid medium responsive to a detection of a second fringe of said image of said first plurality of fringes by said at least one detector.

36. A system for remotely sensing a fluid medium as recited in claim 35, wherein said first beam of substantially monochromatic light comprises ultraviolet light.

37. A system for remotely sensing a fluid medium as recited in claim 35, further comprising a light source to generate said first beam of substantially monochromatic light.

38. A system for remotely sensing a fluid medium as recited in claim 37, wherein said light source comprises a laser.

39. A system for remotely sensing a fluid medium as recited in claim 37, further comprising a filter in cooperation with said light source so as to provide for said first beam of substantially monochromatic light projected into said fluid medium to be substantially monochromatic.

40. A system for remotely sensing a fluid medium as recited in claim 35, further comprising a pulsed laser light source to generate said first beam of substantially monochromatic light, wherein said processor is synchronized with said pulsed laser light source so as to provide for acquiring both a reference signal and at least one scattered light signal from said at least one detector.

41. A system for remotely sensing a fluid medium as recited in claim 35, wherein said interferometer comprises a Fabry-Perot etalon in cooperation with said set of imaging optics, said set of imaging optics are located between said Fabry-Perot etalon and an operative surface of an associated detection system, said detection system comprises said at least one detector, and said Fabry-Perot etalon comprises a plurality of partially reflective surfaces separated by a gap, and a size of said gap is controllable responsive to said processor.

42. A system for remotely sensing a fluid medium as recited in claim 35, wherein said interferometer comprises a Fabry-Perot etalon in cooperation with said set of imaging optics, said set of imaging optics are located between said Fabry-Perot etalon and an operative surface of an associated detection system, and said detection system comprises said at least one detector.

43. A system for remotely sensing a fluid medium as recited in claim 42, further comprising a collimating lens operatively associated with said interferometer and located so that said scattered light receive by said interferometer is first received by said collimating lens.

44. A system for remotely sensing a fluid medium as recited in claim 43, further comprising:
a. a first beam splitter optic configured to receive said first beam of substantially monochromatic light prior to an interaction thereof with said fluid medium, wherein said first beam splitter optic provides for generating a reference source of said substantially monochromatic light from a portion of said first beam of substantially monochromatic light; and
b. a fiber optic, wherein said substantially monochromatic light of said reference source is directed through said fiber optic to a focal plane of said collimating lens, and through said collimating lens to said interferometer, and said set of imaging optics provides for generating an image of a second plurality of fringes from said interferometer responsive to said substantially monochromatic light of said reference source, wherein said image of said second plurality of fringes is located at said focal plane of said set of imaging optics.

45. A system for remotely sensing a fluid medium as recited in claim 35, further comprising a bandpass filter in cooperation with said interferometer.

46. A system for remotely sensing a fluid medium as recited in claim 35, wherein said at least one detector comprises an imager having an operative surface substantially coincident with said image from said interferometer, and said imager provides for generating an electronic signal representative of said image.

47. A system for remotely sensing a fluid medium as recited in claim 46, wherein said imager comprises a CCD camera, and said electronic signal generated by said CCD camera comprises a pixilated representation of said image.

48. A system for remotely sensing a fluid medium as recited in claim 35, wherein said at least one detector comprises at least one photodetector of an associated detection system, and said detection system further comprises a digital micromirror device (DMD), wherein said digital micromirror device (DMD) comprises a plurality of micromirrors, each micromirror of said plurality of micromirrors comprises a reflective surface, the plurality of micromirrors comprising a plurality of reflective surfaces that are located substantially coincident with said image from said interferometer, each micromirror is positionable into any of a plurality of pixel-mirror rotational states, said digital micromirror device (DMD) is configured in relation to said at least one detector so that each said micromirror of said plurality of micromirrors in at least one of said plurality of pixel-minor rotational states provides for reflecting light of said image to a corresponding one said at least one photodetector.

49. A system for remotely sensing a fluid medium as recited in claim 48, further comprising a light block, wherein said plurality of pixel-mirror rotational states comprises at least two pixel-minor rotational states, each said micromirror of said plurality of micromirrors in a first of said plurality of pixel-mirror rotational states provides for reflecting light of said image to said corresponding one said at least one photodetector, and each said micromirror of said plurality of micromirrors in a second of said plurality of pixel-mirror rotational states provides for reflecting light of said image to said light block.

50. A system for remotely sensing a fluid medium as recited in claim 49, wherein said plurality of pixel-mirror rotational states comprises at least three pixel-mirror rotational states, and each said micromirror of said plurality of micromirrors in a third of said plurality of pixel-mirror rotational states provides for reflecting light of said image to another said at least one photodetector.

51. A system for remotely sensing a fluid medium as recited in claim 35, further comprising a first beam splitter optic configured to receive said first beam of substantially monochromatic light prior to an interaction thereof with said fluid medium, wherein said first beam splitter optic provides for generating a reference source of said substantially monochromatic light from a portion of said first beam of substantially monochromatic light, said substantially monochromatic light of said reference source is separately detected by said at least one detector so as to provide at least one associated reference signal that is used in cooperation with the detection of said different fringes of said first plurality of fringes associated with said different portions of said fluid medium.

52. A system for remotely sensing a fluid medium as recited in claim 51, wherein said substantially monochromatic light of said reference source is detected by a separate said at least one detector, wherein said separate said at least one detector comprises a photodetector that provides for detecting an intensity of said substantially monochromatic light of said reference source.

53. A system for remotely sensing a fluid medium as recited in claim 51, wherein said substantially monochromatic light of said reference source is directed through said interferometer prior to the separate detection by said at least one detector, and said set of imaging optics provides for generating an image of a second plurality of fringes from said interferometer responsive to said substantially monochromatic light of said reference source, wherein said image of said second plurality of fringes is located at said focal plane of said set of imaging optics.

54. A system for remotely sensing a fluid medium as recited in claim 53, further comprising a second beam splitter optic, wherein said second beam splitter optic provides for combining said substantially monochromatic light of said reference source with said scattered light of said first beam of substantially monochromatic light so as to form a combined light signal received by said interferometer.

55. A system for remotely sensing a fluid medium as recited in claim 54, wherein said substantially monochromatic light of said reference source is reflected by a partially reflective surface of said second beam splitter optic.

56. A system for remotely sensing a fluid medium as recited in claim 54, wherein said substantially monochromatic light of said reference source is transmitted through a partially reflective surface of said second beam splitter optic.

57. A system for remotely sensing a fluid medium as recited in claim 53, wherein said image of said first plurality of fringes is separated from said image of said second plurality of fringes.

58. A system for remotely sensing a fluid medium as recited in claim 54, wherein said image of said first plurality of fringes is interleaved with said image of said second plurality of fringes.

59. A system for remotely sensing a fluid medium as recited in claim 58, further comprising a first mask interposed between said reference source and said second beam splitter optic, wherein said first mask is shaped so as to block said second plurality of fringes from more than insubstantially overlapping said first plurality of fringes.

60. A system for remotely sensing a fluid medium as recited in claim 59, wherein said first mask comprises at least one opaque region on an otherwise transparent element located between said reference source and said second beam splitter optic.

61. A system for remotely sensing a fluid medium as recited in claim 59, further comprising a second mask interposed between said fluid medium and said second beam splitter optic, wherein said second mask is shaped so as to block said first plurality of fringes from more than insubstantially overlapping said second plurality of fringes.

62. A system for remotely sensing a fluid medium as recited in claim 59, wherein said first mask comprises a digital micromirror device (DMD) located between said reference source and said second beam splitter optic, wherein a plurality of micromirrors of said digital micromirror device (DMD) are set to a first pixel-mirror rotational state so as to provide for reflecting said substantially monochromatic light of said reference source towards said second beam splitter optic, and a remainder of said micromirrors of said digital micromirror device (DMD) illuminated by said reference source are set to another pixel-mirror rotational state so as to reflect light impinging thereon away from said second beam splitter optic.

63. A system for remotely sensing a fluid medium as recited in claim 58, wherein said first beam of substantially monochromatic light is pulsed, and a detection by said at least one detector is timed in relation to a pulsing of said first beam of said substantially monochromatic light so as to provide for said at least one detector to detect said second plurality of fringes prior to detecting said first plurality of fringes.

64. A system for remotely sensing a fluid medium as recited in claim 58, wherein said reference source further comprises a rotating diffuser in cooperation with an integrating sphere, said substantially monochromatic light of said reference source from said first beam splitter optic is directed into said integrating sphere and reflected from an internal surface thereof, and said substantially monochromatic light of said reference source from said first beam splitter optic is transmitted through said rotating diffuser.

65. A system for remotely sensing a fluid medium as recited in claim 35, wherein said plurality of different scattered light signals are processed by a common said interferometer that provides for generation a plurality of sets of said first plurality of fringes.

66. A system for remotely sensing a fluid medium as recited in claim 65, further comprising a pyramidal reflector comprising a plurality of different reflective surfaces, each of said plurality of different reflective surfaces on different sides of said pyramidal reflector, wherein each reflective surface of said plurality of different reflective surfaces reflects a different scattered light signal of different said scattered light toward said interferometer so as to provide for generating a different set of said plurality of sets of said plurality of fringes.

67. A system for remotely sensing a fluid medium as recited in claim 35, further comprising a set of receiver optics operatively positioned with said set of imaging optics, wherein said set of receiver optics and said set of imaging optics comprise an optic axis along which said scattered light is received, said set of receiver optics is operative between said interferometer and said portion of said first beam of substantially monochromatic light.

68. A system for remotely sensing a fluid medium as recited in claim 67, wherein said set of receiver optics is located so that said scattered light receive by said interferometer is first received by said set of receiver optics.

69. A system for remotely sensing a fluid medium as recited in claim 67, further comprising a collimating lens operatively associated with said interferometer and located so that said scattered light receive by said interferometer is first received by said collimating lens, wherein said set of receiver optics is located so that said scattered light receive by said interferometer is first received by said set of receiver optics, said set of receiver optics and said collimating lens are configured in relation to one another so as to provide for an intermediate image plane therebetween, said set of receiver optics is configured to form an intermediate image of said scattered light in said intermediate image plane, and said collimating lens in cooperation with said set of imaging optics is configured to form an image of said intermediate image in said focal plane of said set of imaging optics substantially coincident with said operative surface of said detection system.

70. A system for remotely sensing a fluid medium as recited in claim 69, wherein said set of receiver optics are configured in relation to said collimating lens so as to satisfy a Scheimpflug condition in respect of said intermediate image plane.

71. A system for remotely sensing a fluid medium as recited in claim 67, further comprising a plurality of sets of receiver optics that provide for receiving a plurality of different scattered light signals from a plurality of different regions of said fluid medium, each of said plurality of different scattered light signals comprising different said scattered light, wherein each set of receiver optics of said plurality of sets of receiver optics is oriented in a different direction relative to an axis of a corresponding beam of substantially monochromatic light from which a corresponding scattered light signal of said plurality of different scattered light signals is generated.

72. A system for remotely sensing a fluid medium as recited in claim 71, further comprising at least a second beam of substantially monochromatic light projected into said fluid medium along a corresponding axis, wherein at least a first set of receiver optics oriented in a different direction relative to said first beam of substantially monochromatic light is configured to receive scattered light from a portion of said fluid medium illuminated by said first beam of substantially monochromatic light; and at least a second set of receiver optics oriented in a different direction relative to said at least said second beam of substantially monochromatic light is configured to receive said scattered light from said fluid medium originating with said at least said second beam of substantially monochromatic light.

73. A system for remotely sensing a fluid medium as recited in claim 71, wherein at least two different sets of receiver optics of said plurality of sets of receiver optics are configured to receive said scattered light from a common region of said fluid medium, and each of said at least two different sets of receiver optics is oriented in a different direction relative to a corresponding said beam of substantially monochromatic light illuminating said common region of said fluid medium.

* * * * *